United States Patent
Naoi et al.

(10) Patent No.: US 6,721,463 B2
(45) Date of Patent: Apr. 13, 2004

(54) APPARATUS AND METHOD FOR EXTRACTING MANAGEMENT INFORMATION FROM IMAGE

(75) Inventors: Satoshi Naoi, Kawasaki (JP); Yutaka Katsuyama, Kawasaki (JP); Hiroaki Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/964,571

(22) Filed: Sep. 28, 2001

(65) Prior Publication Data

US 2002/0044688 A1 Apr. 18, 2002

Related U.S. Application Data

(62) Division of application No. 08/888,794, filed on Jul. 7, 1997, now Pat. No. 6,327,387.

(30) Foreign Application Priority Data

Dec. 27, 1996 (JP) .............................................. 8-351346

(51) Int. Cl.⁷ ................................................ G06K 9/54
(52) U.S. Cl. ........................ 382/305; 382/190; 358/403; 707/6; 715/510
(58) Field of Search ................................ 382/151, 173, 382/175, 176, 182, 190, 202, 203, 282, 291, 295, 305, 309, 310, 181, 209, 217, 218; 358/403; 715/503, 505, 506, 509, 510; 707/1–10

(56) References Cited

U.S. PATENT DOCUMENTS

| | | | | |
|---|---|---|---|---|
| 4,574,395 A | * | 3/1986 | Kato | 382/306 |
| 4,803,614 A | * | 2/1989 | Banba et al. | 707/510 |

(List continued on next page.)

FOREIGN PATENT DOCUMENTS

| | | |
|---|---|---|
| DE | 43 07 577 A1 | 9/1993 |
| EP | 0616296 | 9/1994 |
| EP | 0 654 746 A2 | 5/1995 |
| EP | 0 660 249 | 6/1995 |
| GB | 1487507 | 10/1977 |
| GB | 2 219 674 | 12/1989 |
| JP | 9-50527 | 2/1997 |
| JP | 9-507471 | 2/1997 |
| JP | 8-223720 | 3/1998 |
| WO | WO 89/11703 A1 | 11/1989 |
| WO | 91/045541 | 4/1991 |
| WO | 92/05504 | 4/1992 |

OTHER PUBLICATIONS

Hamano "A Similarity Retrieval Method for Image Database Using Simple Graphics", IEEE, pp. 149154, 1988.*

N. Funakubo, "Pattern Recognition", pp. 62–67 (Dec. 1, 1991) and English translation.

Casey, R.G., et al., "Intelligent Forms Processing", IBM Systems Journal, vol. 29, 1990, No. 3., pp. 435–450.

"Model and Method of Understanding Layout for Processing of Printed Forms", IBM Technical Disclosure Bulletin, vol. 37, Jan. 1, 1994, No. 1, pp. 277–279.

Pizano, A., et al., "A Business Form Recognition System", IEEE, Jan. 11, 1991, pp. 626–632.

(List continued on next page.)

Primary Examiner—Daniel Mariam
(74) Attorney, Agent, or Firm—Staas & Halsey LLP

(57) ABSTRACT

A management information extraction apparatus learns the structure of the ruled lines of a document and the position of user-specified management information such as a title, etc. during a form learning process, and stores them in a layout dictionary. During the operation, the structure of the ruled lines extracted from an image of an input document is matched with that of the document in the layout dictionary. Then, position information in the layout dictionary is referred to, and the management information is extracted from the input document.

6 Claims, 50 Drawing Sheets

U.S. PATENT DOCUMENTS

| | | | |
|---|---|---|---|
| 4,808,987 A | 2/1989 | Takeda et al. | 345/667 |
| 4,933,979 A | 6/1990 | Suzuki et al. | 382/173 |
| 4,933,984 A | 6/1990 | Nakano et al. | 382/175 |
| 4,953,108 A | 8/1990 | Kato et al. | 715/509 |
| 5,075,895 A | 12/1991 | Bessho | 382/175 |
| 5,101,448 A | 3/1992 | Kawachiya et al. | 382/287 |
| 5,119,437 A | 6/1992 | Kuwamura et al. | 382/175 |
| 5,140,650 A | 8/1992 | Casey et al. | 382/283 |
| 5,179,650 A | 1/1993 | Fukui et al. | 707/520 |
| 5,191,612 A | 3/1993 | Katsuyama et al. | 382/175 |
| 5,235,653 A | 8/1993 | Nakano et al. | 382/175 |
| 5,287,497 A * | 2/1994 | Behera | 707/104.1 |
| 5,289,571 A * | 2/1994 | Harada et al. | 707/510 |
| 5,293,429 A | 3/1994 | Pizano et al. | 382/202 |
| 5,448,692 A | 9/1995 | Ohta | 707/520 |
| 5,613,016 A | 3/1997 | Saitoh | 382/174 |
| 5,708,730 A | 1/1998 | Itonori | 382/177 |
| 5,757,957 A | 5/1998 | Tachikawa | 382/176 |
| 5,774,584 A | 6/1998 | Matsumoto et al. | 382/194 |
| 5,802,361 A * | 9/1998 | Wang et al. | 382/217 |
| 5,812,995 A | 9/1998 | Sasaki et al. | 707/1 |
| 5,815,704 A | 9/1998 | Shimotsuji et al. | 382/190 |
| 5,835,916 A | 11/1998 | Inaki et al. | 707/509 |
| 5,848,186 A | 12/1998 | Wang et al. | 382/176 |
| 5,926,824 A | 7/1999 | Hashimoto | 707/520 |
| 5,956,422 A | 9/1999 | Alam | 382/175 |
| 5,960,448 A | 9/1999 | Reichek et al. | 707/526 |
| 6,035,061 A | 3/2000 | Katsuyama | 382/177 |

OTHER PUBLICATIONS

U.S. patent application Ser. No. 08/888,794, Naoi et al., Jul. 7, 1997.

U.S. patent application Ser. No. 09/964,780, Naoi, Sep. 28, 2001.

European Search Reports for three corresponding European Divisional applications (Nos. 02021868.1, 02021140.5, and 02021869.9) of the above–referenced present US patent application, Nov. 7, 2002, three (3) European search reports.

Yashiro et al. "A new method of document structure extraction using generic layout knowledge", IEEE, pp. 282–287, 1989.

Hori et al. "Robust table–form structure analysis based on box–driven reasoning", IEEE, pp. 218–221, 1995.

Ishitani "Model matching based on associationgraph for form image understading". IEEE, pp. 287–292, 1995.

Watanabe et al. "Layout recognition of multi–kinds of table–form documents", IEEE, pp. 432–445, 1995.

Hirayama "Analyzing form images by using line–shared adjacent cell relations", IEEE, pp. 768–772, 1996.

Arturo Pizano, et al., "A Business Form Recognition System," Proceedings of the International Computer Software and Applications Conference (COMPSAC), Tokyo, Sep. 11–13, 1991, Conf. 15, pp. 626–632.

Office Action from Chinese Patent Office in the corresponding Chinese Patent application No. 97125998.4 of the above–identified US patent application, dated Oct. 20, 2002, including English language–translation of the Chinese Office Action.

* cited by examiner

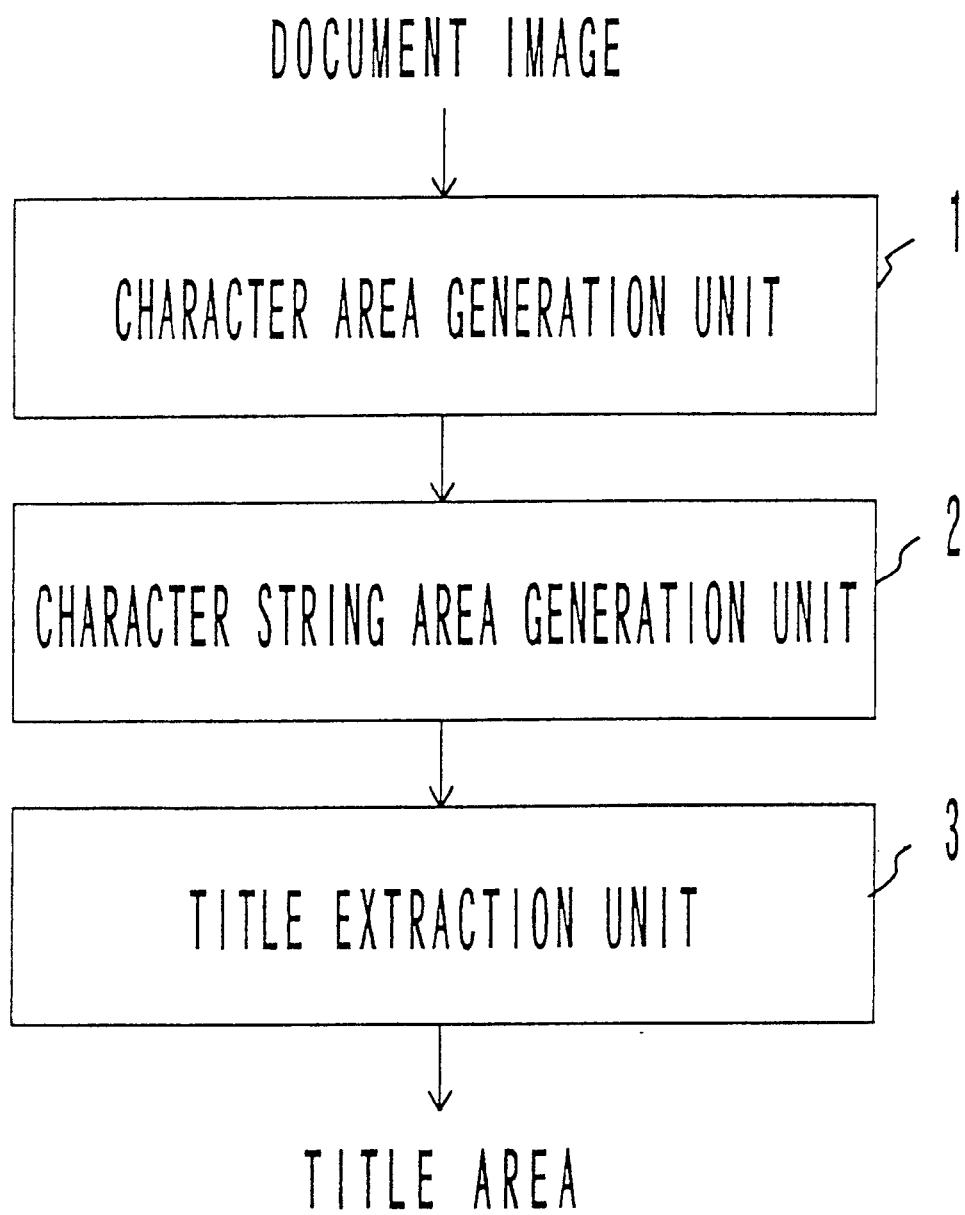
F I G. 1 A

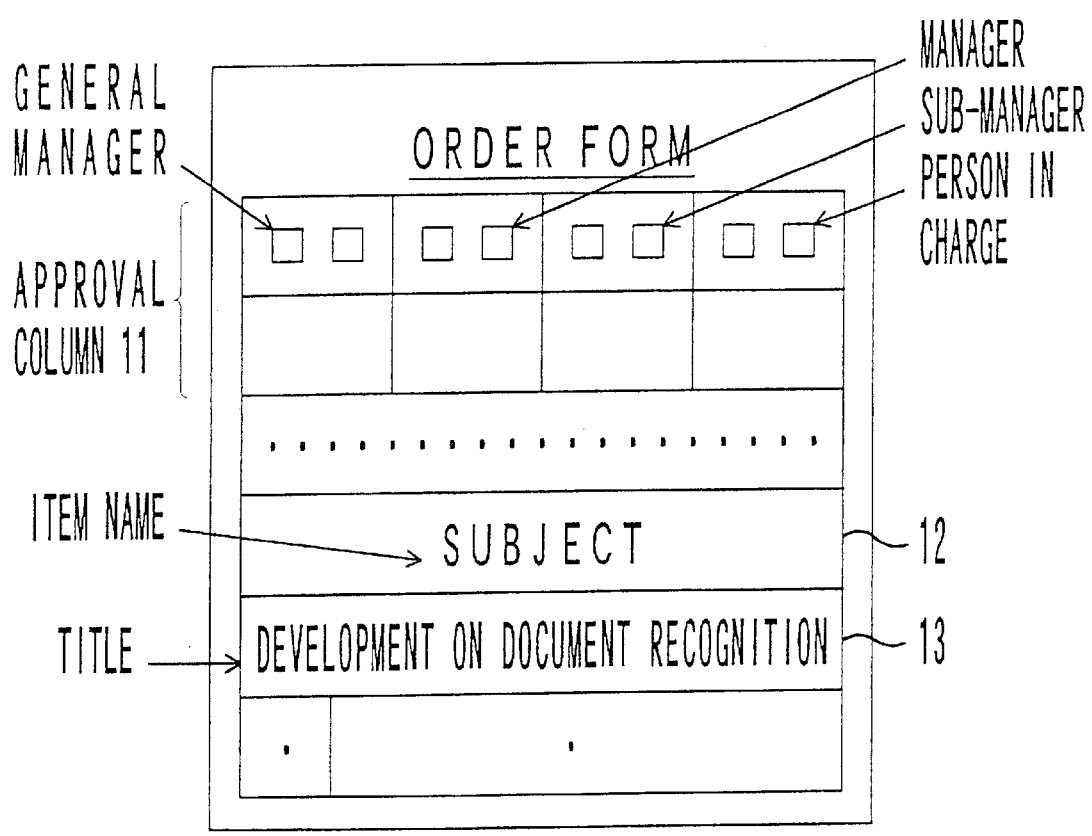
F I G. 1 B (1, 1, 1, 0)

FIG. 13

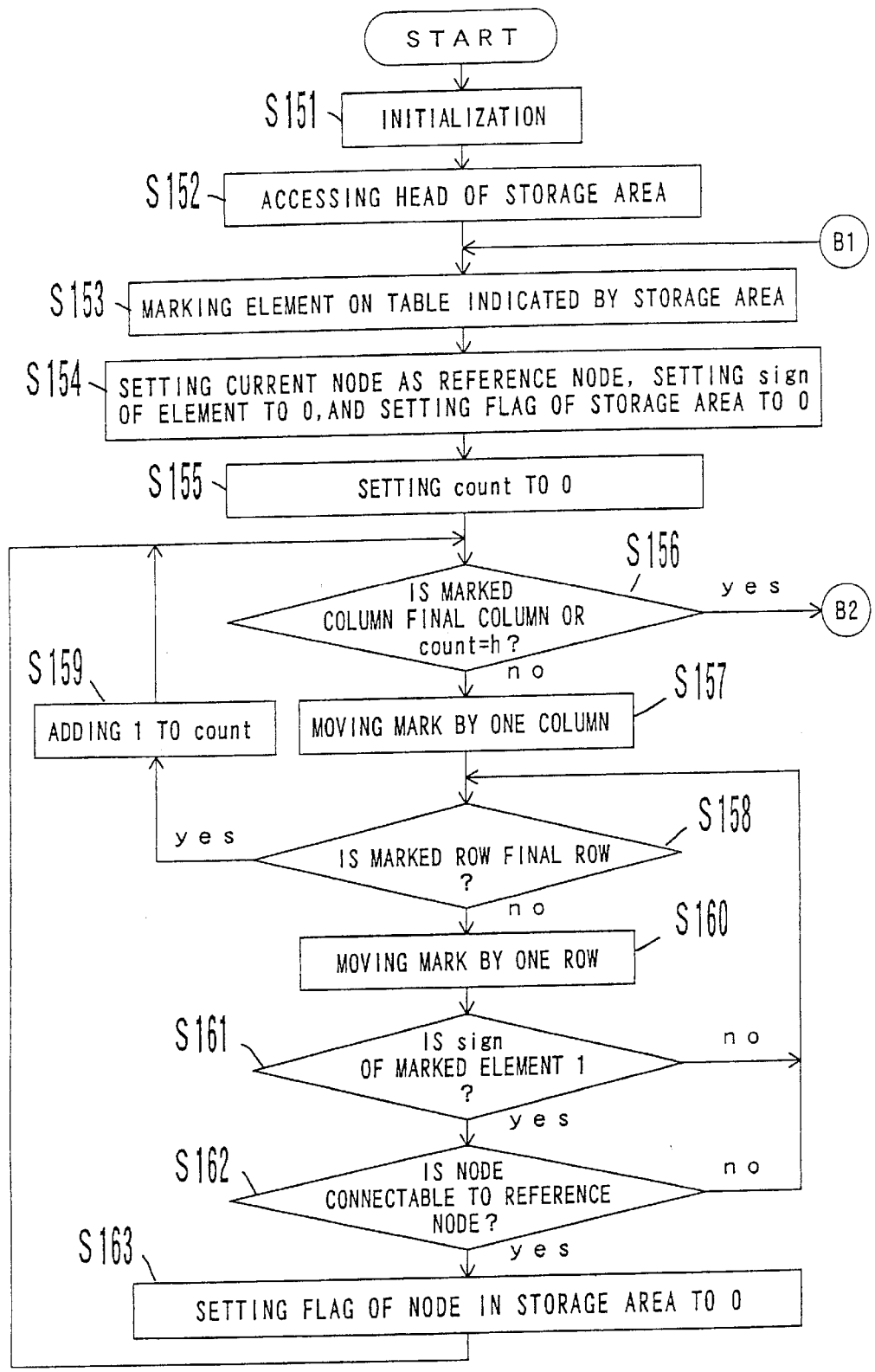
F I G. 4 3

| POSITION OF NODE | FLAG |
|---|---|
| ( 0, 0 ) | 1 |
| ( 1, 0 ) | 1 |
| ( 1, 1 ) | 1 |
| ( 2, 0 ) | 1 |
| ... | ... |
| ( 11, 14 ) | 1 |

FIG. 45

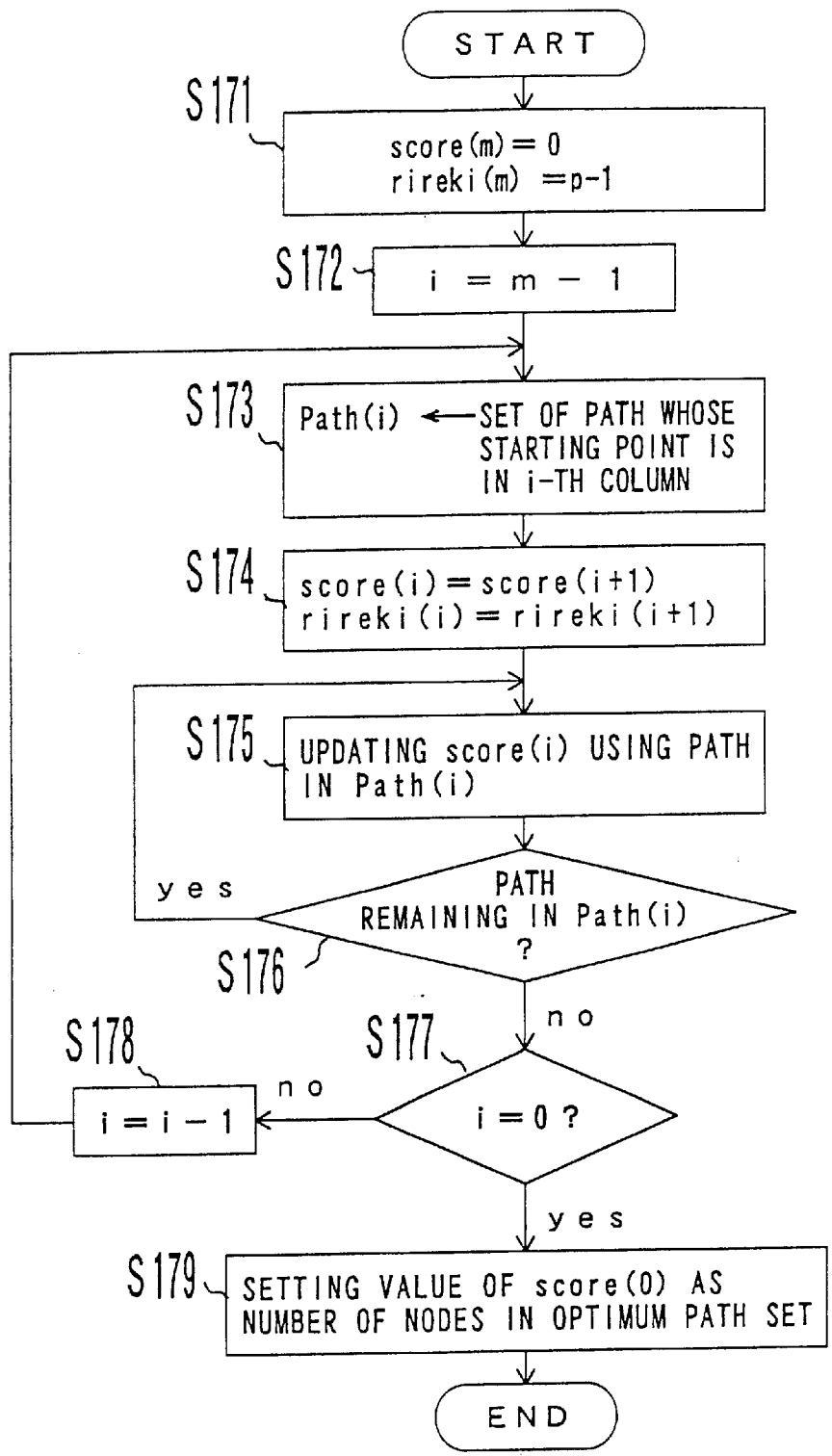
F I G. 4 7

APPARATUS AND METHOD FOR EXTRACTING MANAGEMENT INFORMATION FROM IMAGE

CROSS REFERENCE TO RELATED APPLICATION

This application is a divisional of application Ser. No. 08/888,794, filed Jul. 7, 1997, now U.S. Pat. No. 6,327,387 Dec. 4, 2001.

BACKGROUND OF THE INVENTION

1. Field of the Invention

The present invention relates to a system for converting documents and drawings into image data through an input device such as a scanner, etc., adding management information to the image data, and accumulating resultant data; to an apparatus for identifying the structure of the ruled lines in the image for image recognition; and to a method of performing the above described processes.

2. Description of the Related Art

Recently, a conventional method of storing information on paper has been switched to a method of storing data on electronic media. For example, an electronic filing system converts documents stored on paper into document images by an opto-electrical converter such as an image scanner, etc. and stores the converted document images on an optical disk, a hard disk, etc. with management information such as a key word for retrieval added to the converted document images.

Since documents are stored as image data in the above described method, a larger disk capacity is required than in a method in which all characters in documents are stored after being encoded in a character recognition technology. However, the above described method can be easily followed at a high process speed, and pictures and tables containing data other than characters can be stored as is. On the other hand, the stored information should be retrieved using additional management information such as a keyword, numbers, etc. together with document images. The conventional systems require much effort and time in assigning a keyword, and do not bring user-friendly technology.

To solve the problem of the awkwardness of the conventional systems, the title of a document can be assumed to be a keyword, automatically extracted, recognized as characters, and encoded for storage with document images.

At present, the speed of recognizing characters is up to several tens of characters per second, and it takes about 30 seconds through several minutes to process a normal document page (approximately 21 cm×29.5 cm). Therefore, it is recommended not to recognize all characters of an entire document, but to first extract necessary titles from the images of the document and then recognize them.

The conventional technology of extracting a part of a document, for example, a title of the document from a document image obtained by reading the document through an opto-electrical converter is described in "TITLE EXTRACTING APPARATUS FOR EXTRACTING TITLE FROM DOCUMENT IMAGE AND METHOD THEREOF, U.S. patent application Ser. No. 08/694,503 which is now U.S. Pat. No. 6,035,061, and Japanese Patent Application H7-341983" filed by the Applicant of the present invention. FIG. 1A shows the principle of the title extracting apparatus.

The title extracting apparatus shown in FIG. 1A comprises a character area generation unit 1, a character string area generation unit 2, and a title extraction unit 3. The character area generation unit 1 extracts, by labelling connected components of picture elements, a partial pattern such as a part of a character, etc. from a document image input through a scanner, etc. Then, it extracts (generates) a character area by integrating several partial patterns. The character string area generation unit 2 integrates a plurality of character areas and extracts (generates) a character string area. The title extraction unit 3 extracts as a title area a character string area which is probably a title.

At this time, the title extraction unit 3 utilizes notable points such as a top and center position, a character size larger than that of the body of the document, an underlined representation, etc. as the probability of a title area. The probability is expressed as a score for each of the character string areas to finally obtain a plurality of candidates for the title area in the order from the highest score to the lowest one. In the above described process, title areas can be extracted from documents containing no tables.

On the other hand, when a document contains a table, the title extraction unit 3 extracts a title area in consideration of the condition of the number of characters after the character string area generation unit 2 extracts a character string area in the table. For example, the number of characters indicating the name of an item implying the existence of the title is comparatively small such as 'Subject', 'Name', etc. The number of characters forming a character string representing the title itself is probably large such as '. . . relating to . . . ' Thus, a character string which is probably a title can be detected from adjacent character strings by utilizing the number of characters in the character strings.

However, there are a large number of table-formatted documents using ruled lines such as slips, etc. Therefore, the above described conventional technology has the problem that there is little probability that a title can be successfully extracted from a table.

For example, when a title is written at the center or around the bottom in a table, the title may not be correctly extracted only by extracting character strings from the top by priority. Furthermore, as shown in FIG. 1B, an approval column 11 is located at the top in the table. If there are a number of excess character strings such as 'general manager', 'manager', 'sub-manager', 'person in charge', etc. in the approval column 11, then these character strings are extracted by priority, thereby failing in correctly extracting the title.

As shown by a combination of an item name 12 and a title 13, a title may be written below the item name 12, not on the right hand side of the item name 12. In this case, the relative positions of the item name and the title cannot be recognized only according to the information about the number of characters of adjacent character strings. Furthermore, item names are written not only horizontally but also vertically in Japanese. Therefore, it is very hard to correctly specify the position of the item name. When a document contains two tables, the title may be located somewhere in a smaller table.

Since a document containing tables can be written in various formats, the probability of a title depends on each document, and the precision of extracting a title in a table is lowered. If the state of an input document image is not good, the extraction precision is furthermore lowered.

In an electronic filing system, an extracted title area is character-recognized by an optical character reader (OCR) to generate a character code and add it to the image as management information. Thus, the image in a database can be retrieved using a character code.

In this case, there is no problem if the character string in a title area is readable by an OCR. However, if a background shows a textured pattern or characters are designed fonts, then the current OCR cannot recognize a character string. Therefore, in this case, management information cannot be added to an image.

SUMMARY OF THE INVENTION

The present invention aims at providing an apparatus and method of extracting appropriate management information for use in managing an image in a document in various formats, and an apparatus and method of accumulating images according to the management information.

An image management system having the management information extraction apparatus and the image accumulation apparatus according to the present invention includes a user entry unit, a computation unit, a dictionary unit, a comparison unit, an extraction unit, a storage unit, a group generation unit, and a retrieval unit.

According to the first aspect of the present invention, the computation unit computes the position of the management information contained in an arbitrary input image according to the position information about the position of a ruled line relative to the outline portion of a table area contained in the input image. The extraction unit extracts the management information from the input image based on the position computed by the computation unit.

In the second aspect of the present invention, the dictionary unit stores the features of the structures of the ruled lines of one or more table forms, and the position information about the management information in each of the table forms. The comparison unit compares the feature of the structure of the ruled lines of the input image with the feature of the structure of the ruled lines stored in the dictionary unit. The extraction unit refers to the position information about the management information stored in the dictionary unit based on the comparison result from the comparison unit, and extracts the management information about the input image. The user entry unit enters the position of the management information specified by the user in the dictionary unit.

According to the third aspect of the present invention, the storage unit stores image information as management information for an accumulated image. The retrieval unit retrieves the image information.

According to the fourth aspect of the present invention, the storage unit stores ruled line information about a table form. The group generation unit obtains a plurality of possible combinations between the ruled line extracted from an input image and the ruled line contained in the ruled line information in the storage unit, and extracts a group containing two or more compatible combinations from the plurality of combinations in such a way that no combinations of another group can be contained. The comparison unit compares the input image with the table form according to the information about combinations contained in one or more extracted groups.

BRIEF EXPLANATION OF THE DRAWINGS

FIG. 1A shows the configuration of the title extraction apparatus according to a filed application;

FIG. 1B shows a table-formatted document;

FIG. 13 shows a method of extracting an intersection string;

FIG. 43 is a flowchart (1) showing a path generating process;

FIG. 45 shows a node string of a storage unit;

FIG. 47 is a flowchart showing an optimum path set determining process; and

DESCRIPTION OF THE PREFERRED EMBODIMENTS

The preferred embodiments of the present invention are described below in detail by referring to the attached drawings.

Figure 2A:
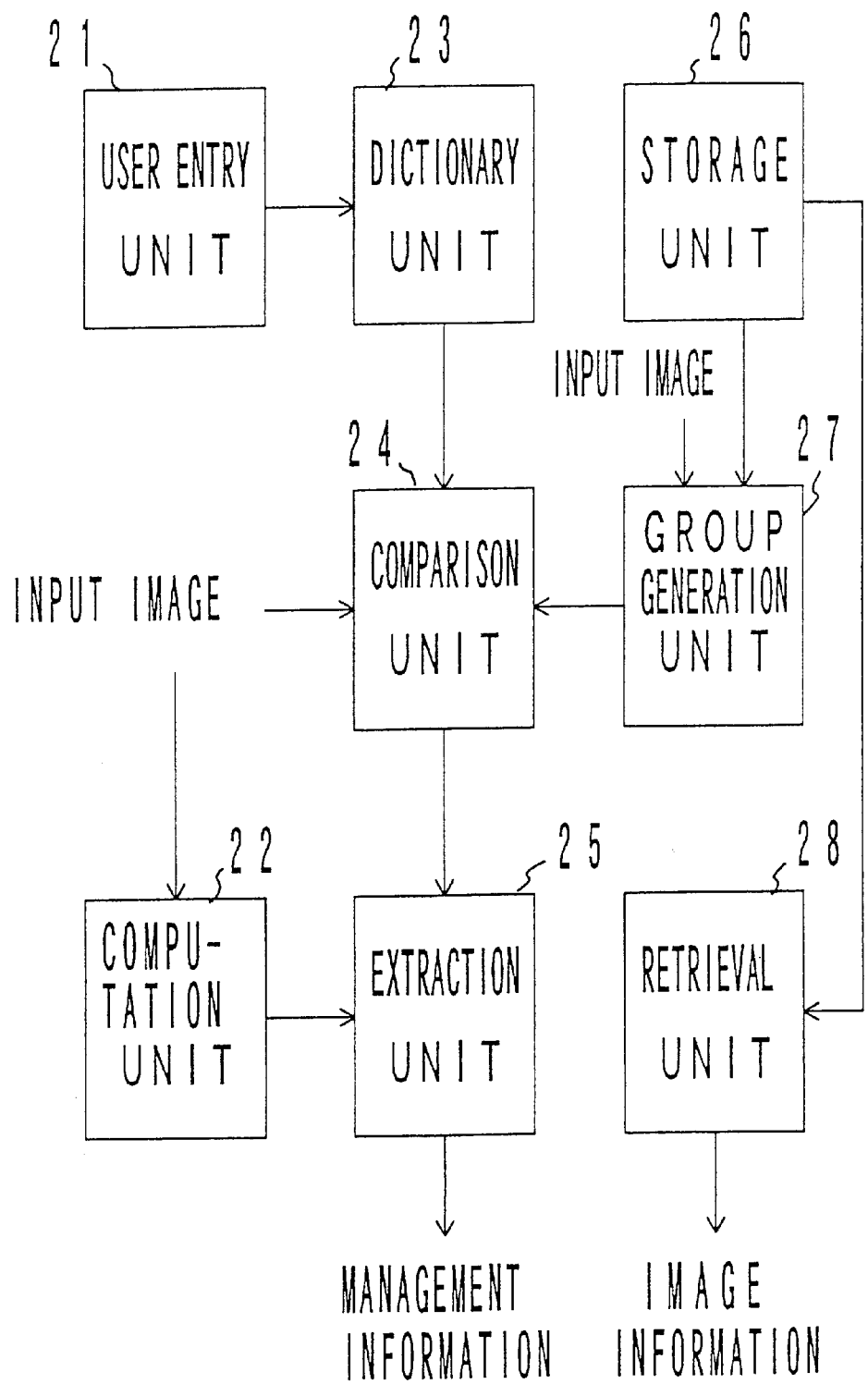
FIG. 2A shows the principle of the management information extraction apparatus.

FIG. 2A shows the principle of an image management system including the management information extraction apparatus and the image accumulation apparatus according to the present invention. This system includes the first, second, third, and fourth principles of the present invention and comprises a user entry unit 21, a computation unit 22, a dictionary unit 23, a comparison unit 24, an extraction unit 25, a storage unit 26, a group generation unit 27, and a retrieval unit 28.

According to the first principle of the present invention, a computation unit 22 computes the position of the management information contained in an input image based on the information about the position of a ruled line relative to the outline portion of the table area contained the input image. An extraction unit 25 extracts the management information from the input image based on the position computed by the computation unit 22.

For example, as information about the outline portion of a table area, a reference size of a table area, or a position of a reference point close to the outline of the table area, is used. The computation unit 22 represents the position of each ruled line extracted from the table area as the information about the position relative to the reference point, and obtains the position of the management information from the position information of the ruled lines encompassing the management information. The extraction unit 25 extracts the image data corresponding to the position as management information and recognizes characters as necessary.

The management information can be extracted with precision by obtaining the relative positions of ruled lines encompassing the management information for a plurality of reference points in the outline portion of a table or in a plurality of directions even if the state of an input image is inferior due to breaks, noise, etc.

According to the second principle of the present invention, a dictionary unit 23 stores features of the structures of the ruled lines of one or more table forms, and position information of the management information in each of the table forms. A comparison unit 24 compares the feature of the structure of the ruled line of an input image with the feature of the structure of the ruled line stored in the dictionary unit 23. The extraction unit 25 refers to the position information about the manage information stored in the dictionary unit 23 based on the comparison result obtained from the comparison unit 24, and extracts the management information of the input image. A user entry unit 21 enters the position of the management information specified by the user in the dictionary unit 23.

A table form refers to the layout structure of ruled lines forming the table. The dictionary unit 23 preliminarily stores the features of the structure of the ruled lines and the position of the management information specified by the user entry unit 21. The comparison unit 24 obtains a table form having the features of the structure of the ruled lines similar to those of the input image. The extraction unit 25 extracts the management information from the position specified in the table form.

Thus, management information can be precisely extracted from each image even by preliminarily entering the position of user-requested management information and extracting the management information at the specified position from an input image even if various form images are entered.

According to the third principle of the present invention, a storage unit 26 stores image information as the management information for an accumulated image. A retrieval unit 28 retrieves the image information.

For example, in the electronic filing apparatus for accumulating a number of images, an image code extracted from each image is stored in the storage unit 26 as the management information. The retrieval unit 28 retrieves management information by comparing a given image code with an image code in the storage unit 26 through, for example, a template matching.

Thus, the present invention not only stores/retrieves a character string of management information in character codes, but also stores/retrieves the character string as an image itself. Therefore, a character such as a textured character, a designed font, a logo, etc. which is hard to be correctly recognized can be processed as management information.

According to the fourth principle of the present invention, the storage unit 26 stores ruled line information about the table form. A group generation unit 27 obtains a plurality of possible combinations between ruled lines extracted from an input image and the ruled lines contained in the ruled line information in the storage unit 26, and extracts a group containing two or more combinations compatible to each other from among the plurality of combinations in a way that the extracted group may not contain a combination in another group. The comparison unit 24 compares the input image with the table form according to the information about the combination contained in one or more extracted groups.

The group generation unit 27 obtains a possible combination of the ruled lines of an input image and the ruled lines of the table form to identify the form of the input image using the table form stored in the storage unit 26. At this time, for example, ruled lines similar to each other in size and position relative to the entire table are retrieved as a possible combination.

Then, it is determined whether or not two combinations are compatible by comparing the relation between the ruled lines contained in an input image with the relation between the ruled lines of the form in a table. At this time, the number of the objects to be compatibility-checked can be reduced and the process can be efficiently performed by generating a new group in a way that no combinations already contained in other groups can be included.

The comparison unit 24 considers that a larger number of combinations contained in the optimum set of groups indicates a higher similarity between an input image and the table form, and determines the table form having the highest similarity as a form corresponding to the input image.

Thus, the form of an input image can be rapidly identified, and a management information extracting process can be performed efficiently.

For example, the user entry unit 21 shown in FIG. 2A corresponds to an input unit 43 shown in FIG. 5, which is explained later, and the dictionary unit 23 and the storage unit 26 correspond to an external storage unit 45 in FIG. 5. Furthermore, the computation unit 22, the comparison unit 24, the extraction unit 25, the group generation unit 27, and the retrieval unit 28 correspond to a central processing unit (CPU) 41 and memory 42 in FIG. 5.

According to the present invention, the layout structure of the ruled lines in a well-known table format is learned for use in various applications. The learned information is used to extract a title, etc. with precision from an unknown table format. To attain this, a form learning mode and an operation mode are set. The layout structure may be hereinafter referred to as a format structure or a form.

Figure 2B:
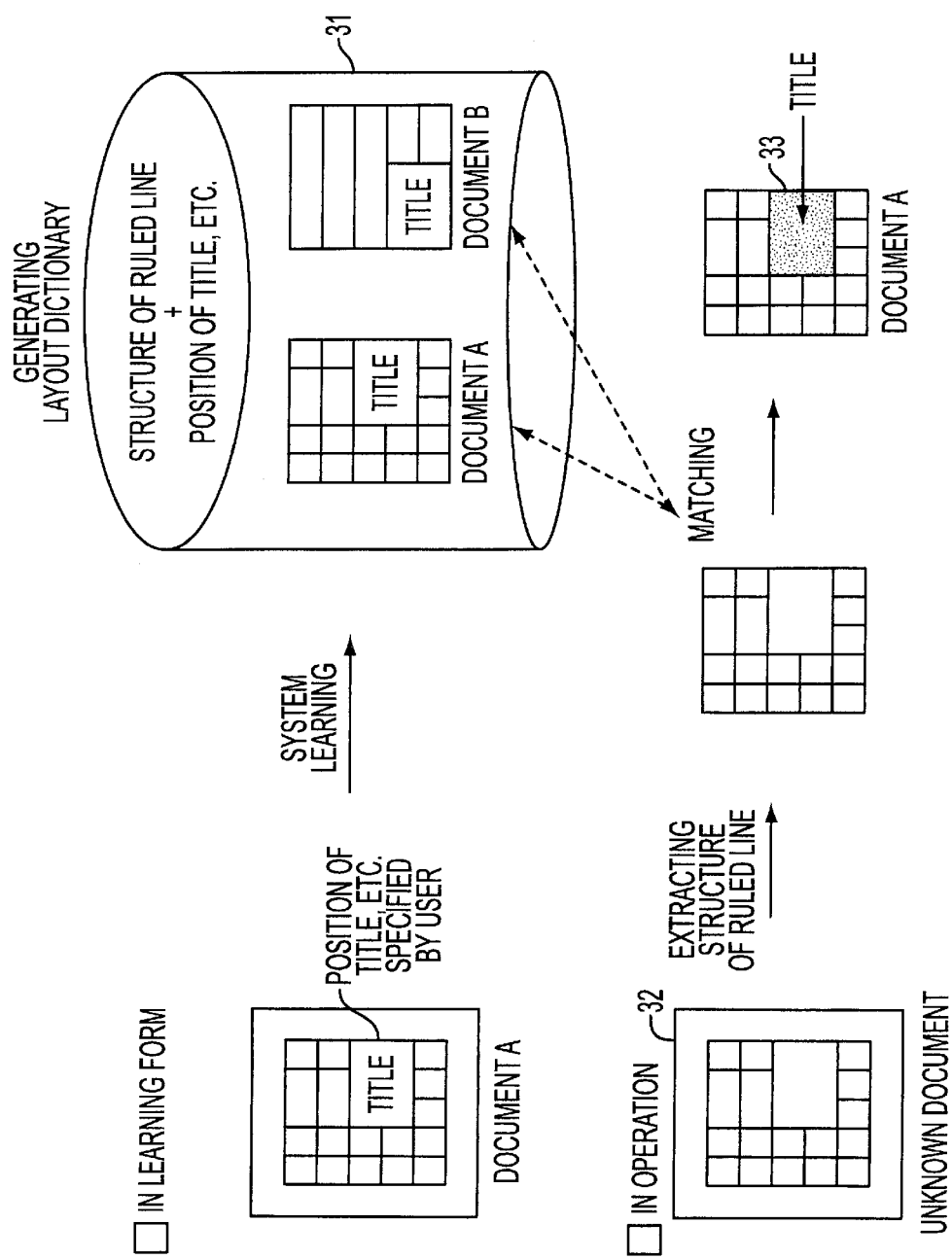
FIG. 2B shows the management information extracting process.

FIG. 2B shows the outline of the management information extracting process. The management information extraction apparatus first learns the layout of the ruled lines of documents A, B, etc. in known formats and the user-specified position of a correct title area, etc. during the learning process. Then, a layout dictionary (form dictionary) 31 including the above listed information is generated.

The mode in which the user specifies the position of a title can be either a user entry mode without form recognition of documents A and B or an automatic learning mode with form recognition. The operations in each mode are described later.

During the operation, the management information extraction apparatus extracts the layout of the ruled lines from an input unknown document 32, and matches the layout with the layout dictionary 31. Thus, a document in a format matching the layout stored in the layout dictionary can be identified. In this example, the layout of the document 32 matches that of the document A.

Then, the management information extraction apparatus refers to the information about the position of a title specified by the corresponding document A, and extracts the title from a character string area 33 of the document 32 with high precision. Furthermore, management information about various documents can be extracted with high precision by instructing a user to specify not only a title but also other tag areas such as a date, etc. as management information.

Since management information should be quickly and automatically extracted when a user inputs a document using a scanner during the operation, a high-speed algorithm characterized by an interactive operation is adopted in the present invention. In this algorithm, a classification process can be performed at a high speed by specifying candidates for a corresponding form to the input document first in a rough classification, and then in a detailed classification (identification). A corresponding process is also performed during the form learning process.

Figure 3:
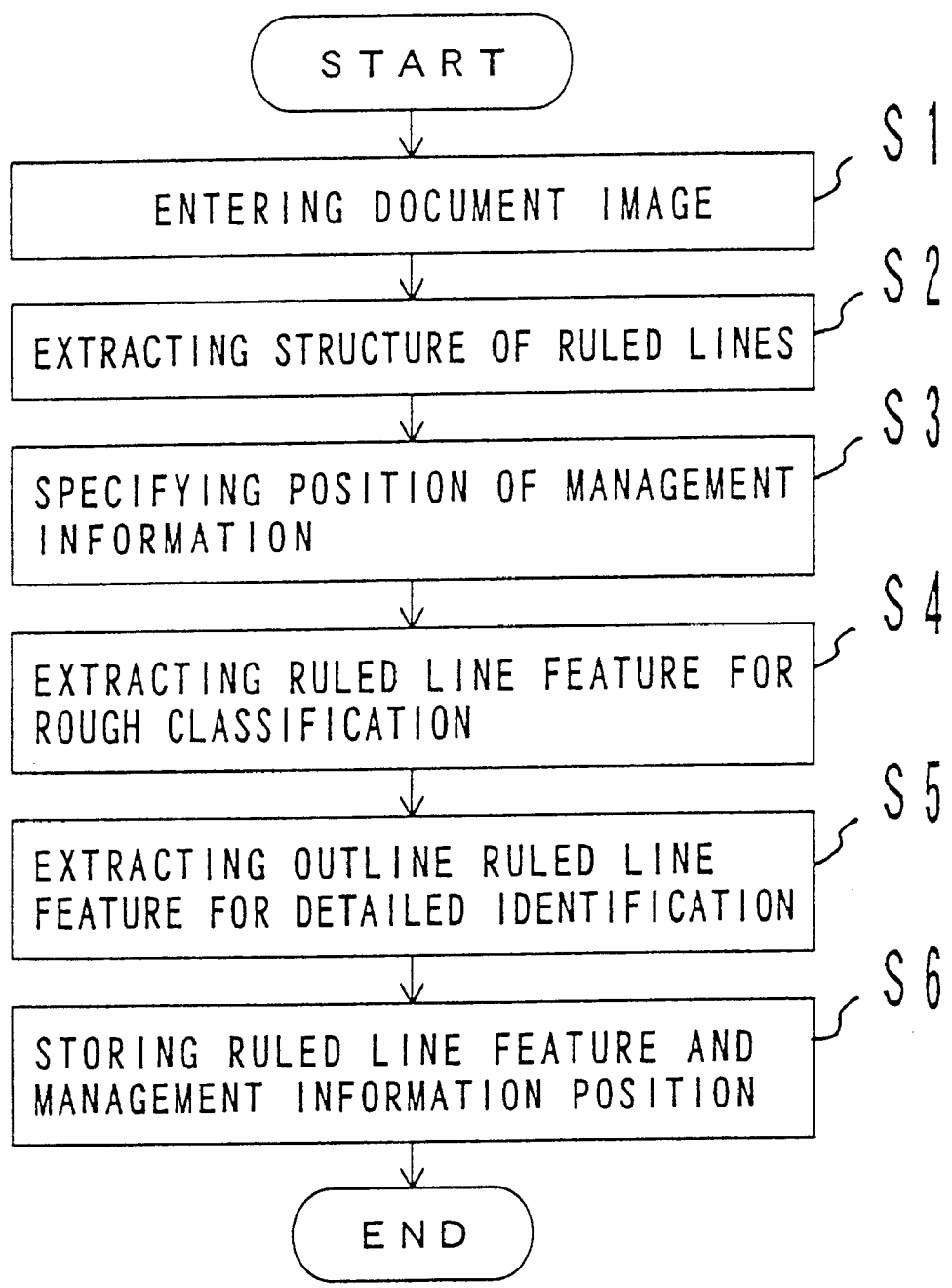
FIG. 3 is the first flowchart showing the process performed when a form is learned.

FIG. 3 is a flowchart showing the outline of the process in a form learning mode. When the process starts, the management information extraction apparatus first inputs a document image to be learned (step S1) and extracts the structure of the ruled lines (step S2). Then, the management information extraction apparatus inquires the user of the position of the management information and instructs the user to specify the position (step S3).

Then, the management information extraction apparatus extracts the features of the ruled lines for the rough classification by discriminating solid lines from broken lines in the extracted structure of the ruled lines (step S4), and extracts the features of the ruled lines indicating an outline (a contour) for detailed identification (step S5). For example, the features of the structure of the ruled lines table against a change in data are used as the features for the rough classification. As the features for detailed identification, a cross ratio relating to the outline of a table is used in consideration of a high-speed process.

Then, the management information extraction apparatus stores the extracted features of the ruled lines and the specified position of the management information in the layout dictionary 31 (step S6), and terminates the process. The stored information is referenced in an operation mode, and is used to extract the management information from an unknown document.

Figure 4:
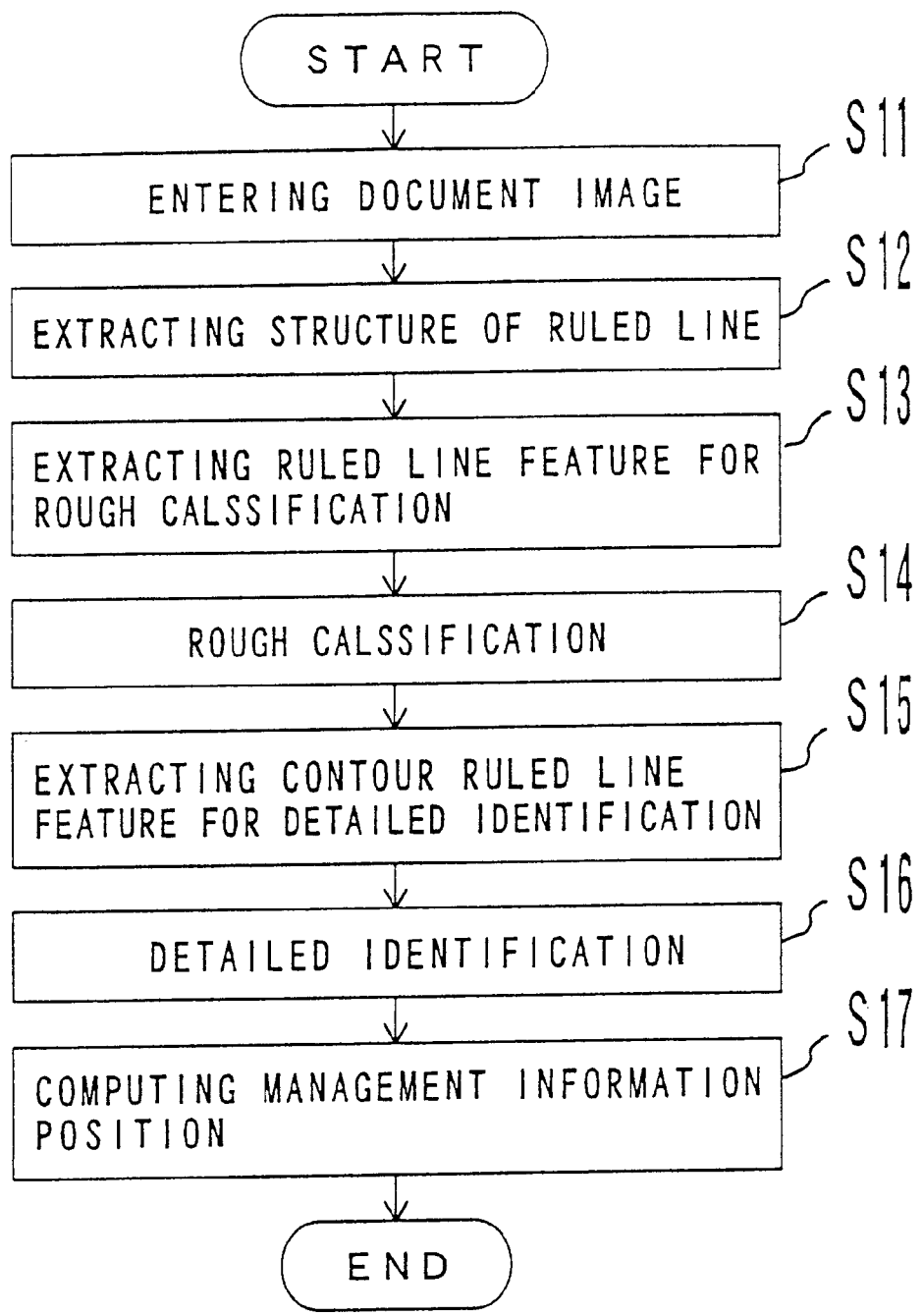
FIG. 4 is the first flowchart showing the process performed during the operation.

FIG. 4 is a flowchart showing the outline of the process in an operation mode. When the process starts, the management information extraction apparatus first inputs a document image to be processed (step S11), and extracts the ruled line structure (step S12).

Then, the management information extraction apparatus extracts the features of the ruled lines for the rough classification from the ruled line structure (step S13), compares them with the corresponding information in the layout dictionary 31, and performs the rough classification of the ruled line structure (step S14). As a result, the ruled line structure in the layout dictionary 31 which possibly matches the ruled line structure of the layout dictionary 31 is extracted as a candidate.

Then, the management information extraction apparatus extracts the features of the ruled lines indicating an outline for detailed identification from the ruled line structure (step S15), compares them with the corresponding information about the candidate extracted in the rough classification, and identifies the details of the ruled line structure (step S16). In this step, for example, a one-dimensional matching process is performed on the cross ratio to specify a candidate corresponding to an input document.

Then, it computes the position of the management information in the input document image based on the position of the management information specified in the form of the candidate (step S17), and then terminates the process. Thus, according to the position information specified by the user in the known document, management information can be extracted from the input document image with high precision. Since the form comparing process is performed in two steps of rough classification and detailed identification during the operation, candidates for detailed identification are limited, thereby speeding up the extracting process.

Figure 5:
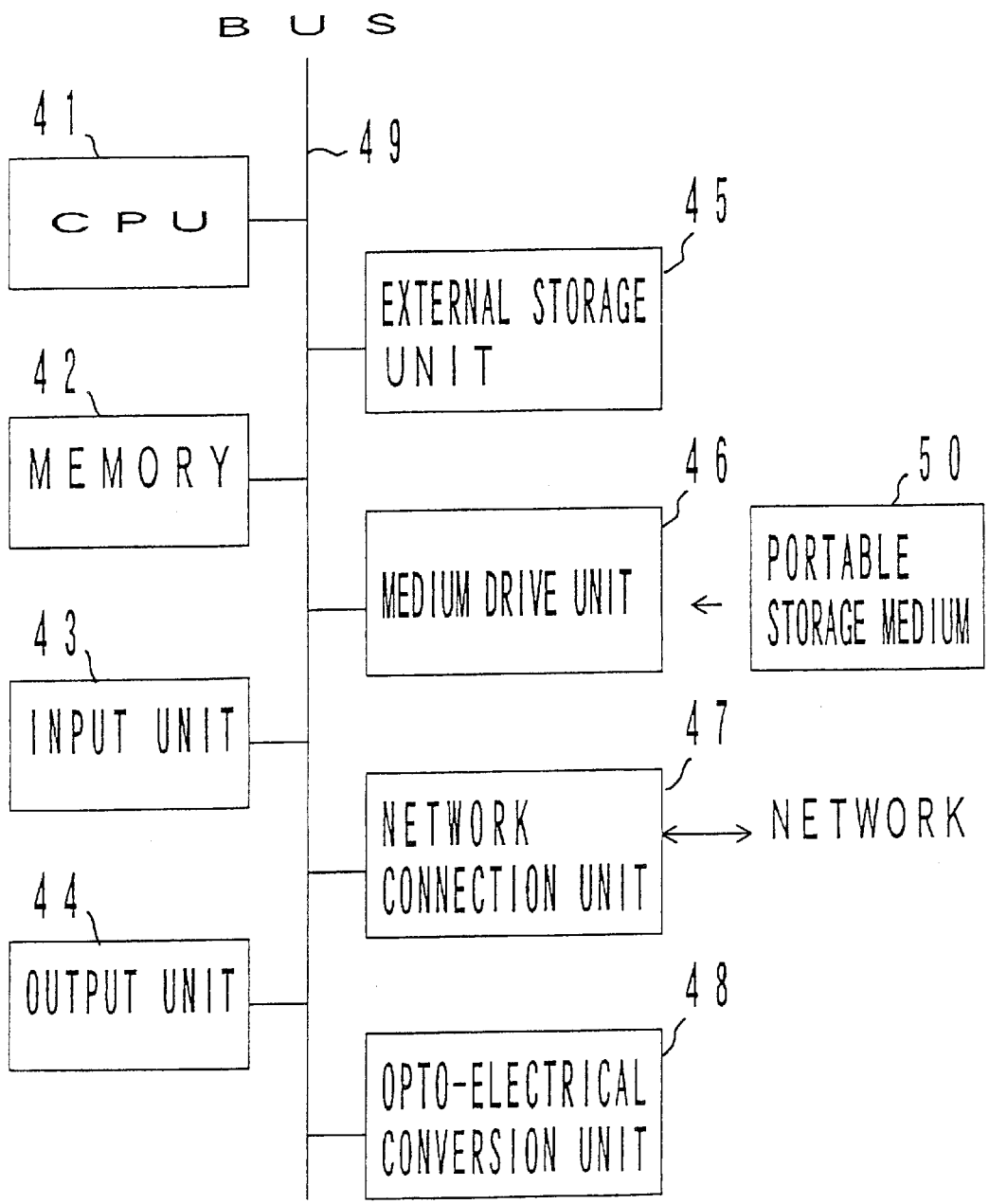
FIG. 5 shows the configuration of the information processing apparatus.

The management information extraction apparatus according to the present embodiment can be realized by an information processing device (computer) as shown in FIG. 5. The information processing device shown in FIG. 5 comprises the CPU 41, the memory 42, the input unit 43, an output unit 44, the external storage unit 45, a medium drive unit 46, a network connection unit 47, and an opto-electrical conversion unit 48, and each of the units are interconnected through a bus 49.

The CPU 41 executes a program using the memory 442, and performs each process shown in FIGS. 3 and 4. The memory 42 can be a read only memory (ROM), a random access memory (RAM), etc. Necessary data such as the layout dictionary 31, etc. is temporarily stored in the RAM.

The input unit 43 can be, for example, a keyboard, a pointing device, etc. and is used when a user inputs a request or an instruction. The output unit 44 can be, for example, a display device, a printer, etc. and is used when an inquiry is issued to a user or when a process result, etc. is output.

The external storage unit 45 can be, for example, a magnetic disk device, an optical disc device, a magneto-optical disk device, etc., and stores a program and data. It also can be used as a database for storing images and the layout dictionary 31.

The medium drive unit 46 drives a portable storage medium 50 and accesses the contents stored therein. The portable storage medium 50 can be an arbitrary computer-readable storage medium such as a memory card, a floppy disk, a compact disk read only memory CD-ROM, an optical disk, a magneto-optical disk, etc. The portable storage medium 50 stores not only data but a program for performing each of the above listed processes.

The network connection unit 47 is connected to an arbitrary communications network such as a local area network (LAN), etc. and performs data conversion, etc. associated with communications. The management information extraction apparatus can receive necessary data and programs from an external database, etc. through the network connection unit 47. The opto-electrical conversion unit 48 can be, for example, an image scanner and receives an image of a document, a drawing, etc. to be processed.

Next, each of the processes performed during the form learning process is described by referring to FIGS. 6 through 16.

Figure 6:
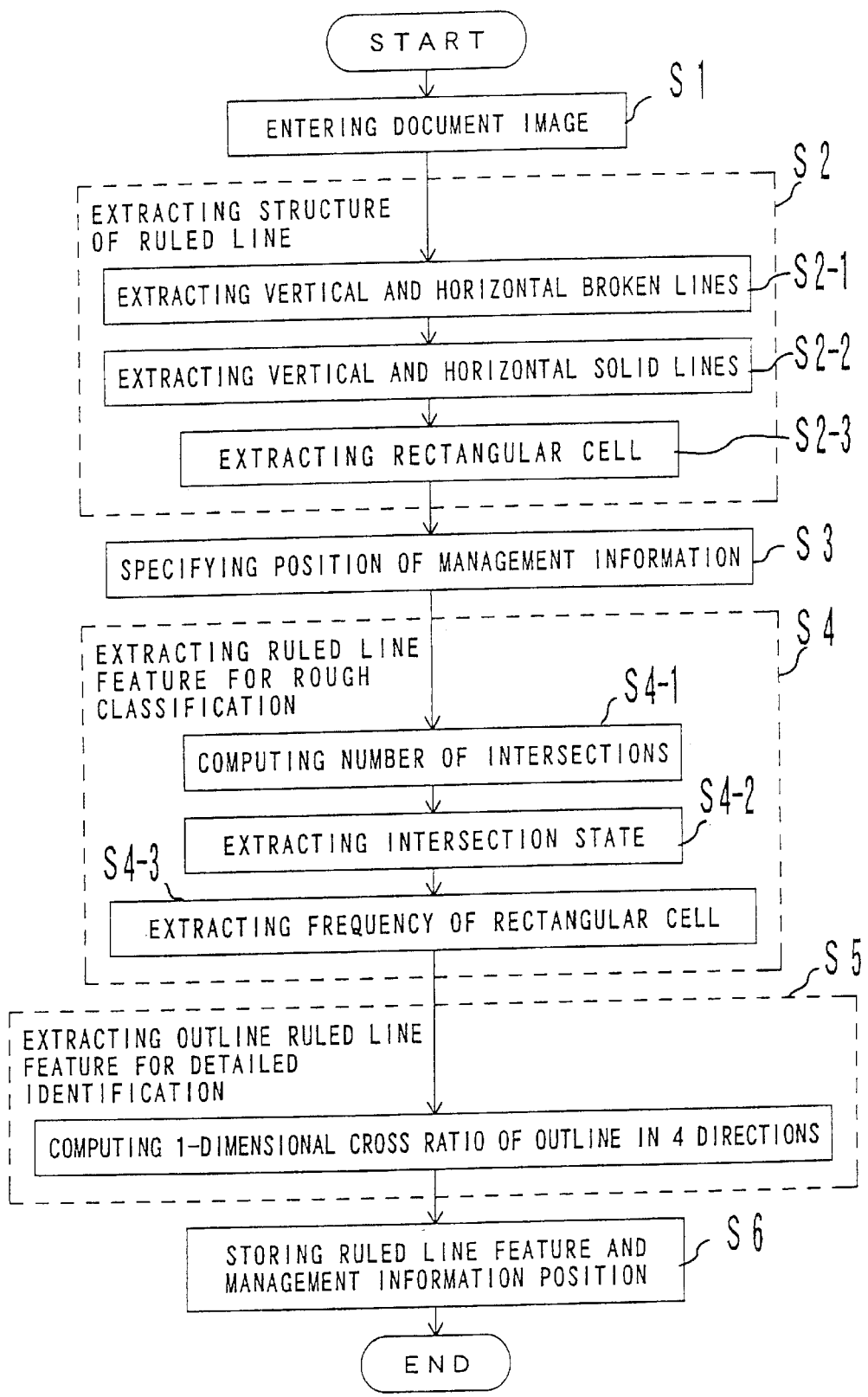
FIG. 6 is the second flowchart showing the process performed when a form is learned.
Figure 7:
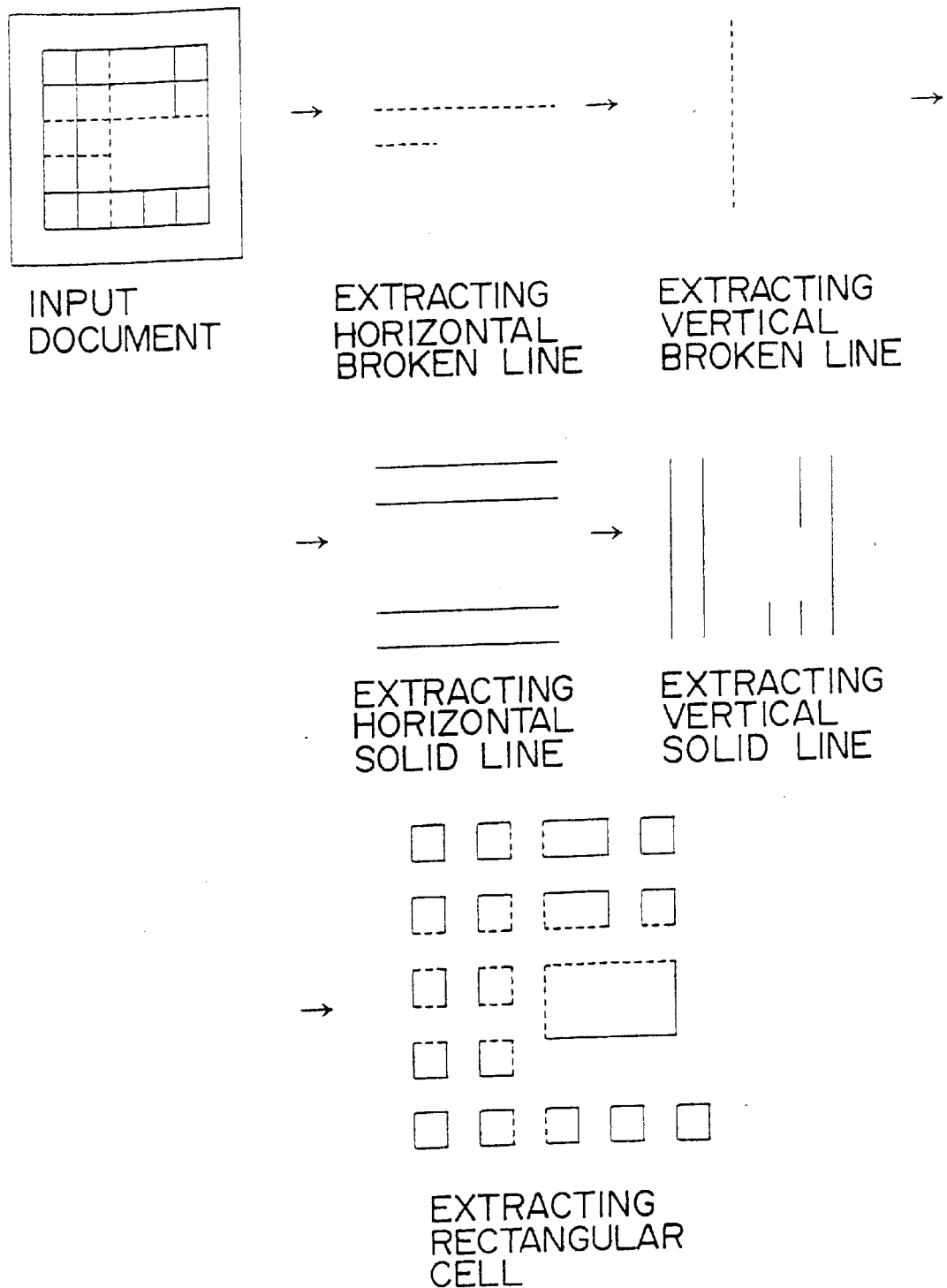
FIG. 7 shows a ruled line structure extracting process.

FIG. 6 is a flowchart showing the details of the process performed during the form learning process. In FIG. 6, the process steps corresponding to those in FIG. 3 are assigned identical numbers. In the ruled line extracting process in step S2, the management information extraction apparatus extracts vertical and horizontal broken lines (step S2-1) and vertical and horizontal solid lines (step S2-2) from an input document image as shown in FIG. 7, and then extracts a rectangular cell (rectangular area) encompassed by the vertical and horizontal ruled lines (step S2-3).

When a ruled line and a rectangular cell are extracted, technologies such as the image extraction apparatus (Japanese Patent laid-open H7-28937), the character-box extraction apparatus and the rectangle extraction apparatus (Japanese Patent Application H7-203259), etc. disclosed by the Applicant of the present invention are used. According to these technologies, a character box can be extracted or removed from the image without entering information about the position, etc. of the ruled lines in a slip. Described below is the outline of the ruled line structure extracting process.

(1) Thinning process: to thin vertical and horizontal lines in a masking process to remove the difference in thickness between characters and boxes.

(2) Segment extracting process: to extract a relatively long segment using an adjacent projection. The adjacent projection refers to a method of defining a sum of a projection value of a picture element contained in an object row or column and projection values of surrounding rows or columns, as a final projection value of the object row or column. According to the projection method, the distribution of the picture elements surrounding a specific row or column can be recognized from a global view point.

(3) Straight line extracting process: to sequentially search for extracted segments and check whether or not there is a discontinuity of a distance equal to or longer than a predetermined distance between segments. Segments having no such discontinuity are sequentially integrated to extract a long straight line.

(4) Straight line integrating process: to reintegrate extracted lines. Two or more line portions divided by a break are re-integrated into a straight line.

(5) Straight line extending process: A straight line shortened by a break is extended and restored into an original length only when the document is written as a regular slip.

(6) Determining horizontal lines forming part of a box: According to the rules indicated by 'Character Box Extraction Apparatus and Rectangle Extraction Apparatus' (Japanese Patent Application H7-203259), a pair of horizontal straight lines forming a row of entry boxes are extracted in two-line units as horizontal lines forming part of a character box frame sequentially from an upper portion of a table.

(7) Determining vertical lines forming part of a box: Vertical lines forming part of a character box frame are determined for each row of the above described entry boxes. A vertical line both ends of which reach the two horizontal lines forming part of the object row is defined as a vertical line forming part of the row.

(8) Rectangular cell extracting process: A rectangular cell encompassed by two horizontal lines and two vertical lines forming a box is extracted as a character area.

Figure 8:
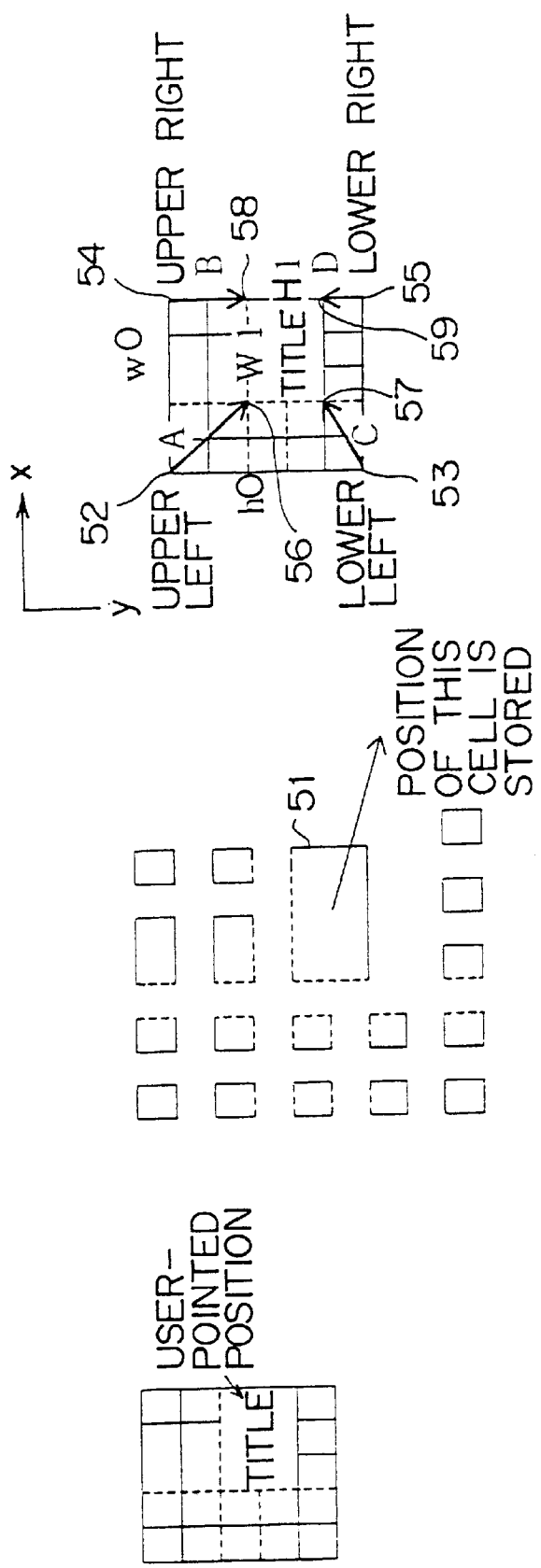
FIG. 8 shows a management information position specifying process.

Then, in the management information position specifying process in step S3, the management information extraction apparatus displays an input document image on the screen of the display unit, and instructs a user to point to any point in the character string indicating a title using a mouse as shown in FIG. 8. Then, it stores the position information of the rectangular cell 51 containing the pointed position.

The position information about a rectangular cell 51 is defined based on an arbitrary intersection on contour of a table, and corresponds to the information about the vector from the intersection to the position of the rectangular cell 51. For example, if an upper left vertex 52, a lower left vertex 53, an upper right vertex 54, and a lower right vertex 55 are start points of a vector, then the data of difference vectors A, B, C, and D from each vertex respectively to an upper left vertex 56, a lower left vertex 57, an upper right vertex 58, and a lower right vertex 59 is stored. Simultaneously, the height h0 and the width w0 of a table, and the height H1 and the width W1 of a rectangular cell are stored.

In the rough classification ruled line feature extracting process in step S4, the management information extraction apparatus first counts the intersections of the horizontal and vertical ruled lines (step S4-1). Then, the crossing state of each intersection is extracted to obtain the frequency distribution (step S4-2). The crossing state is represented by a code (K1, K2, K3, and K4) indicating the existence of a vertical or horizontal ruled line extending from the intersection, and the type of the ruled line.

Element K1 refers to a ruled line above an intersection. Element K2 refers to a ruled line below an intersection. Element K3 refers to a ruled line at the left of an intersection. Element K4 refers to a ruled line at the right of an intersection. The value of each element is 0 when no ruled lines exist, 1 when a solid line exists, or 2 when a broken line exists.

Figure 9:
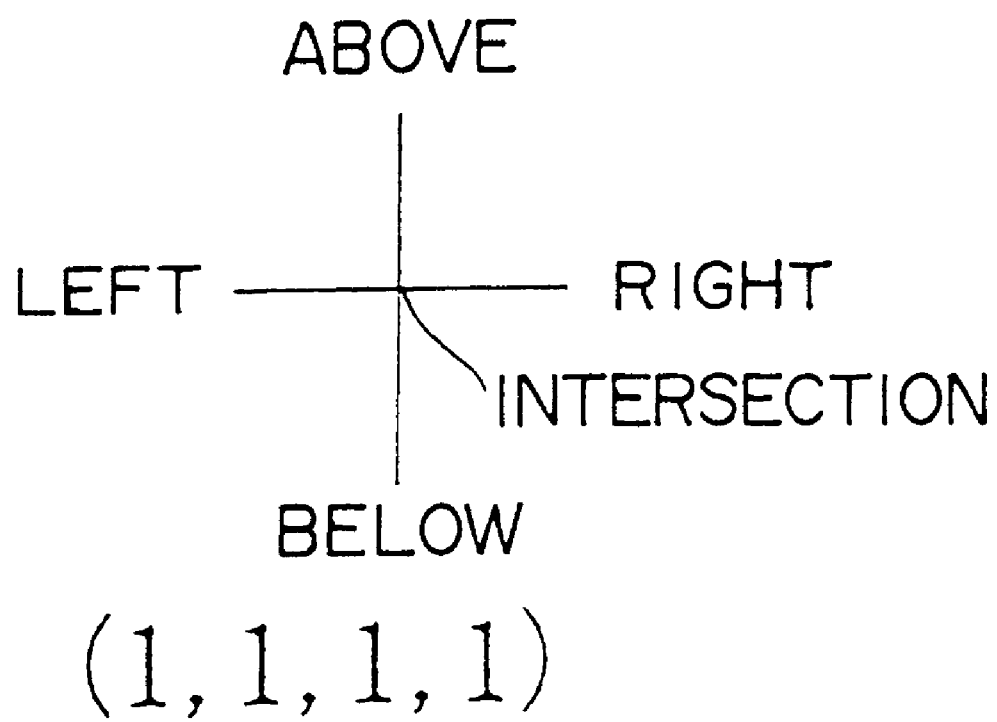
FIG. 9 shows the first ruled line feature of the rough classification.
Figure 10:
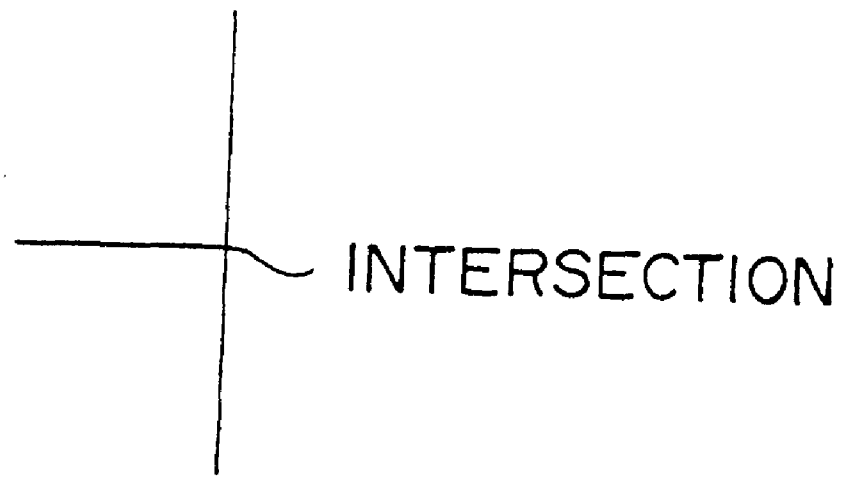
FIG. 10 shows the second ruled line feature of the rough classification.
Figure 11:
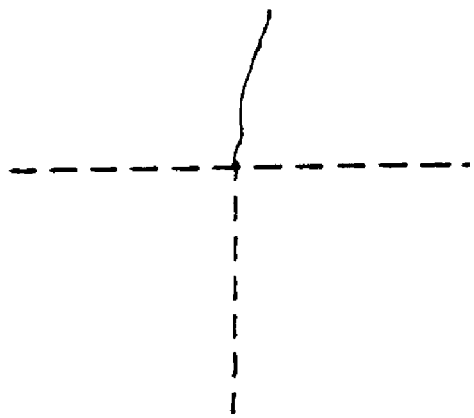
FIG. 11 shows the third ruled line feature of the rough classification.
Figure 12:
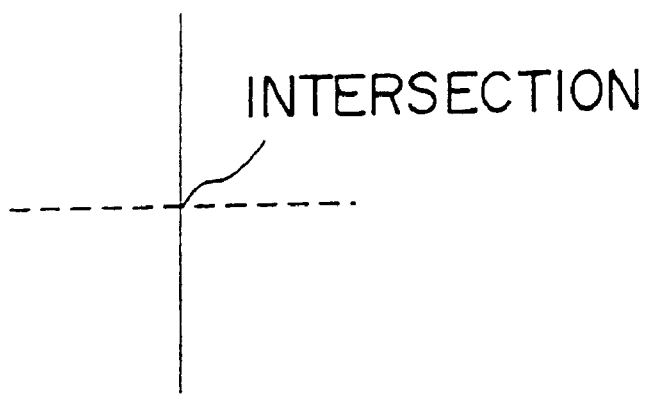
FIG. 12 shows the fourth ruled line feature of the rough classification.

For example, the crossing state of the intersection shown in FIG. 9 is represented by (1,1,1,1). The crossing state of the intersection shown in FIG. 10 is represented by (1,1,1,0). The crossing state of the intersection shown in FIG. 11 is represented by (0,2,2,2). The crossing state of the intersection shown in FIG. 12 is represented by (1,1,2,2). Since each element of (K1, K2, K3, K4) can be assigned any of three values, the number of possible codes is $3^4$ (=81). In step S4-2, an occurrence number (frequency) is obtained and stored for each code of 81 types.

Next, the width-to-height ratio of each rectangular cell is computed, and the frequency distribution is computed as that of a rectangular cell (step S4-3). When the height of a rectangular cell is H1 and its width is W1, the width-to-height ratio can be represented by W1/H1. The frequency distribution of the width-to-height ratio can be obtained by increasing the value of W1/H1 by 0.5 in succession starting from 0, and counting the rectangular cells having the width-to-height ratio corresponding to each value. At this time, rectangular cells exceeding a threshold (for example, 10) are collectively counted.

In the detailed identification outline ruled line feature extracting process in step S5, the management information extraction apparatus first retrieves an intersection string comprising four intersections from outside in the horizontal and vertical directions in each row or column containing intersections in series.

Figure 13:
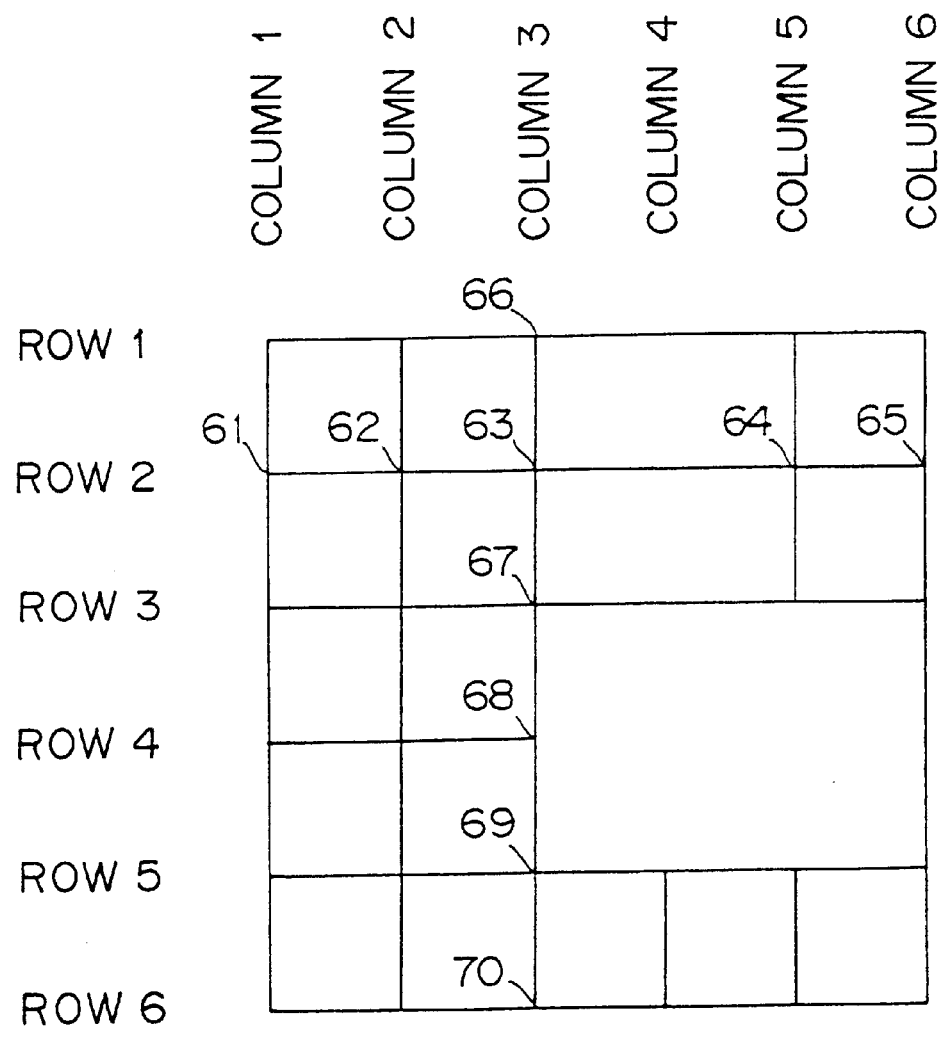

For example, in the case of the ruled line structure shown in FIG. 13, intersections 61, 62, 63, and 64 are retrieved when four intersections are retrieved sequentially from the left end in the second row. Intersections 65, 64, 63, and 62 are retrieved when four intersections are retrieved sequentially from the right end in that row. Intersections 66, 63, 67, and 68 are retrieved when four intersections are retrieved sequentially from the top in the third column. Intersections 70, 69, 68, and 67 are retrieved when four intersections are retrieved sequentially from the bottom in that column.

Figure 14:
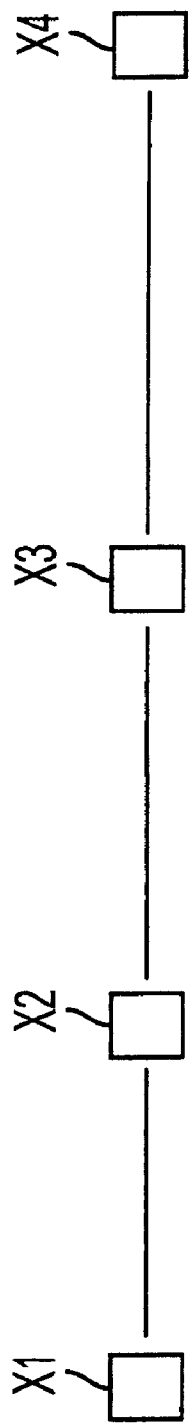
FIG. 14 shows an intersection string.
Figure 15:
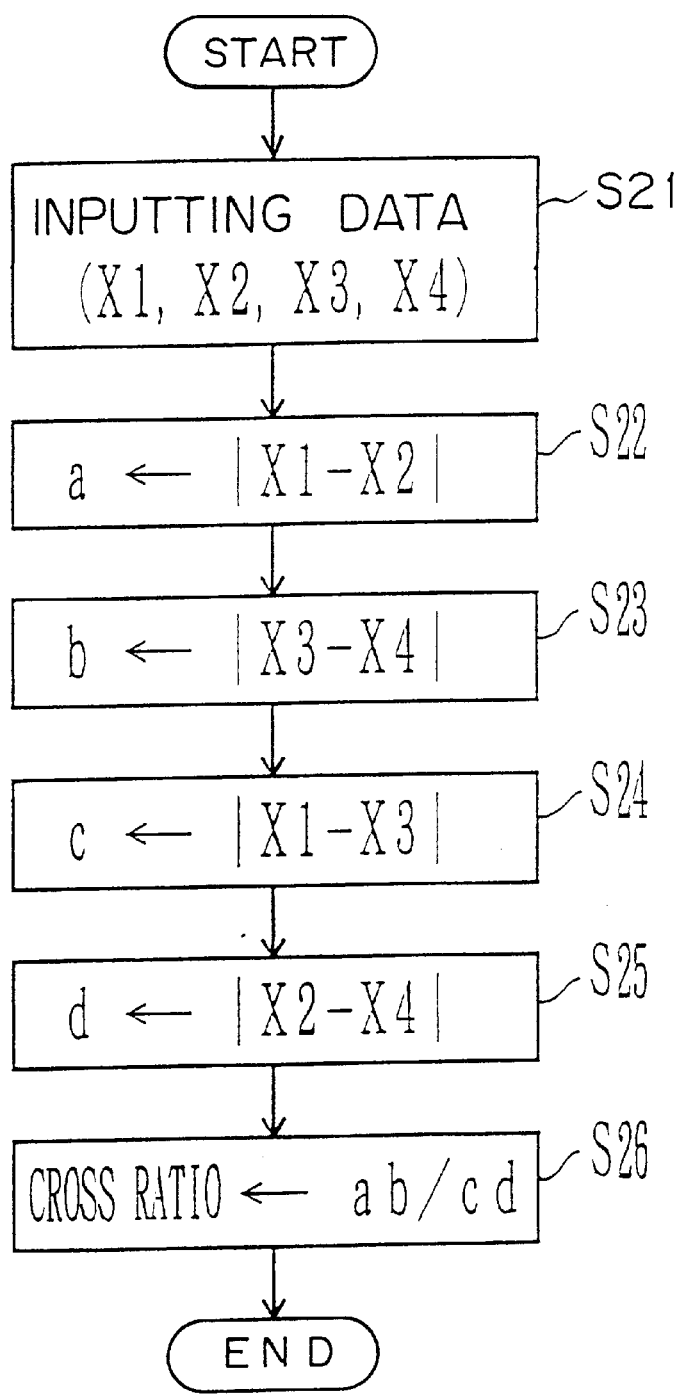
FIG. 15 is a flowchart showing a cross ratio computation process.

The cross ratio of the one-dimensional projective invariants relating to the retrieved intersection string is computed. For example, if an intersection string comprising four intersections X1, X2, X3, and X4 is retrieved as shown in FIG. 14, the cross ratio is expressed as follows.

$$\text{CROSS RATIO} = \frac{|X1-X2| \ |X3-X4|}{|X1-X3| \ |X2-X4|} \quad (1)$$

where |Xi–Xj| indicates the width (distance) between intersections Xi and Xj (i, j=1, 2, 3, or 4). The cross ratio of equation (1) is computed according to, for example, the flowchart shown in FIG. 15. When the cross ratio computing process is started, the management information extraction apparatus inputs the coordinate data of the four intersections X1, X2, X3, and X4 (step S21).

Then, the distance between intersections X1 and X2 is computed and input to variable a (step S22), the distance between intersections X3 and X4 is computed and input to variable 6 (step S23), the distance between intersections X1 and X3 is computed and input to variable c (step S24), and the distance between intersections X2 and X4 is computed and input to variable d (step S25). Next, ab/cd is computed and the result is stored as a cross ratio (step S26), and then, the process is terminated.

Figure 16:
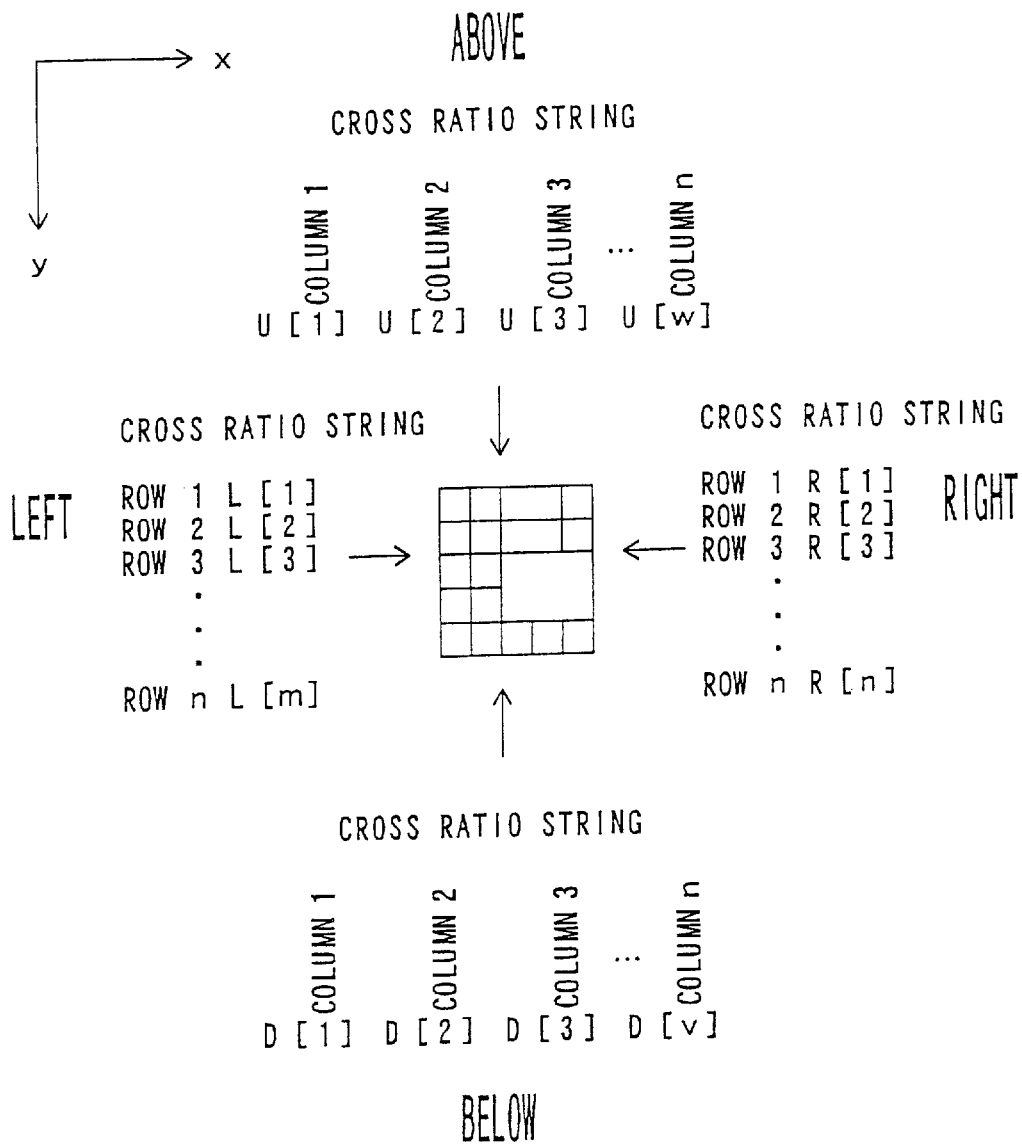
FIG. 16 shows the feature of the ruled lines indicating an outline using a cross ratio.

Thus, the features of a sequence of intersections around the outline of a table can be quantified by computing the cross ratio of all intersection strings. As a result, the two dimensional features of the outline of the table is represented by a sequence of one-dimensional values as shown in FIG. 16. The sequence of values of a cross ratio is hereinafter referred to as a cross ratio string.

In FIG. 16, the right cross ratio string R[1], R[2], R[3], . . . , R[n] corresponds to the cross ratio indicating the feature of the rightmost portion of each row. The left cross ratio string L[1], L[2], L[3], . . . , L[m] corresponds to the cross ratio indicating the feature of the leftmost portion of each row. The upper cross ratio string U[1], U[2], U[3], . . . , U[w] corresponds to the cross ratio indicating the feature of the top portion of each row. The lower cross ratio string D[1], D[2], D[3], . . . , D[v] corresponds to the cross ratio indicating the feature of the bottom portion of each row.

Normally, since the ruled line structure is not symmetrical at the leftmost and rightmost portions of a table, or there may be a break or distortion in a line in a part of an image, n does not always match m. Similarly, w does not necessarily match v.

By integrating these cross ratio strings in the four directions into a single string, a feature vector (R[1], . . . , R[n], L[1], . . . , L[m], U[1], . . . , U[w], D[1], . . . , D[v]) having the values of respective cross ratios as elements can be generated.

In this example, the ratios of the distances among four intersections are used as the features of the ruled lines indicating the outline for detailed identification. Instead, the ratios of the distances among any number (at least two) of intersections can be used. Also in this case, the feature of the outline can be represented by arranging the ratios in a one-dimensional array.

In the process in step S6, the management information extraction apparatus stores in the layout dictionary 31 the position of the management information specified in step S3 and the feature of the ruled lines obtained in steps S4 and S5 as the identification information (form information) about a table-formatted document.

Each process performed during the operation is described below by referring to FIGS. 17 through 22.

Figure 17:
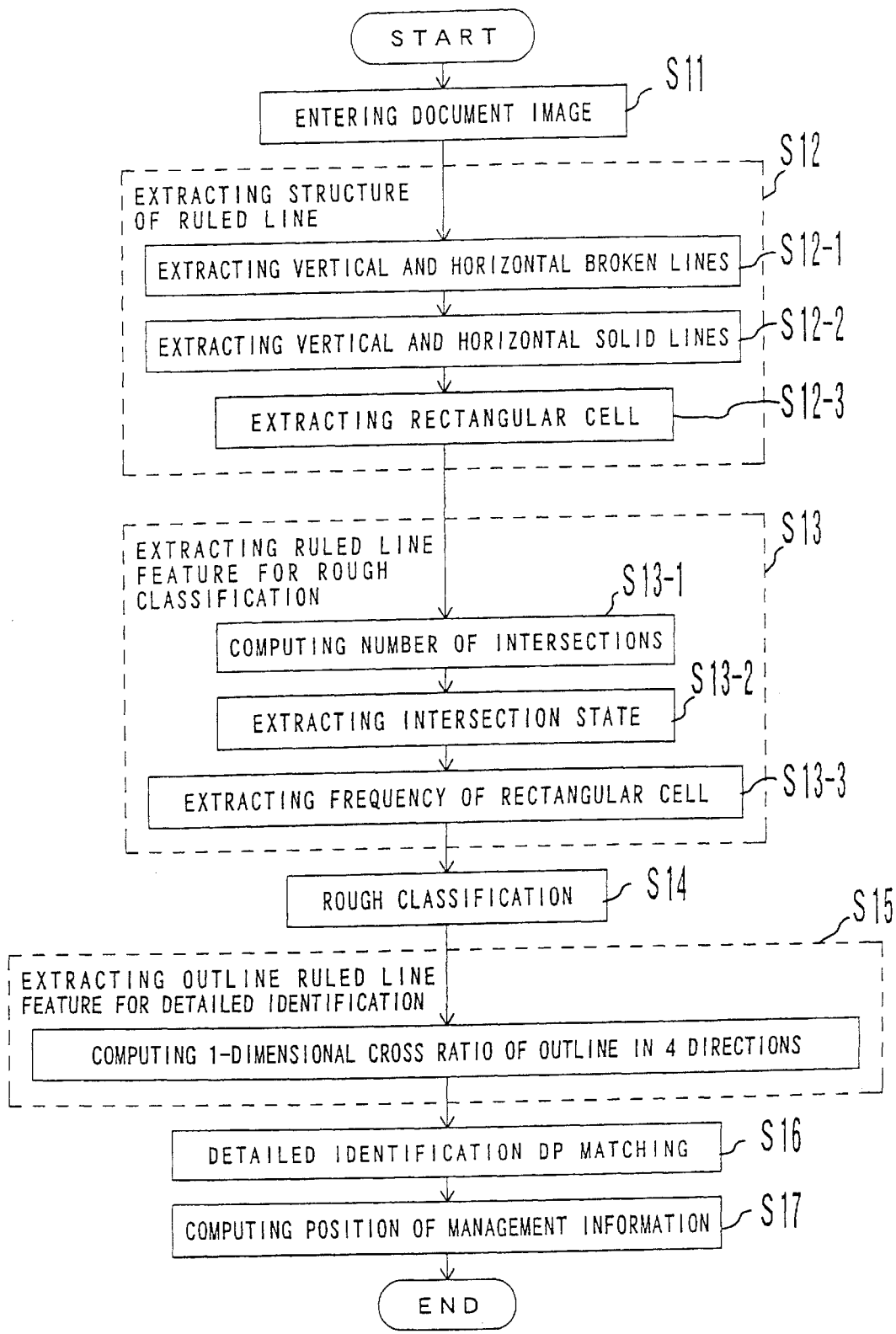
FIG. 17 is the second flowchart showing the process performed during the operation.

FIG. 17 is a flowchart showing the details of the process performed in learning a form. In FIG. 17, the process step corresponding to the step shown in FIG. 4 is assigned the same identification number. First, in the ruled line structure extracting process in step S12, the management information extraction apparatus extracts a vertical and horizontal broken line (step S12-1), a vertical and horizontal solid line (step S12-2), and a rectangular cell encompassed by the vertical and horizontal ruled lines (step S12-3) from an input document image as in the process in step S2 performed in learning a form.

In the rough classification ruled line feature extracting process in step S13, the management information extraction apparatus counts the intersections between horizontal and vertical ruled lines (step S13-1), obtains the frequency distribution of the crossing state of each intersection (step S13-2), and computes the frequency distribution of the width-to-height ratio of each rectangular cell as in the process in step S4 in learning a form.

In the rough classification process in step S14, the management information extraction apparatus compares the obtained data with the form information about a number of tables in the layout dictionary 31 using the number of intersections, the frequency distribution of crossing states, and the frequency distribution of the width-to-height ratios of rectangular cells in order to limit the number of candidates for a corresponding table. In this example, appropriate predetermined thresholds are set for respective features of the number of intersections, the frequency of crossing states, and the frequency of width-to-height ratios of rectangular cells in consideration of a break or distortion in lines of an image. If the form information of the layout dictionary 31 matches the information about the input image within a predetermined allowance, it is defined as a candidate for the table.

For example, assuming that the number of intersections of an input document image is Ki and the number of intersections of a form t stored in the layout dictionary 31 is Kt, the form t is defined as a candidate if the absolute value |Ki−Kt| of the difference between the values is within the threshold THk. Thus, if the differences between the elements of the input element and the form information in the layout dictionary 31 are all within respective thresholds, then the form is determined as a candidate for the form corresponding to the input document.

Since the features of the number of intersections, crossing states, the frequency distribution of the sizes of rectangular cells, etc. are normally stable against the fluctuation of image data, they can be used to precisely compare data with a document image indicating a break or distortion in its lines.

In the detailed identification outline ruled line feature extracting process in step S15, the management information extraction apparatus computes the cross ratio of the one-dimensional projective invariants from four directions as in the process in step S5 performed in learning a form.

In the detailed identification process in step S16, the management information extraction apparatus compares cross ratio strings only for the candidates for a table according to the rough classification. In this process, the cross ratio strings are associated between the input form and the learned form individually in the four directions. Since the structure of the object form is a table, the sequence of the ruled lines is not inverted between rows or columns. Therefore, a dynamic programming (DP) matching is performed only with the partial loss of a ruled line due to a break or distortion taken into account.

A DP matching is well-known as a method of matching time-series data such as voice, etc. which is described in detail by, for example, the "Pattern Recognition", p.62–p.67 by Noboru Funakubo, published by Kyoritsu Publications. In this method, similarity is assigned to a local feature of data and an evaluation function indicating the acceptability of the entire correspondence is defined using the assigned similarity when two data sets are compared. The correspondence of data is determined to obtain the highest value of the evaluation function.

Figure 18:
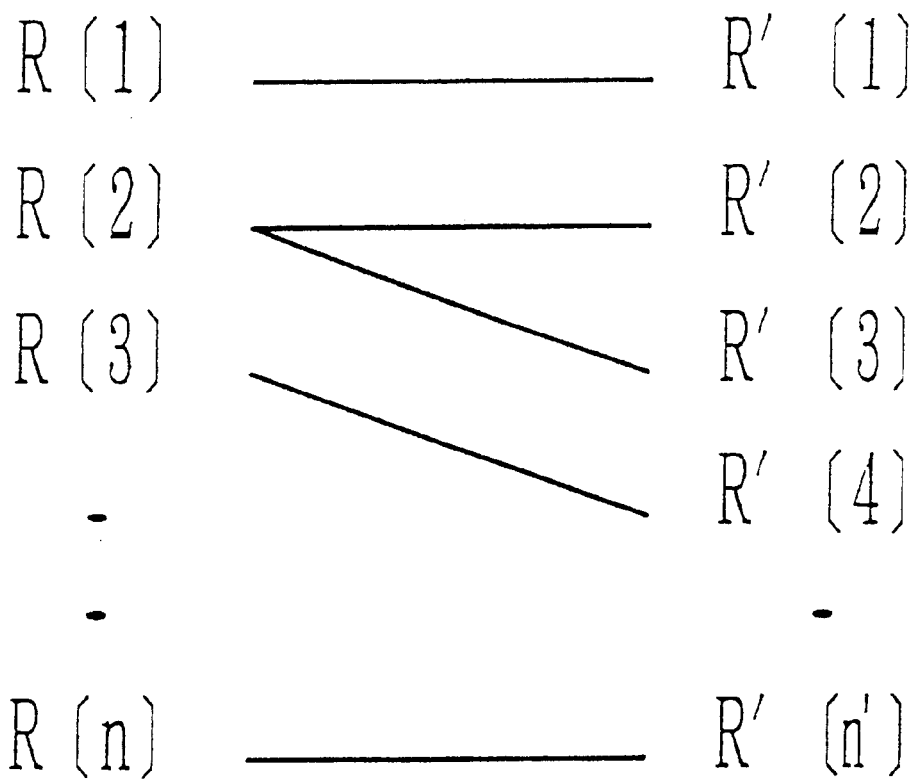
FIG. 18 shows a DP matching.

FIG. 18 shows the comparing process of the right cross ratio string using the DP matching. In FIG. 18, the right cross ratio string R[1], R[2], R[3], . . . , R[n] of the input form corresponds to the right cross ratio string R'[1], R'[2], R'[3], . . . , R'[n']) of the learned form in the layout dictionary 31.

In this comparing process, the reliability of a ruled line is-taken into account and the weight value of the correspondence for an evaluation function is different between the cross ratio of an intersection string obtained from a reliable ruled line and the cross ratio obtained from other ruled lines. For example, the similarity of the cross ratio obtained from a reliable ruled line is assigned a higher weight value.

Figure 19:
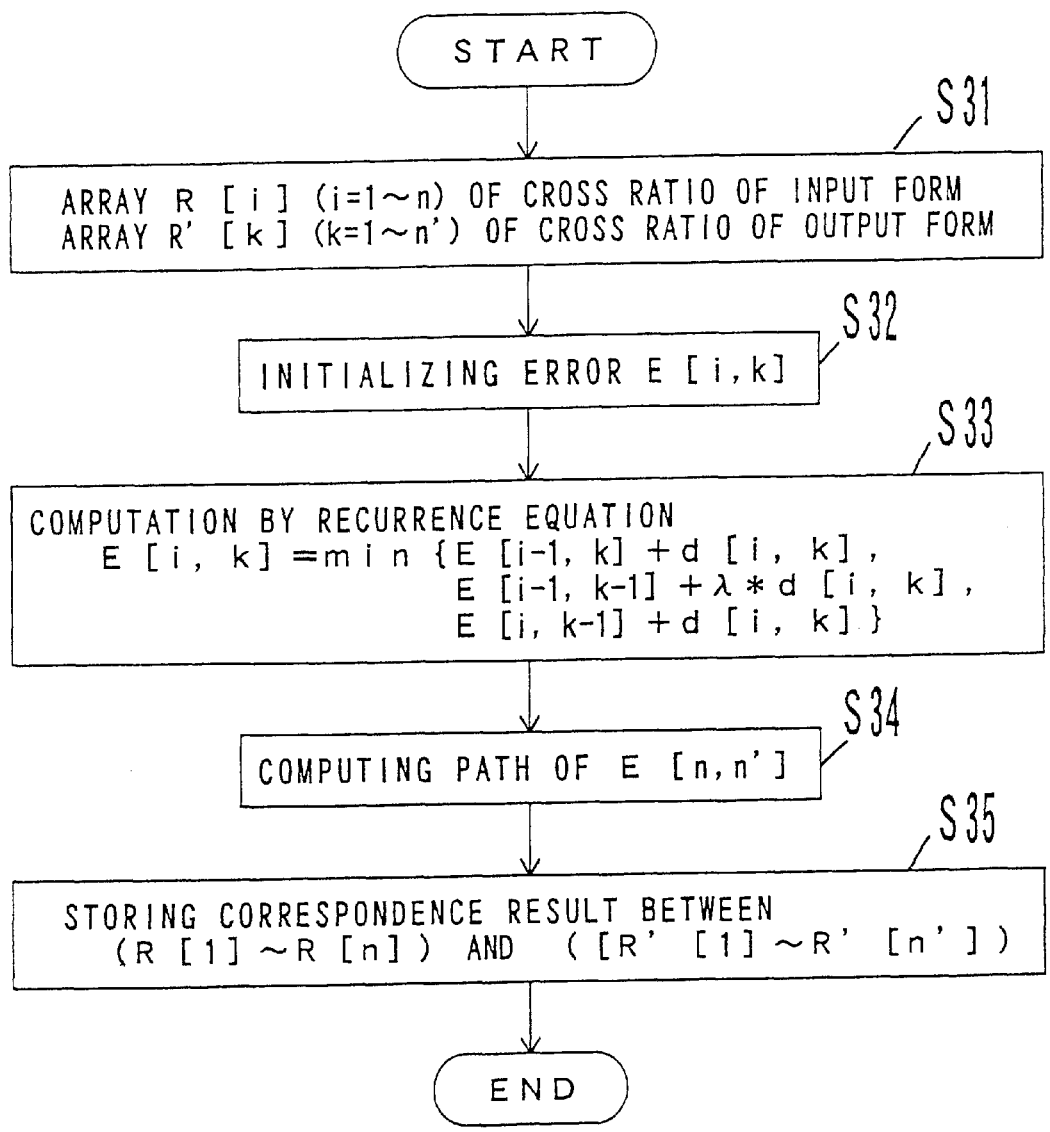
FIG. 19 is a flowchart showing a DP matching process.

FIG. 19 is a flowchart showing an example of the comparing process for the right cross ratio string using the DP matching. When the process starts, the management information extraction apparatus first stores the right cross ratio string of the input form in the array R[i] (i=1, . . . , n), and stores the right cross ratio string of the learned form in the array R'[k] (k=1, . . . , n')(step S31).

Then, the error array E[i, k] is initialized (step S32), and a computation is performed by the following recurrence equation on i=1, . . . , n, k=1, . . . , n' (step S33).

$$E[i, k] = \min\{E[i-1, k] + d[i, k],$$
$$E[i-1, k-1] + \lambda * d[i, k],$$
$$E[i, k-1] + d[i, k]\}$$
(2)

where E[i, k] indicates the minimum value of error accumulation when a part of the cross ratio string (R[1], . . . , R[i]) is associated with (R'[1], . . . , R'[k]). Therefore, when the accumulation error during the computing operation is used as an evaluation function, E[i, k] provides its minimum value. d[i, k] indicates an error when R[i] is associated with R'[k], and computed, for example, by the following equation.

$$d[i,k]=|R[i]-R'[k]|$$
(3)

where $\lambda$ indicates a weight value for d[i, k], and min{ } indicates the minimum value among the elements in the { }.

Next, the path of E [n, n'], which includes correspondence relations of cross ratios used to determine the value of E [n, n'] is computed (step S34). Then, the result is stored as the correspondence between the cross ratio strings (R[1], . . . , R[n]) and (R'[1], . . . , R'[n']) (step S35), and the process terminates. Thus, the correspondence between cross ratios is determined to obtain the minimum value of the evaluation function. The comparing processes on the left, top, and bottom cross ratio strings are performed similarly.

In step S16, such a one-dimensional DP matching is performed on all learned forms obtained by the rough classification, and the form indicating the minimum (best) evaluation function is determined to be the form corresponding to the input form. Thus, in the detailed identification, a high-speed process can be performed by the identification using the features of the outline (contour) of a table structure through the one-dimensional matching.

In the management information position computing process in step S17, the management information extraction apparatus refers to the layout dictionary 31, retrieves the position information about the learned form specified in the detailed identification, and extracts the management information from the input image according to the retrieved position information.

In this process, the matching level is checked at the intersection (end point) at both ends of each row and each column using the result of the correspondence of the cross ratio string in the above described DP matching to determine whether or not the end points are stable. A matching level at an end point refers to the probability of the correspondence between the cross ratio of an input form and the cross ratio of a learned form.

For example, since R[1] and R'[1] uniquely (one-to-one) correspond to each other in FIG. 18, it is determined that the right end point of the first row is stable. Since R[3] and R'[4] also correspond one-to-one to each other, the right end point of the corresponding row is stable. However, since R[2] corresponds to both R'[2] and R'[3] and does not uniquely correspond to either of them, it is determined that the right end point of the corresponding row is not stable. Thus, the stable end point for each of the upper left, lower left, upper right, and lower right vertex is obtained and defined as a stable point on the outline.

Next, the height h0 and the width w0 of the tables of the input form and the learned form are obtained based on stable outline points, and are compared with each other to obtain the relative ratios between the heights and the widths of the tables of the learned form and the input form. Then, the position of the management information is computed based on the difference vectors A, B, C, and D shown in FIG. 8, and the height H1 and the width W1 of the rectangular cell.

The above described ratio indicates either an enlargement ratio or a reduction ratio of the table of an input form to the table of a learned form, and is used to normalize the fluctuation between the tables.

For example, when the ratios of the height and the width of the input form to those of the table shown in FIG. 8 are α, the difference vectors A, B, C, and D are multiplied by α. Then, in the table of the input form, the approximate position of the upper left vertex of the rectangular cell containing the management information is obtained. Similarly, the approximate positions of the upper right, lower left, and lower right vertexes of the rectangular cell can be obtained using the vectors obtained by multiplying the difference vectors B, C, and D by α, with the stable outline points at the upper right, lower left, and lower right vertexes as starting points.

Next, a rectangular cell which is located near the obtained positions and is nearly equal to H1*α and W1*α respectively in height and width is searched for. Then, the data in the rectangular cell such as a character string, etc. is extracted as requested management information.

Figure 20:
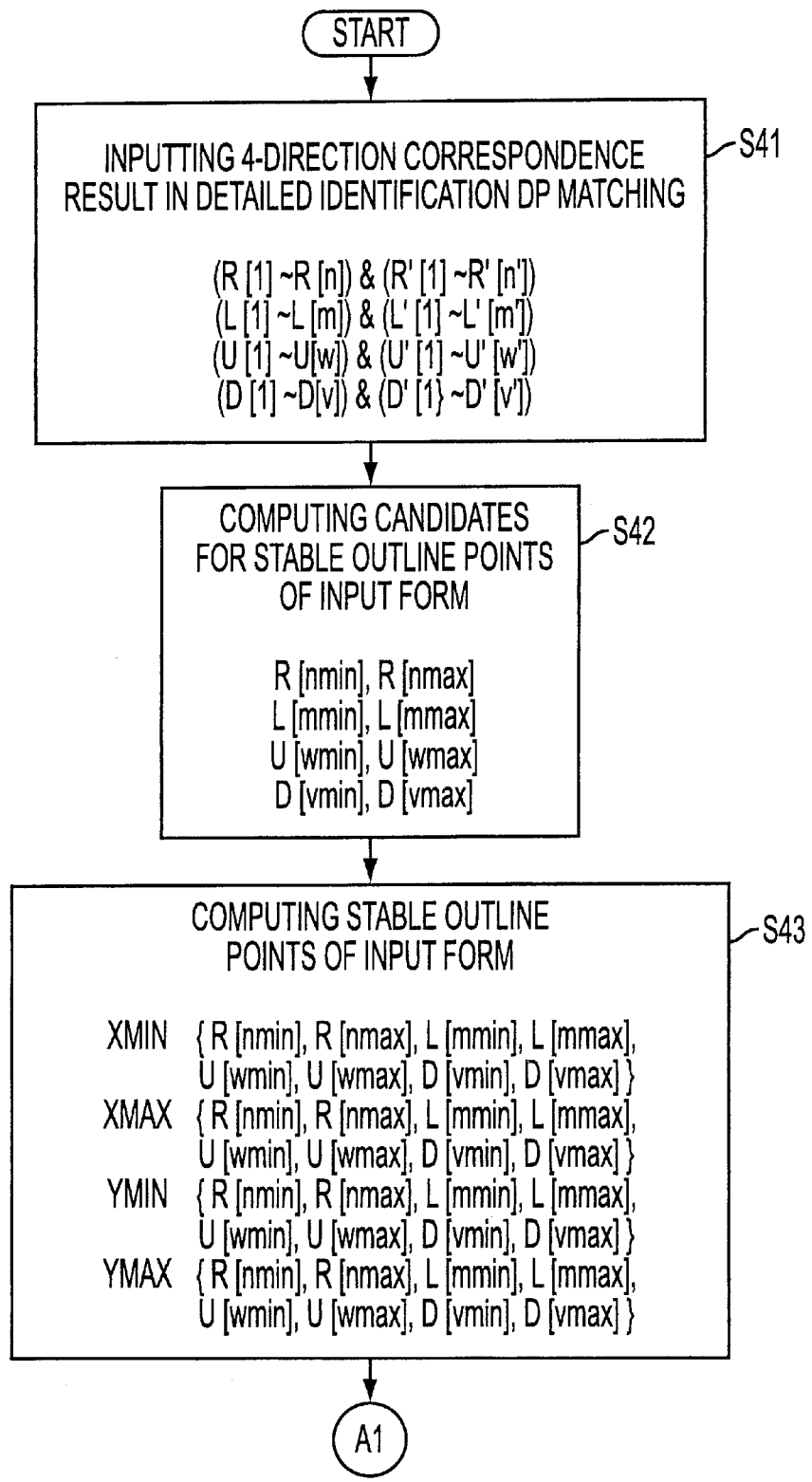
FIG. 20 is a flowchart (1) showing a management information position computing process.
Figure 21:
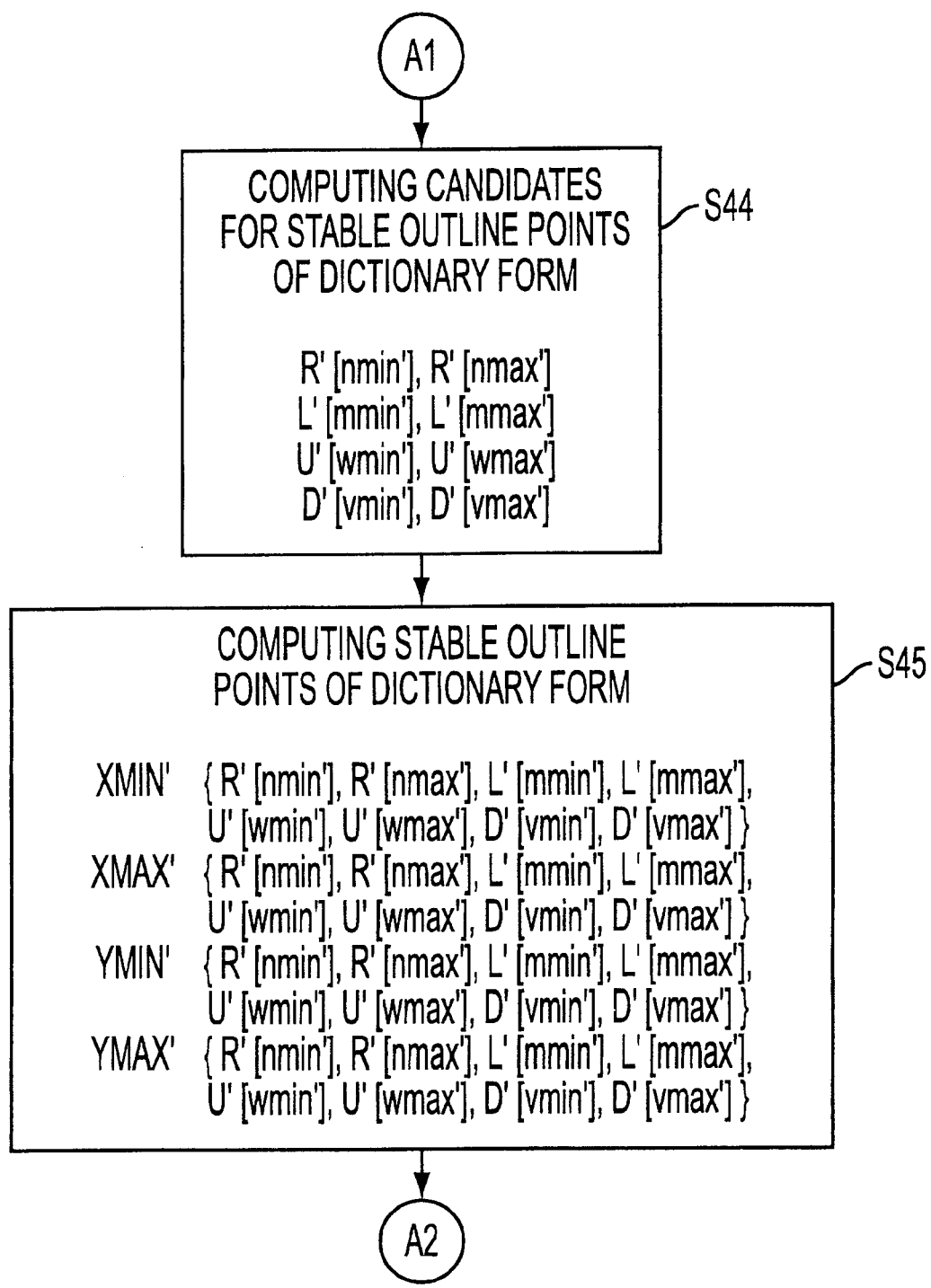
FIG. 21 is a flowchart (2) showing a management information position computing process.
Figure 22:
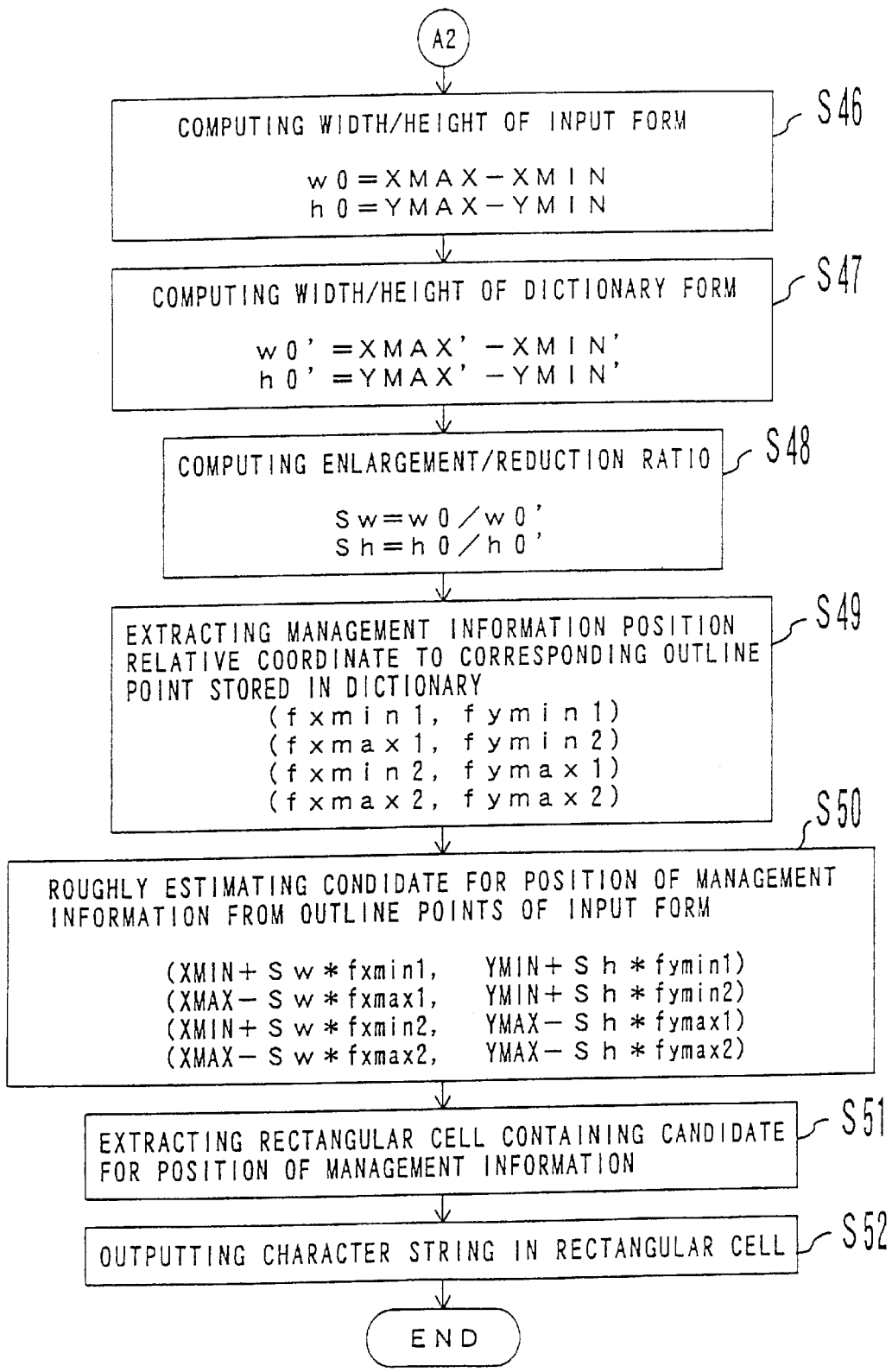
FIG. 22 is a flowchart (3) showing a management information position computing process.

FIGS. 20, 21, and 22 are flowcharts showing an example of the management information position computing process. When the process starts, the management information extraction apparatus first inputs the result of associating the cross ratio strings in the four directions during the DP matching (step S41).

In this process, the results of associating the right cross ratio string (R[1], ..., R[n]) with (R'[1], ..., R'[n']), the left cross ratio string (L[1], ..., L[m]) with (L'[1], ..., L'[m']), the upper cross ratio string (U[1], ..., U[w]) with (U'[1], ..., U'[w']), and the lower cross ratio string (D[1], ..., D[v]) with (D'[1], ..., D'[v'] are input.

Next, stable end points of the input form are computed from the data, and are defined as candidates for stable outline points (step S42). The cross ratios corresponding to the candidates are respectively expressed as R[nmin], R[nmax], L[mmin], L[mmax], U[wmin], U[wmax], D[vmin], and D[vmax].

'nmin' indicates the row number of the uppermost point corresponding to the minimum y coordinate value of all stable rightmost points in the table. 'nmax' indicates the row number of the lowermost point corresponding to the maximum y coordinate value of all stable rightmost points in the table. 'mmin' indicates the row number of the uppermost point of all stable leftmost points in the table. 'mmax' indicates the row number of the lowermost point of all stable leftmost points in the table.

'wmin' indicates the column number of the leftmost point corresponding to the minimum x coordinate value of all stable uppermost points in the table. 'wmax' indicates the column number of the rightmost point corresponding to the maximum x coordinate value of all stable uppermost points in the table. 'vmin' indicates the column number of the leftmost point of all stable lowermost points in the table. 'vmax' indicates the column number of the rightmost point of all stable lowermost points in the table.

Then, the position of the stable outline points are computed according to the data of obtained candidates (step S43). The maximum and minimum values of the x and y coordinates of each candidate are obtained and the values are used as coordinate elements of stable outline points.

In FIG. 20, for example, XMIN {R[nmin], R[nmax], L[mmin], L[mmax], U[wmin], U[wmax], D[vmin], and D[vmax]} indicates the minimum value of the x coordinate of the end point corresponding to the value of each cross ratio in { }. Similarly, XMAX { } indicates the maximum value of the x coordinate of each end point, YMIN { } indicates the minimum value of the y coordinate of each end point, and YMAX { } indicates the maximum value of the y coordinate of each end point.

These values XMIN { }, XMAX { }, YMIN { }, and YMAX { } are respectively represented by XMIN, XMAX, YMIN, and YMAX for simplicity. At this time, the coordinates of the stable outline points at the upper left, upper right, lower left, and lower right portions are respectively represented by (XMIN, YMIN), (XMAX, YMIN), (XMIN, YMAX), and (XMAX, YMAX).

Then, the stable end points of the dictionary form, that is, a learned form, are computed and defined as candidates for stable outline points (step S44 in FIG. 21). The cross ratios corresponding to the candidates are respectively represented by R' [nmin'], R'[nmax'], L'['mmin'], L'[mmax'], U'[wmin'], U'[wmax'], D'[vmin'], and D'[vmax'].

The meanings of nmin', nmax', 'mmin', mmax', wmin', wmax', vmin', and vmax' are the same as the meanings of the above described nmin, nmax, mmin, mmax, wmin, wmax, vmin, and vmax.

Using the obtained data of the candidates, the positions of the stable outline points of the dictionary form are computed as in step S43 (step S45). In FIG. 21, the meanings of XMIN' { }, XMAX' { }, YMIN' { }, and YMAX' { } are the same as those of the above described XMIN { }, XMAX { }, YMIN { }, and YMAX { }.

These values XMIN' { }, XMAX' { }, YMIN' { }, and YMAX' { } are respectively represented by XMIN', XMAX', YMIN', and YMAX' for simplicity. At this time, the coordinates of the stable outline points at the upper left, upper right, lower left, and lower right portions are respectively represented by (XMIN', YMIN'), (XMAX', YMIN'), (XMIN', YMAX'), and (XMAX', YMAX').

According to the coordinate information about the stable outline points obtained in step S43, the height h0 and the width w0 of the input form are computed by the following equations (step S46 in FIG. 22).

$$w0 = X\text{MAX} - X\text{MIN} \quad (4)$$

$$h0 = Y\text{MAX} - Y\text{MIN} \quad (5)$$

According to the coordinate information about the stable outline points obtained in step S45, the height h0' and the width w0' of the dictionary form are computed by the following equations (step S47).

$$w0' = X\text{MAX}' - X\text{MIN}' \quad (6)$$

$$h0' = Y\text{MAX}' - Y\text{MIN}' \quad (7)$$

Using the heights h0 and h0' and widths w0 and w0', the ratios Sw and Sh (enlargement ratio or reduction ratio) of the size of the input form to the size of the dictionary form are computed (step S48).

$$Sw = w0/w0' \quad (8)$$

$$Sh = h0/h0' \quad (9)$$

The size of the element of the difference vector having a stable outline point of a table of a dictionary form as a starting point is obtained as a relative coordinate value indicating the position of management information (step S49). In this case, the difference vector from a plurality of outline points near each vertex in the outline points corresponding to the cross ratios R'[1], ..., R'[n'], L'[1], ..., L'[m'], U'[1], ..., U'[w'], and D'[1], ..., D'[v'] is assumed to be preliminarily stored as position information in the dictionary 31.

The relative coordinate values from the upper left, upper right, lower left, and lower right stable points are respectively set as (fxmin1, fymin1), (fxmax1, fymin2), (fxmin2, fymax1), and (fxmax2, fymax2).

Then, based on the relative coordinate values and the ratios Sw and Sh of the size of the input form to the size of the dictionary form, the rough estimation of the position of the management information in the input form is performed (step S50). In this process, four points having the following coordinate values are obtained as candidates for the position of the management information.

(*X*MIN+*Sw*\**fx*min1, *Y*MIN+*Sh*\**fy*min1)

(*X*MAX−*Sw*\**fx*max1, *Y*MIN+*Sh*\**fy*min2)

(*X*MIN+*Sw*\**fx*min2, *Y*MAX−*Sh*\**fy*max1)

(*X*MAX−*Sw*\**fx*max2, *Y*MAX−*Sh*\**fy*max2)

Next, a rectangular cell of an input form containing the positions of these candidates is extracted (step S51). If the height of the cell is nearly Sh times the height H1 of the rectangular cell specified in the dictionary form and the width of the cell is nearly Sw times the width W1 of the rectangular cell specified in the dictionary form, then it is determined that the rectangular cell contains management information.

Then, the, image data of a character string, etc. in the rectangular cell is output as management information (step S52), thereby terminating the process. Thus, the management information is extracted from an input image according to the result of detailed identification.

In this example, the dictionary 31 stores difference vectors with a part of a plurality of outline points corresponding to the cross ratios of the dictionary form as starting points. However, difference vectors from all outline points can be preliminarily stored to select not only the outline points near the vertexes of the table but also optional outline points on the perimeter as stable outline points.

It is not always required to extract four stable outline points. That is, based on any one stable outline point as a reference point, the position of management information can be obtained using the relative coordinate values from the position of the reference point to quickly perform the process. In general, the number of stable outline points for the process is specified arbitrarily.

In step S51, a rectangular cell containing four candidate positions is extracted. However, a rectangular cell containing one or more candidate positions can be extracted, or a rectangular cell whose distance from one or more candidate positions is within a predetermined value can be extracted.

In the above described management information extracting process, the form of an input document and the position of management information can be automatically learned and stored in the layout dictionary 31. According to the information, various table-formatted documents can be processed and the position of the management information can be computed with high precision.

Described below in detail is the method of specifying the position of the management information in step S3 shown in FIG. 6. In the present embodiment, the method of specifying the position of management information by a user can be followed in either a user entry mode in which the user is instructed to explicitly specify the position or an automatic learning mode in which a candidate for the management information is automatically extracted.

In the user entry mode, the management information extraction apparatus instructs the user to directly specify the position of management information from among a number of rectangular cells forming a table as shown in FIG. 8. For example, if there are a large number of documents having the same form of design drawings, etc. and the position of the management information is specified on the first document, then only the position information should be read from the second and the subsequent ones, thereby realizing a batch input using an automatic document feeder.

In the automatic learning mode, a plurality of areas which are candidates for an area containing management information are extracted using the title extracting technology described in the former application Ser. No. 08/694,503 which is now U.S. Pat. No. 6,035,061, the position of an area selected by the user from among the plurality of areas is automatically learned, and the position is defined as the first candidate in the subsequent operations. If the user does not select any of the candidates, but optionally specifies a new position, then information of that position is automatically input in the user's interactive operation.

Otherwise, the title extracting technology disclosed by the former application can be applied to the user entry mode to select management information from among a plurality of candidates. In this case, a form is recognized or identified in the process shown in FIG. 4 in the automatic learning mode to check whether or not an input image matches the form in the dictionary 31. If the input image matches any of the forms in the dictionary 31, its position information is retrieved and presented to the user. Unless the input image matches any of the forms in the dictionary 31, a candidate for the management information is extracted through the title extracting technology of the former application.

Figure 23:
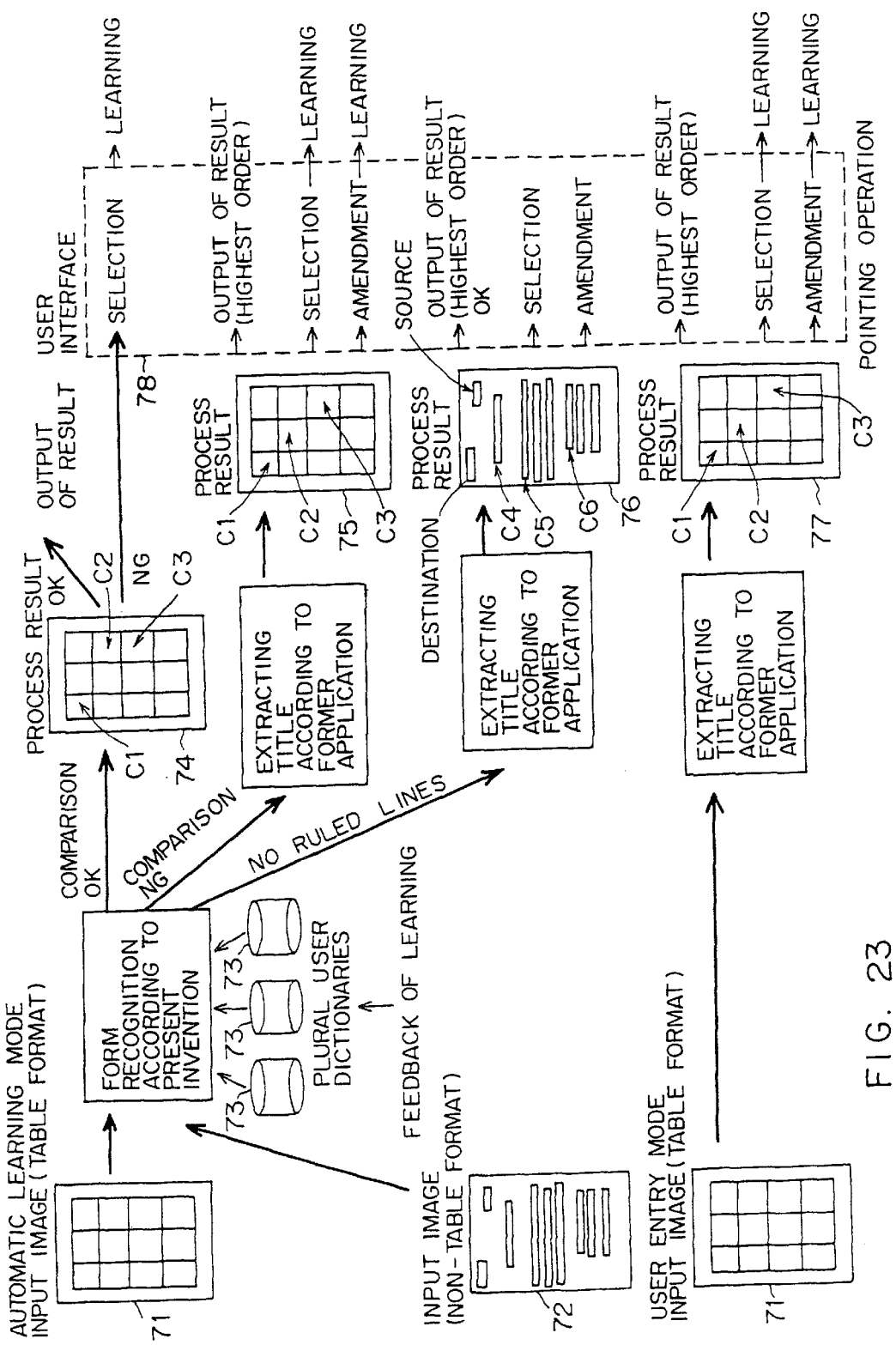
FIG. 23 shows a process of extracting management information using a user entry mode and an automatic learning mode.

FIG. 23 shows the management information extracting process with the above described two modes. In the user entry mode shown in FIG. 23, the management information extraction apparatus first extracts a plurality of candidates for management information from an input image 71 of a table-formatted document in the intractable title extracting process based on the former application.

Figure 24:
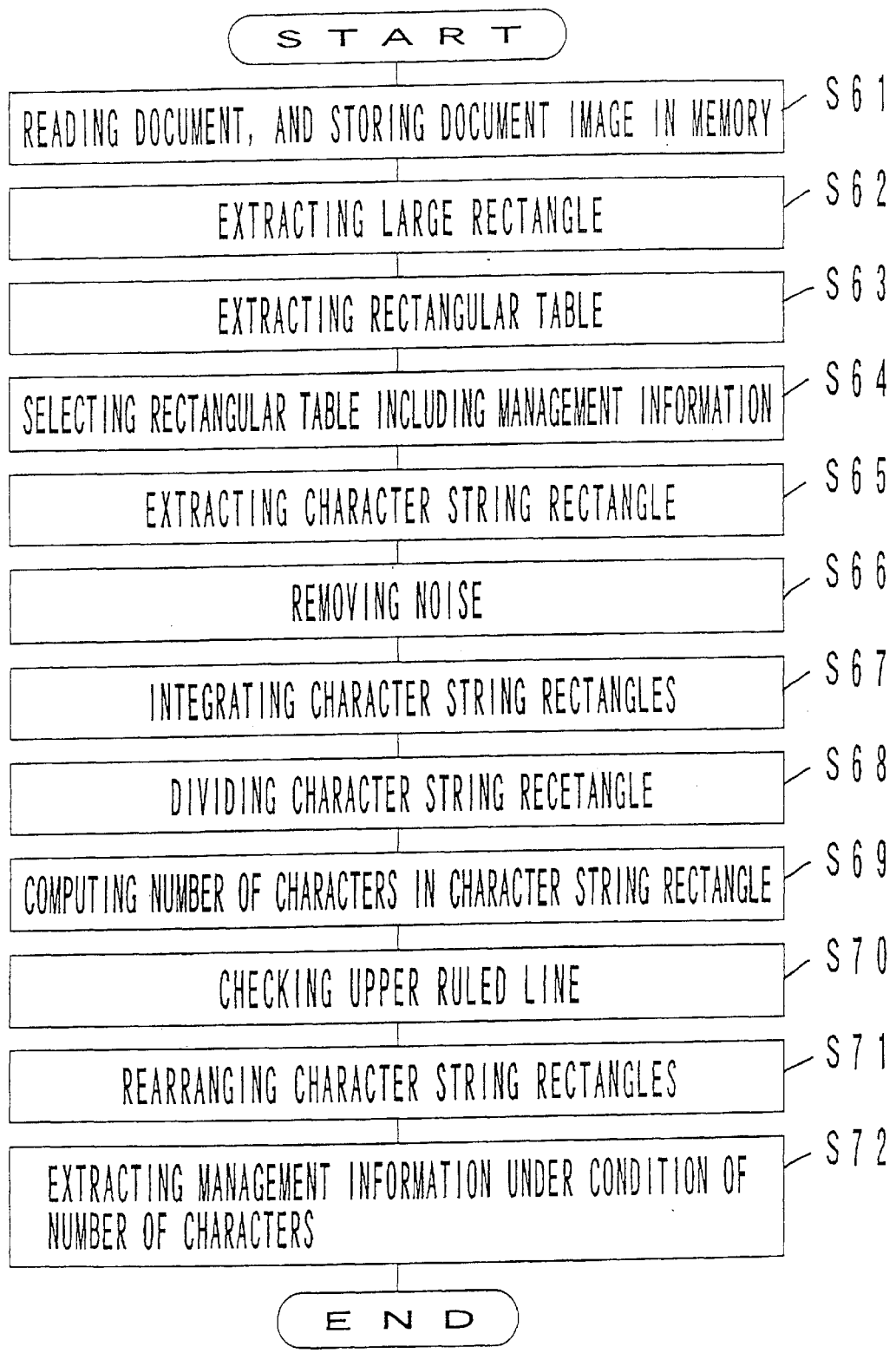
FIG. 24 is a flowchart showing an intractable management information extracting process.

FIG. 24 is a flowchart showing the intractable management information extracting process. When the process starts, the management information extraction apparatus reads a document 71, and stores it as a document image in the memory (step S61). In this example, the original image is stored after being converted into a compressed image.

Next, the document image is labelled, large rectangles are extracted based on the highest frequency value for the height of a rectangle (step S62), rectangles encompassing a table (table rectangles) are extracted from the extracted large rectangles (step S63), and a rectangle containing management information is selected from the table rectangles (step S64). In this example, for example, a table rectangle occupying the largest area is selected.

Then, a character string is extracted from the selected table rectangle, a rectangle circumscribing a character string (character string rectangle) is obtained, and its coordinates are stored in the memory (step S65). Next, a rectangle having a short width or a rectangle having a height longer than its width is removed from the stored character string rectangles as a noise rectangle (step S66), and two or more character string rectangles are integrated into one rectangle (step S67).

The character string rectangles extracted from the table are obtained in the above described processes. These character string rectangles may contain a part of the ruled lines of the table. Therefore, the ruled line portions are extracted from inside the character string rectangles, and the portions are used as the boundary for dividing character string rectangles (step S68).

Next, the number of characters in a character string rectangle is counted to extract a character string rectangle corresponding to management information (step S69). The obtained number of characters is used in the process in step S72 as an attribute of the character string rectangle.

In the process in step S68, a character string rectangle is extracted for each box encompassed by the ruled lines of a table. If the outline of the original table is not rectangular, a character string rectangle outside the table may exist. Therefore, if a character string rectangle has no upper ruled line of a table when an upper ruled line is searched for, then it is regarded as the character string rectangle outside the table and is removed (step S70).

Then, the character string rectangles in the table is rearranged in order from the one closest to the coordinate at the upper left corner (step S71). When the number of characters in the character string rectangle satisfies a predetermined condition, then the character string rectangle is extracted as management information (step S72), thereby terminating the process. If there are a plurality of character string rectangles satisfying the condition, then they are determined to be candidates for the management information in order from the one closest to the upper left corner of the table rectangle.

In this example, three candidates C1, C2, and C3 for management information are extracted in an image 77, and a user interface 78 of the management information extraction apparatus outputs them in order from the highest priority to present them to the user. The user selects one of them by pointing to it using a mouse when an appropriate candidate is presented as management information. Unless an appropriate candidate is presented, the user can correct a candidate for management information by explicitly specifying another rectangular cell by pointing to it using a mouse.

The management information extraction apparatus learns the position of the user-selected/corrected management information, and stores the position information and ruled line structure in the dictionary 31 as a user dictionary 73. Thus, the management information extraction apparatus can use the position information directly specified by the user in the subsequent processes.

In the automatic learning mode shown in FIG. 23, the management information extraction apparatus first refers to a plurality of user dictionaries 73 and recognizes the forms of input images 71, 72, etc.

If the table-formatted input image 71 is input and it is determined that it matches the form of any of the user dictionaries 73 as a result of reference in the rough classification and detailed identification, then management information C1 at the position specified in a resultant form 74 is output and presented to the user. If the user accepts the management information C1, the information is adopted as is. Unless the user accepts it, the user is instructed to select appropriate information from among other position information C2, C3, etc.

Unless the input image 71 matches the any form in the user dictionary 73, the above described intra-table management information extracting process is performed and the candidates C1, C2, C3, etc. for the management information are extracted from a resultant image 75. The user interface 78 presents these candidates to the user in order from the highest priority, and the user selects an appropriate candidate as management information from among the presented candidates. Unless an appropriate candidate is presented, the candidates for management information can be corrected by explicitly specifying another rectangular cell.

The management information extraction apparatus learns the position of the user-selected/corrected management information in the input image 71, and stores the position information and the ruled line structure as the user dictionary 73 in the dictionary 31 for use in the subsequent processes.

If a normal non-table document image 72 is input, then it is determined as a result of recognizing the form that there are no ruled lines. Then, a plurality of candidates for management information are extracted in the title extracting process from a document image without ruled lines according to the former application.

Figure 25:
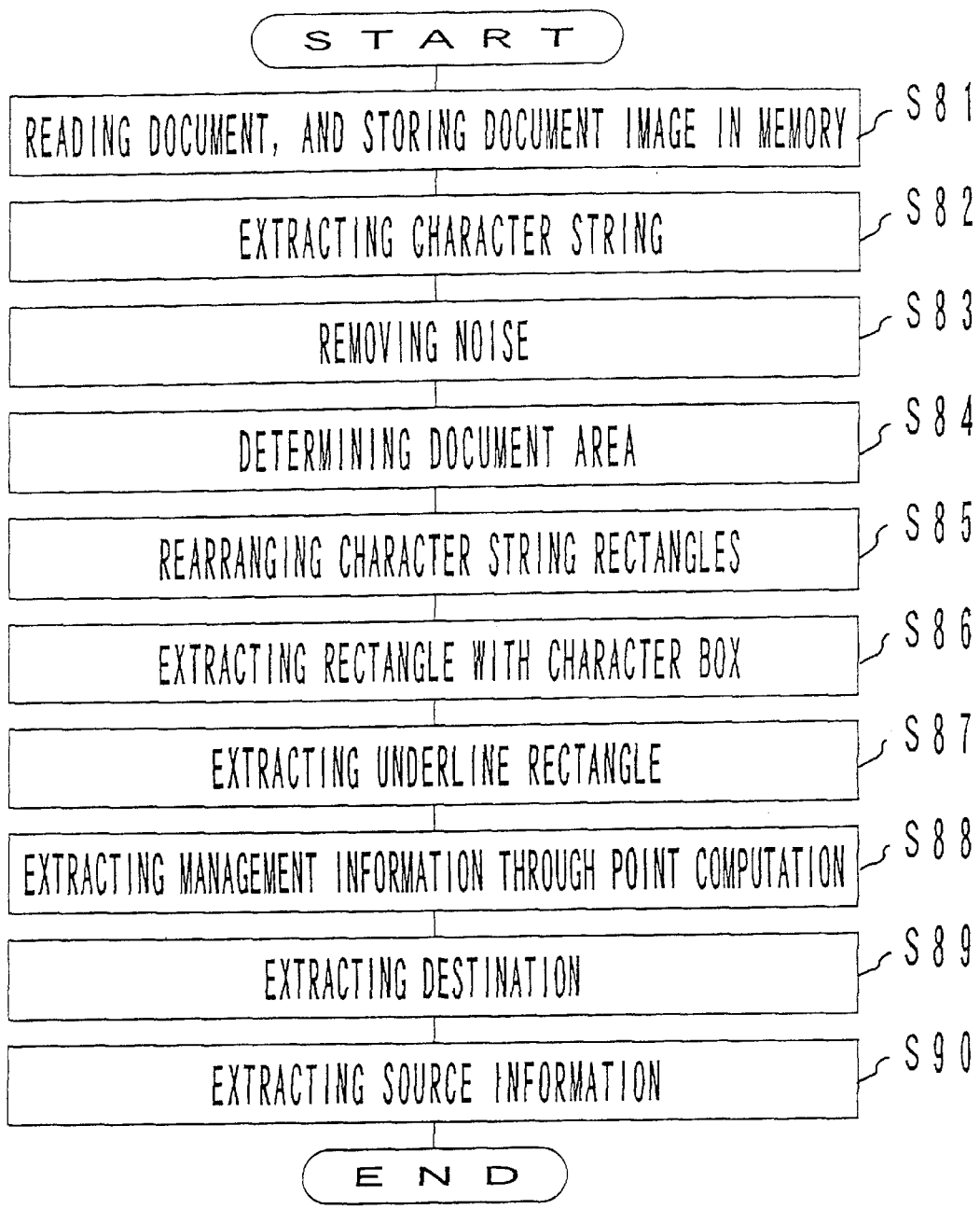
FIG. 25 is a flowchart showing a management information extracting process for a document image without ruled lines.

FIG. 25 is a flowchart showing this management information extracting process. When the process starts, the management information extraction apparatus reads the document 72 and stores it as a document image in the memory (step S81). In this process, the original image is stored after being converted into a compressed image.

Next, the document image is labelled, a character string is extracted as a result of the labelling process, and the coordinate of the character string rectangle is stored in the memory (step S82). Then, a rectangle having a short width or having a width shorter than its height is removed as a noise rectangle from the stored character string rectangles (step S83), and additionally a rectangle which does not seem to be a character string is removed. Then, a document area is determined (step S84).

The remaining character string rectangles are rearranged in the vertical direction (in the y-coordinate directions) (step S85). A rectangle containing an image of a character box (character box rectangle) is extracted, and then a character string rectangle in the character box rectangle is marked as a rectangle with a character box (step S86). Furthermore, a rectangle containing an underline image is extracted, and the character string rectangle right above the extracted rectangle is marked as an underline rectangle (step S87).

Next, a point-counting process is performed to determine the probability of a title based on the features such as the position of a character string rectangle in the document, character size, whether or not it is a rectangle with a character box or an underline rectangle, etc. to extract one or more high-point character string rectangles as candidates for a title (step S88). Based on the result, the source and destination information about the document is extracted (steps S89 and S90). Thus, the title, destination, and source information is extracted as a candidate for management information.

In this example, in the image 76, three candidates C4, C5, and C6 for a title and the destination and source information are extracted. The user interface 78 outputs these data in order from the highest priority and presents them to the user. The user selects one of them by pointing to it using a mouse when an appropriate candidate is presented as management information. Unless an appropriate is presented, the candidate for the management information can be corrected by explicitly specifying another character string rectangle in the pointing process.

Figure 26:
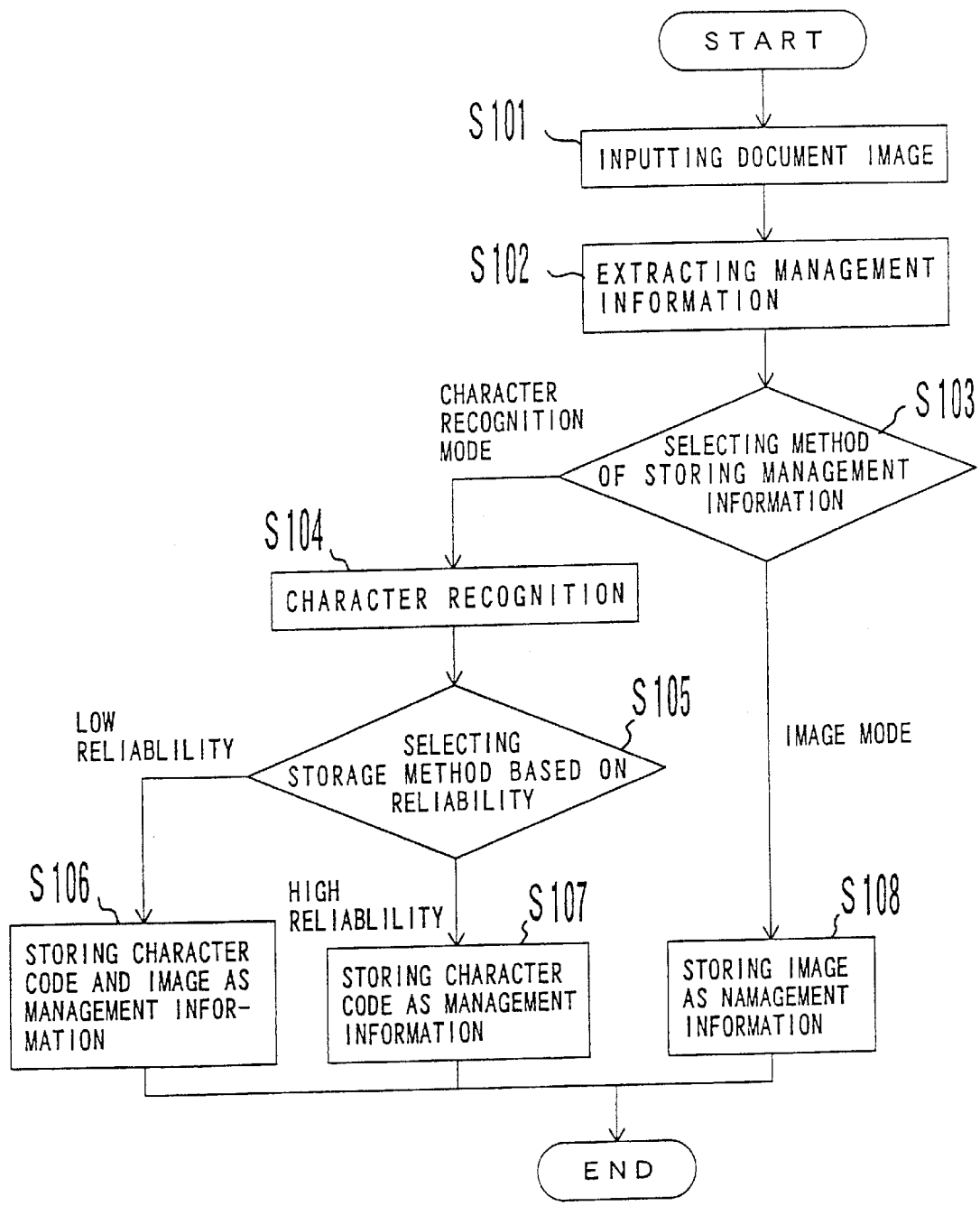
FIG. 26 is a flowchart showing a management information storage process.
Figure 27:
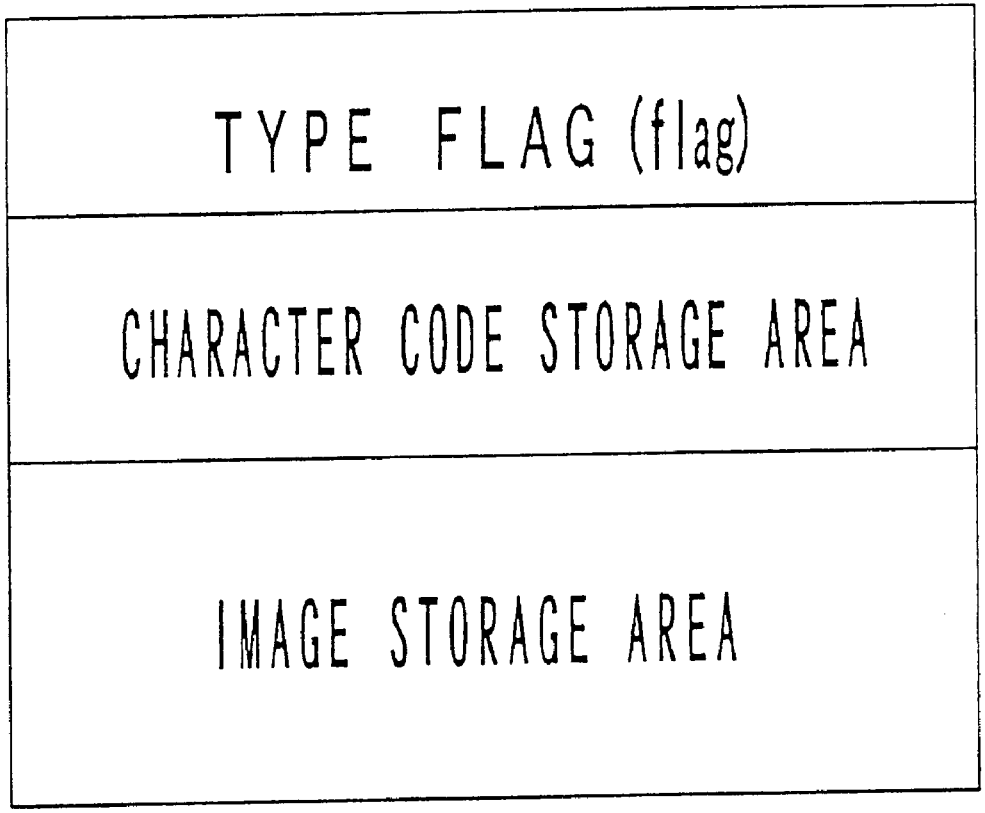
FIG. 27 is a management information storage table.
Figure 28:
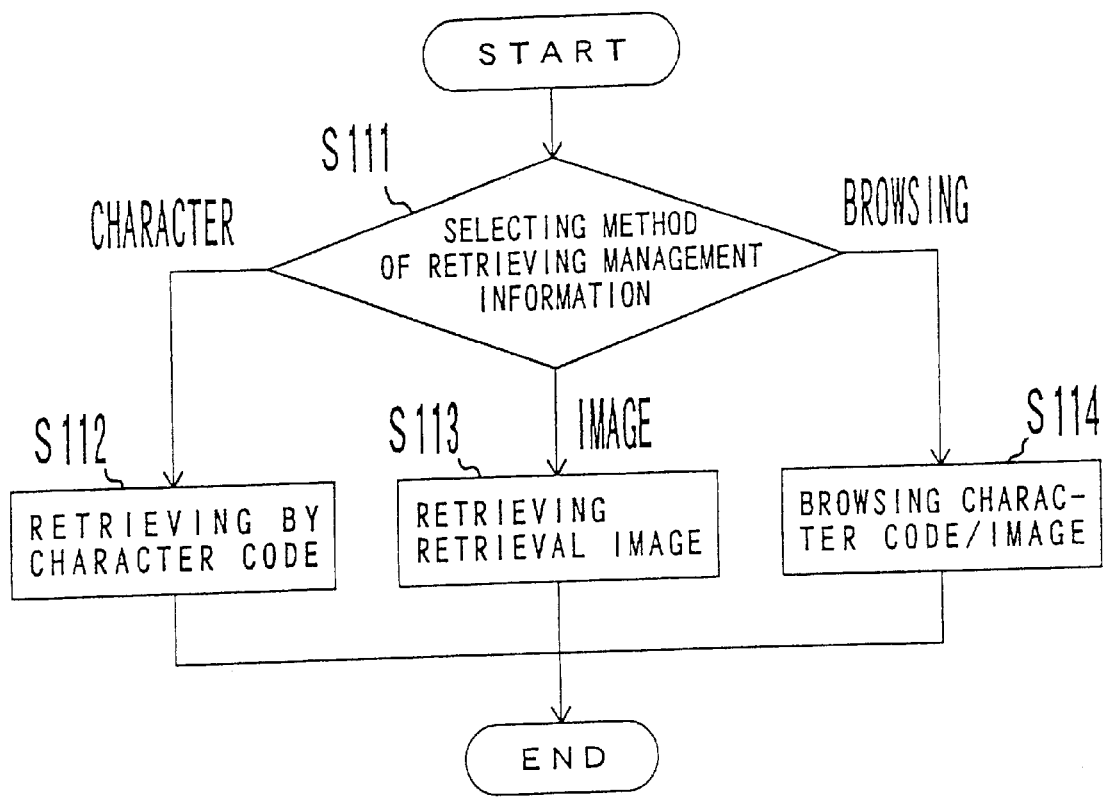
FIG. 28 is a flowchart showing a management information retrieving process.

Next, the usage of the extracted management information is explained by referring to FIGS. 26 through 28. Conventionally, only keywords or character codes of document names, etc. are used as management information for use in handling images. However, the electronic filing system provided with the management information extraction apparatus according to the present invention has the function of storing a part of a document image as an index in addition to character codes. Thus, retrieval using an image can be effective when the reliability of character codes is low.

The system according to the present invention allows the user to select the storing method for management information using a character code or an image code. Based on the selection result, selected data is stored as management information. When an image is retrieved, the system instructs the user to select a method of retrieving management information, and the management information is retrieved using a character code or an image based on the selection result. The system also has the function of simply browsing the stored character codes or images.

FIG. 26 is a flowchart showing the image information storing process. When the process starts, the electronic filing system first receives a document image (step S101), computes the position of the management information in the process as shown in FIG. 4, and extracts a character string of management information (step S102). Then, the system instructs the user to select a method of storing management information for the extracted character string (step S103).

The storing method is followed in a character recognition mode in which a character string is character-recognized and converted into a character code or in an image mode in which a character string is not character-recognized but stored as an image. If the user selects the character recognition mode, characters are recognized (step S104), and a storing method is selected depending on the reliability of the recognition result (step S105).

The method of computing the reliability of character recognition is, for example, to use the technology disclosed in the "Character Recognition Method and Apparatus" according to a former application (Japanese Patent Application H8-223720). According to this technology, the system first computes a probability parameter from the distance value between the character code obtained as a recognition result and an input character pattern, and generates a conversion table for use in converting the probability parameter into a correct recognition probability using a set of character patterns and correctly-recognized codes. Based on the conversion table, the correct recognition probability to the probability parameter is obtained, and the correct recognition probability is used as the reliability of the recognition result.

If the reliability of character recognition is lower than a predetermined threshold, then the user is notified that an image is stored, and the image of the character string as well as its character code is stored as management information (step S106), thereby terminating the process. If the reliability is equal to or higher than the predetermined threshold, then the character code is stored as management information (step S107), thereby terminating the process.

If the user selects the image mode, then an image of a character string is stored as management information (step S108), thereby terminating the process. In step S103, it is possible to enter a mode in which both a character code and an image code are stored as an alternative storing method. Assuming that the information about the distance value between the character code obtained as a recognition result and the input character pattern indicates the reliability in step S105, it can be determined that the smaller the distance value is, the higher the reliability becomes.

FIG. 27 shows an example of a storage table for storing management information. The management information storage table has a character code storage area, an image storage area, and a type flag area indicating whether information is stored in a character code or an image code.

For example, the type flag 0 indicates that only the character code is stored. The type flag 1 indicates that only the image code is stored. The type flag 2 indicates that both the character code and image code are stored.

FIG. 28 is a flowchart showing the management information retrieving process for retrieving such management information. When the process starts, the electronic filing system first instructs the user to select a method of retrieving management information (step S111). The retrieving method is followed in three modes, that is, a mode using character codes, a mode using images, and a mode displaying a list of character codes and images to be browsed by a user.

When a user selects character code retrieval, management information is retrieved using a character code (step S112). When a user selects image retrieval, management information is retrieved using an image (step S113). When a user selects browsing, a list of character codes and images stored in the management information storage table is displayed (step S114). After the selection, the process terminates.

When information is retrieved using images in step S113, the user is instructed to designate a specific image file or an appropriate image is selected and displayed. Then, the user is instructed to designate a specific rectangular portion as a retrieval key, and the user-designated portion of the image is compared with the image stored in the management information storage table. The comparison between images is made using a well-known template matching described in, for example, "Digital Image Process for Recognizing Image [I]" by Jun'ichiro Toriwaki, published by Shokodo.

In the template matching, the designated potion of the image is used as a model (template) with which the image in each management information storage table is compared in computing the similarity between them to obtain management information indicating the highest similarity or indicating similarity higher than a predetermined value. A document image corresponding to the obtained management information is displayed as a retrieval result.

According to such an electronic filing system, a character string of management information is not only stored/retrieved using character codes, but also can be stored/retrieved using images. Therefore, characters which are difficult to be correctly recognized such as textured characters, designed fonts, logos, etc. can be processed as management information.

In steps S15 and S16 in FIG. 17, the cross-ratio DP matching is used to identify a table-formatted document form (structure of format). However, the detailed identification can be performed by any other of optional methods.

In another well-known automatic form identifying method, the feature of a known table-formatted document form is entered as a model in the dictionary 31. When an image of an unknown table-formatted document is input, the feature is computed from the image, it is compared with the model in the dictionary using a model matching method, and the model indicating the highest similarity is obtained.

In a model matching method, the entire table is first normalized, the position of the central point of each rectangular cell is computed, and the model having a central point at almost the same position as the above described rectangular cell is voted. The model which obtains the largest number of votes is defined as the optimum model. The normalization of a model refers to an adjusting process such as converting the entire image in a way that the width-to-height ratio is one to one.

Figure 29:
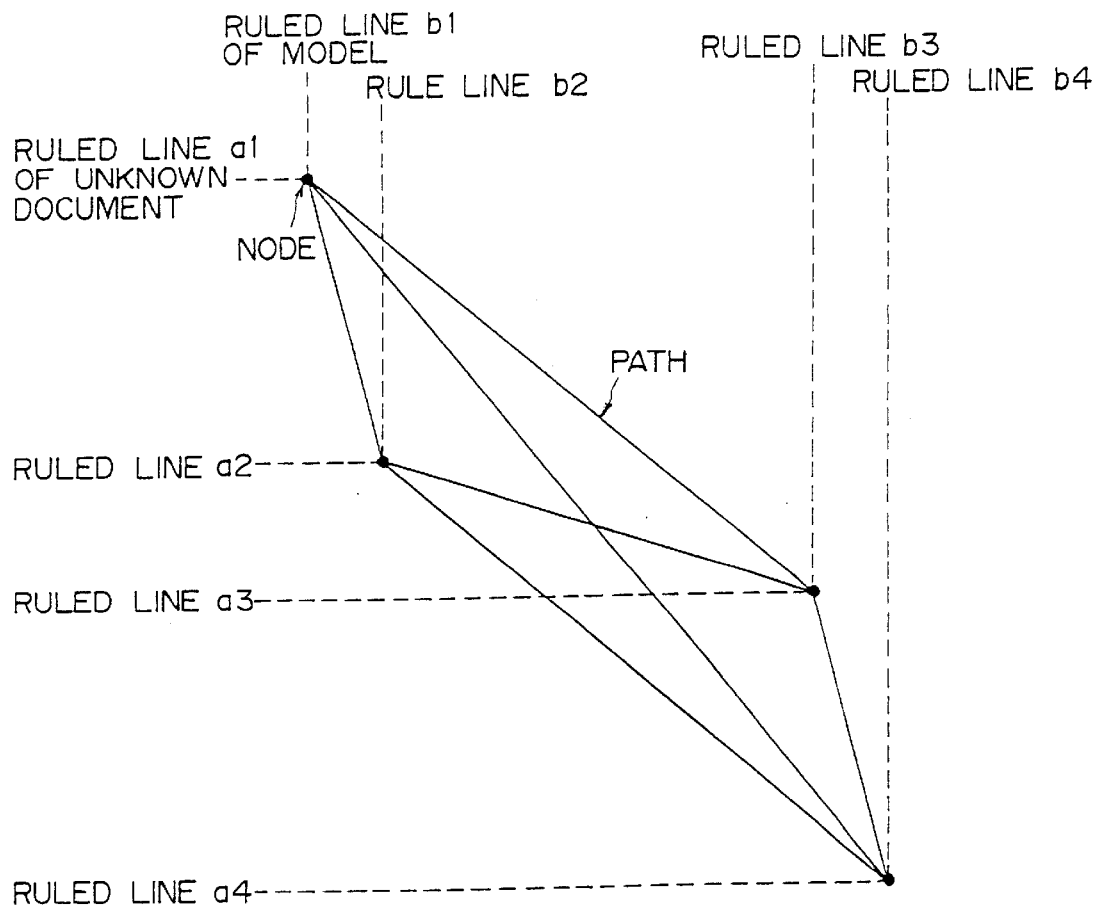
FIG. 29 is an association graph.

Another method is to perform a matching process using a connected graph. In this method, a ruled line is extracted, the entire table is normalized, and then a combination of ruled lines nearly equal in length and position is obtained between the input unknown document and each model. As shown in FIG. 29, nodes indicating combinations of ruled lines are arranged on a plane to generate a connected graph by connecting nodes satisfying predetermined geometrical restrictions through a path.

Geometrical restrictions refer to a restriction condition that the order of the ruled lines between an unknown document and a compared model is preserved, or a restriction condition that it is prohibited that one ruled line of one table corresponds to a plurality of ruled lines of another table. In an association graph comprising four nodes shown in FIG. 29, ruled lines a1, a2, a3, and a4 of the unknown document respectively correspond to ruled lines b1, b2, b3, and b4 of the model.

When all nodes are connected to all other nodes through a path in a subgraph, which is a part of a connected graph, the subgraph is referred to as a clique. The connected graph shown in FIG. 29 itself is a clique. The similarity between an unknown document and a model can be obtained by obtaining the clique having the largest number of nodes in an association graph, and the model indicating the highest similarity is extracted as the optimum model.

In the above described model matching process, an unknown input document is normalized and then compared with a model in features. However, if the extraction precision of the outline of the table is lowered or a form is slightly amended by adding a row, etc., then the total features are affected, resulting in unstable identification. Especially, the above described method based on the central position of a rectangular cell is subject to a larger influence from such an affect.

In the above described method using a connected graph, the condition on which a node is generated can be moderated, but the size of the graph is enlarged, and particularly, it takes a long time to obtain the maximum clique.

Therefore, the following embodiment of the present invention is explained to present a high-speed and robust matching method followed in response to a ruled line extraction error due to a break in a line or a noise and a change in form, etc. To be robust means that a matching result is hardly affected by an error or change.

In this matching method, the size and position of the ruled line relative to the entire table are regarded as features in checking the possibility of the correspondence of ruled lines between an unknown document and each model to obtain the combination of corresponding ruled lines. In this example, a plurality of ruled lines can correspond to one ruled line by setting a broad possible condition. Also in the case that the outline of a table is not correctly extracted, if the failure is within an allowable range, permitting a redundant correspondence prevents a correct correspondence between ruled lines from being missed.

Next, compatible correspondence relations are gathered into one group in a set of obtained correspondence relations, and each correspondence relation of ruled lines is assigned to one group. At this time, the position of a ruled line and the distance between ruled lines are used as features. Using the relative relation between ruled lines as features, a break in a line or noise can be prevented from affecting the total features of ruled lines.

Furthermore, when the correspondence relations are grouped, the number of processes for checking the compatibility can be considerably reduced as compared with the case of generating the connected graph by setting a strict compatibility condition in a way that the compatibility can be transitional. Since the correspondence relation in each group can be represented by a single path on a plane, it takes only a short time to count the number of correspondence relations.

A transitional compatibility refers to, for example, that correspondence A is always compatible with correspondence C when correspondence A is compatible with correspondence B, and correspondence B is compatible with correspondence C. In this case, since it is not necessary to check the compatibility between correspondence A and correspondence C, the process can be performed at a high speed.

Finally, a combination of the obtained groups including the largest number of correspondences is searched for among consistent combinations of the groups. Thus, a model can be extracted if most of its ruled lines correctly correspond to those of an input document, even in the case that a small amendment such as adding only one row to a table, etc. is made in the document.

Figure 30:
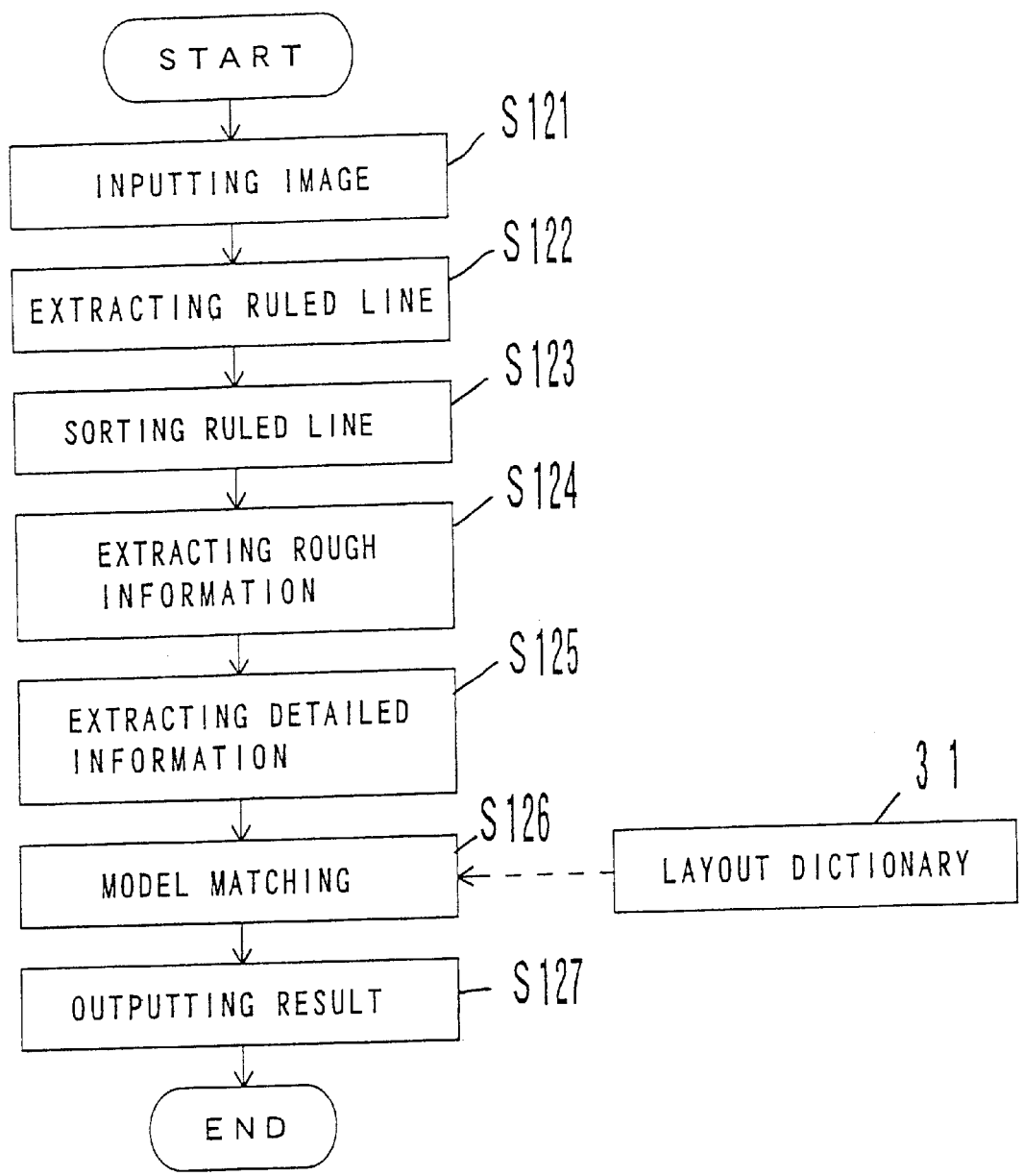
FIG. 30 is a flowchart showing a form identifying process.

FIG. 30 is a flowchart showing the form identifying process in such a matching method. This process corresponds to the processes in steps S11, S12, S15, and S16 shown in FIG. 4, and specifically relates to detailed identification of an input image. When the process starts, the management information extraction apparatus first receives an image (step S121), and extracts ruled lines from the input image (step S122).

Each ruled line is rearranged on the coordinate of the upper left vertex of the rectangle encompassing the ruled line (ruled line rectangle) in order from the smallest y coordinate value for a horizontal ruled line and from the smallest x coordinate value for a vertical ruled line (step S123). If horizontal ruled lines indicate the same y coordinate, they are sorted in the ascending order of the x coordinate. If vertical ruled lines indicate the same x coordinate, they are sorted in the ascending order of the y coordinate.

Next, rough information is extracted about each of the horizontal and vertical ruled lines (step S124). Rough information refers to relative values indicating the length and position of a ruled line to the entire table, and is represented by a set of three integers. And, considering all combinations of two ruled lines in each of the vertical and horizontal directions, detailed information relating to each combination is extracted (step S125). The detailed information expresses the relative relation in length and position between two ruled lines.

The rough information and detailed information about a model to be compared with an input image are preliminarily extracted and stored in the layout dictionary 31. Therefore, the rough information and detailed information about the input image are compared with those about the model for a model matching (step S126). The optimum model is output as an identification result (step S127), thereby terminating the process.

Next, the processes in steps S124, S125, S126, and S127 are described in detail by referring to FIGS. 31 through 41.

In step S124, the reference width W, reference height H, reference x coordinate x0, and reference y coordinate y0 are obtained as a preprocess prior to obtaining the rough information. First, the maximum length is obtained for horizontal ruled lines. Among the horizontal-ruled lines indicating a length ratio higher than or equal to a predetermined threshold (for example, 0.8), the first and the last ruled lines are obtained as reference contour horizontal ruled lines.

The maximum length is obtained also for vertical lines. As in the case of horizontal ruled lines, two reference contour vertical ruled lines are obtained. Then, with respect to a circumscribing rectangle of the obtained four reference contour ruled lines, a reference width W, a reference height H, and a reference point at the upper left vertex having the reference coordinates (x0, y0) are determined.

Figure 31:
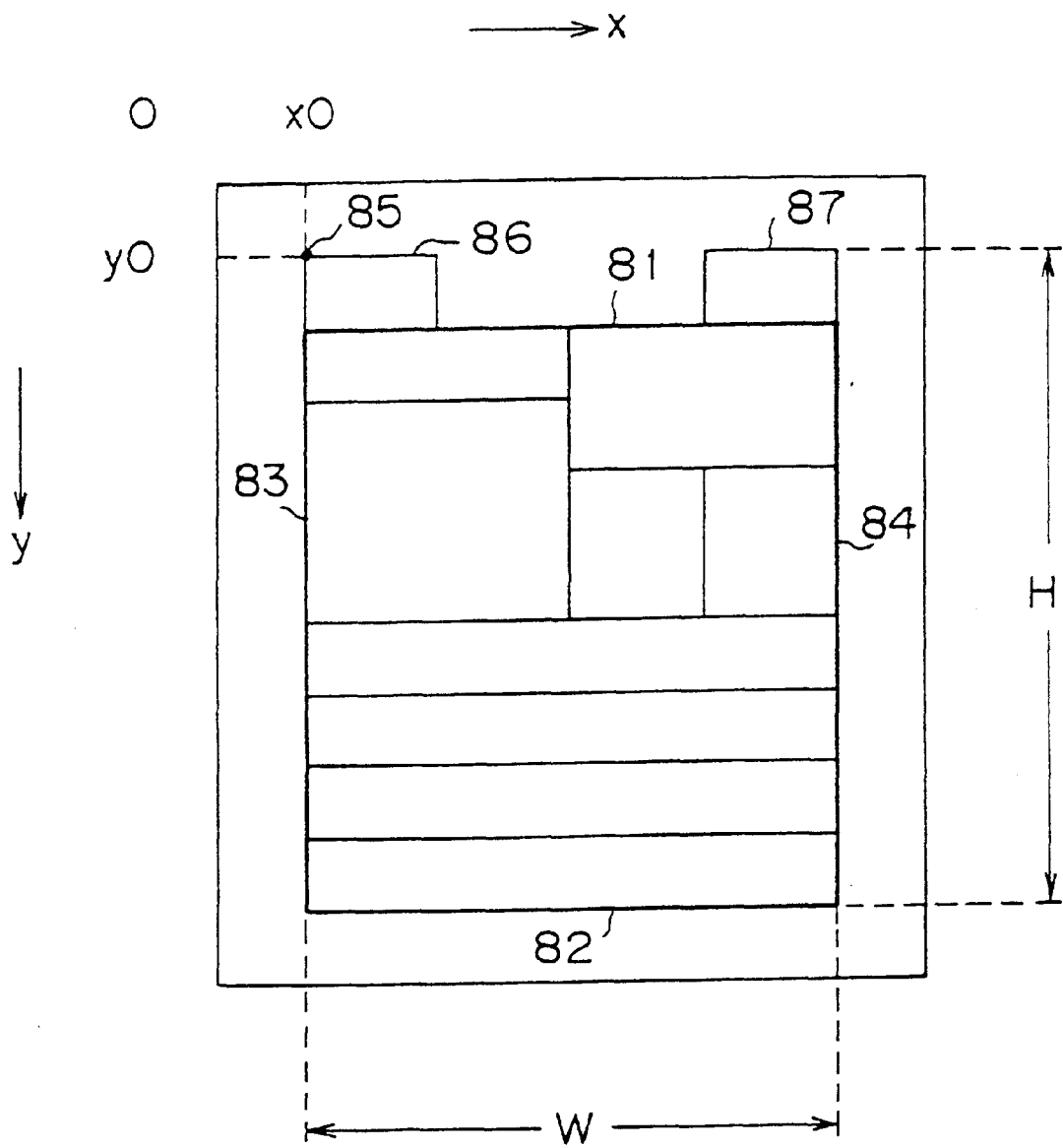
FIG. 31 shows a reference width, a reference height, and a reference point.

For example, in the table-formatted document as shown in FIG. 31, horizontal ruled lines 81 and 82 are extracted as reference contour horizontal ruled lines, and vertical ruled lines 83 and 84 are extracted as reference contour vertical ruled lines. The width of the circumscribing rectangle of the reference contour ruled lines is regarded as the reference width W and its height as the reference height H. The coordinates of the upper left vertex 85 of the circumscribing rectangle are regarded as the reference coordinates (x0, y0).

Short ruled lines such as the horizontal ruled lines 86 and 87. can be removed from candidates for the reference contour ruled lines by selecting reference contour ruled lines from among the ruled lines longer than a length computed from the maximum length.

The above described reference width W, height H, and coordinates (x0, y0) can also be obtained as follows. First, coordinate values vmaxx, vminx, vmaxy, vminy, hmaxx, hminx, hmaxy, hminy are defined as the candidates for reference coordinates as follows.

$vmaxx$=(maximum value of $x$ coordinate of lower right vertex of vertical ruled line rectangle)

$vminx$=(minimum value of $x$ coordinate of upper left vertex of vertical ruled line rectangle)

$vmaxy$=(maximum value of $y$ coordinate of lower right vertex of vertical ruled line rectangle)

$vminy$=(minimum value of $y$ coordinate of upper left vertex of vertical ruled line rectangle)

$hmaxx$=(maximum value of $x$ coordinate of lower right vertex of horizontal ruled line rectangle) (10)

$hminx$=(minimum value of $x$ coordinate of upper left vertex of horizontal ruled line rectangle)

$hmaxy$=(maximum value of $y$ coordinate of lower right vertex of horizontal ruled line rectangle)

$hminy$=(minimum value of $y$ coordinate of upper left vertex of horizontal ruled line rectangle)

Next, according to these coordinate values, candidates for a reference width and a reference height are obtained by the following equations.

$W1=vmaxx-vminx$ $W2=hmaxx-hminx$ $H1=hmaxy-hminy$ $H2=vmaxy-vminy$ (11)

The reference width W is obtained by $W=\max\{W1, W2\}$ (12)

where x0=vminx when W=W1 and x0=hminx when W=W2.

The reference width H is obtained by $H=\min\{H1, H2\}$ (13)

where y0=hminy when H=H1 and y0=vminy when H=H2.

Thus, the reference width W, reference height H, and reference coordinates (x0, y0) are obtained. However, this method is subject to the influence of noise, etc. as compared with the above described method, and shows relatively lower robustness.

The upper left vertex of the circumscribing rectangle of the four reference contour ruled lines is selected as a reference point in this embodiment. Also, an optional point on the perimeter of the circumscribing rectangle such as a lower left vertex, an upper right vertex, a lower right vertex, etc. can be selected as a reference point. In any case, the following processes are commonly performed.

Figure 32:
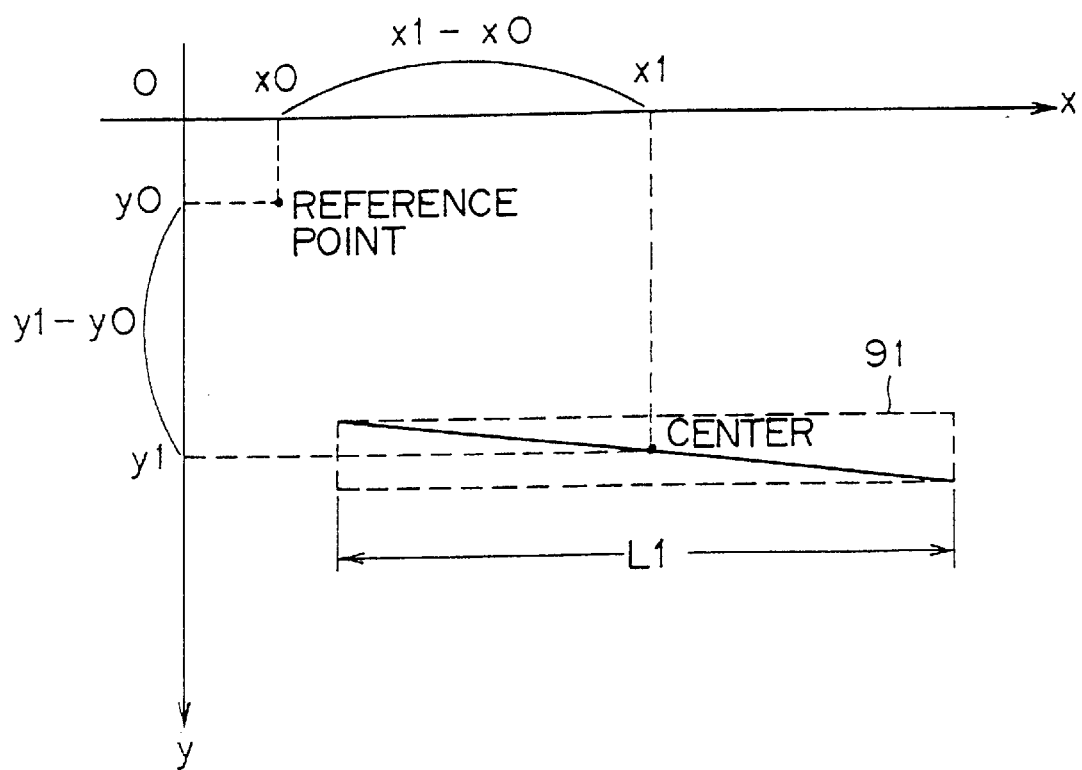
FIG. 32 shows a horizontal ruled line.

Based on the size of the obtained table and the reference coordinate, three features (rough information) length1, twist, and position are obtained from the length of each ruled line rectangle and the central position. In the case of horizontal ruled lines, these features are computed by the following equation based on the length L1 of a ruled line rectangle 91 and its central coordinates (x1, y1) as shown in FIG. 32.

length1=integer portion of $[(L1/W)\times100]$ twist=integer portion of $[((x1-x0)/W)\times100]$ (14)

position=integer portion of $[((y1-y0)/H)\times100]$

Figure 33:
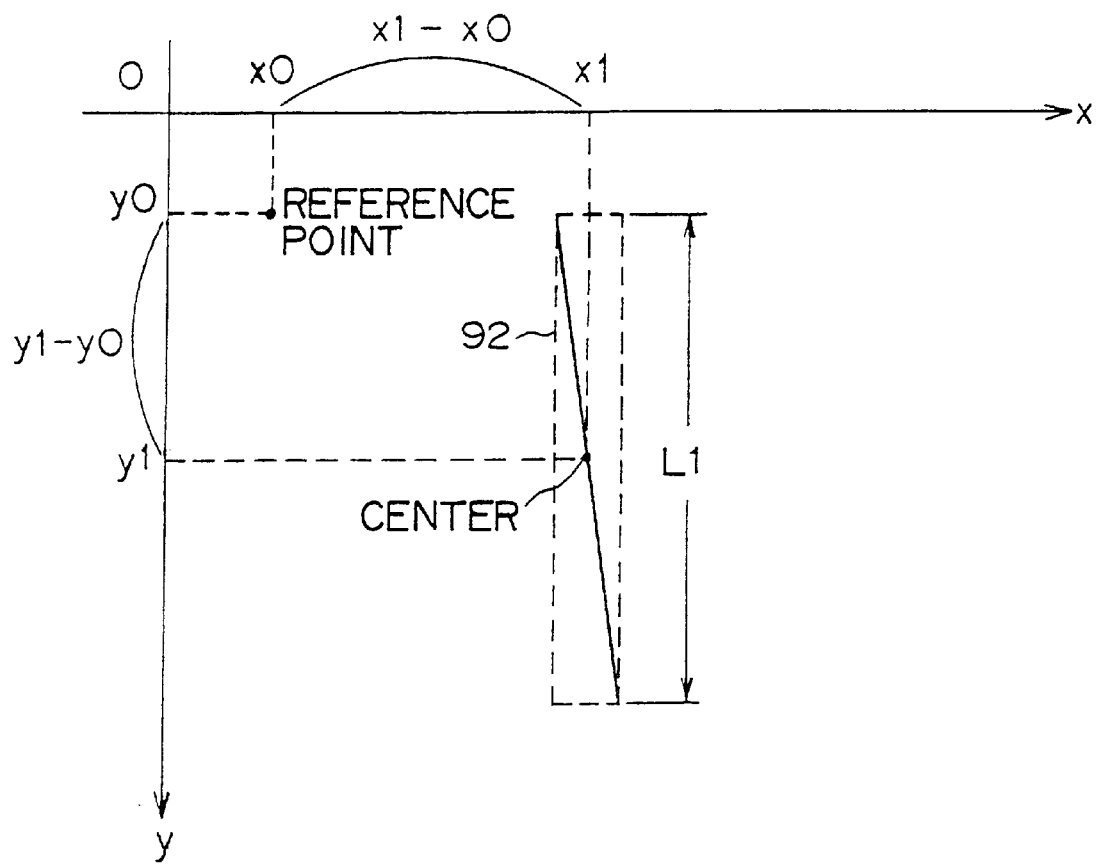
FIG. 33 shows a vertical ruled line.

In the case of vertical ruled lines, these features are computed by the following equation based on the length L1 of a ruled line rectangle 92 and the central coordinates (x1, y1) as shown in FIG. 33.

length1=integer portion of $[(L1/H)\times100]$ twist=integer portion of $[((y1-y0)/H)\times100]$ (15)

position=integer portion of $[((x1-x0)/W)\times100]$

In the computed features, length1 indicates the relative ratio of the length of the ruled line to the size of the table, and twist and position indicate the relative position of the ruled line to the reference point of the table.

Next, in step S125, detailed information indicating the relative relation between two ruled lines is obtained. The detailed information can be represented by three values, that is, assuming that the length of one ruled line rectangle is 1, the length2 of the other ruled line rectangle; the displacement length differ in the x direction between the centers of the ruled line rectangles, and the displacement length height in the y direction between the centers of the ruled line rectangles.

Figure 34:
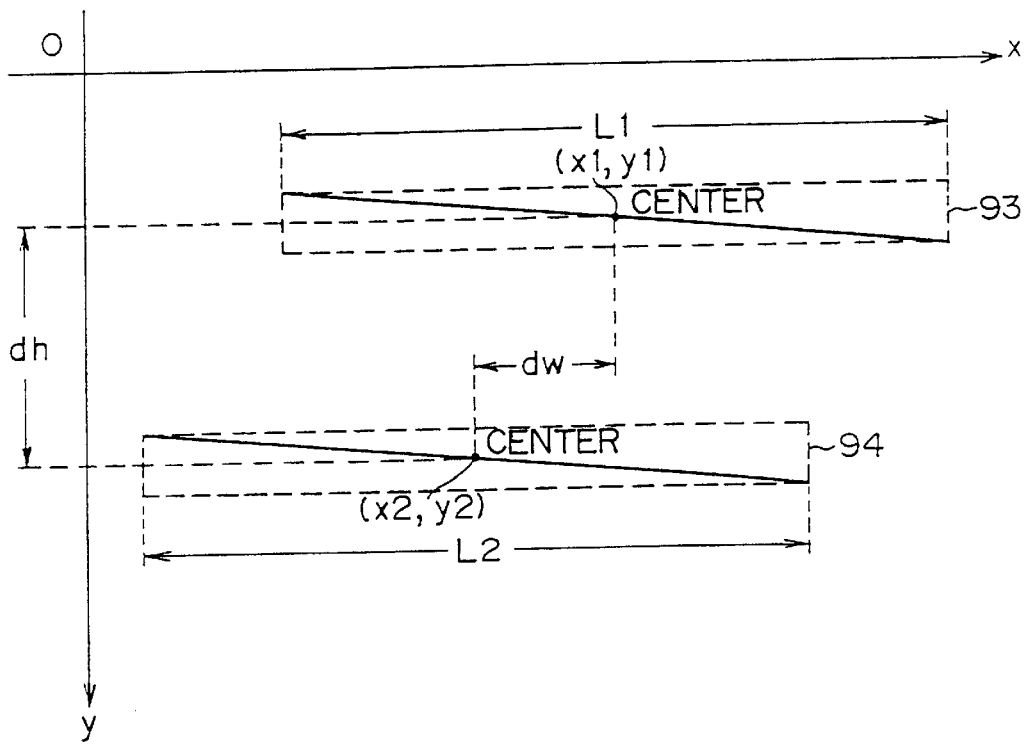
FIG. 34 shows detailed information about the horizontal ruled lines.

First, all combinations of two horizontal ruled lines are extracted. In each combination, the length of one ruled line rectangle 93 (a higher sorting order) is L1, the central coordinates of the rectangle 93 are (x1, y1), the length of the other ruled line rectangle 94 (a lower sorting order) is L2, and the central coordinates of the rectangle 94 are (x2, y2) as shown in FIG. 34. At this time, the displacement dw in the x direction and the displacement dh in the y direction between the centers of the ruled line rectangles are defined by the following equations based on the center of the ruled line rectangle 93.

$dw=x2-x1$ $dh=y2-y1$ (16)

According to this definition, if the center of the ruled line rectangle 94 is located at the right of the center of the ruled line rectangle 93, dw is a positive value. If the center of the ruled line rectangle 94 is located at the left of the center of the ruled line rectangle 93, dw is a negative value. Similarly, if the center of the ruled line rectangle 94 is located under the center of the ruled line rectangle 93, dh is a positive value. If the center of the ruled line rectangle 94 is located above the ruled line rectangle 93, dh is a negative value.

The above described three features length2, differ, and height are computed by the following equation.

$$\text{length2} = L2/L1$$
$$\text{differ} = i\ dw/L1 \quad (17\text{-}1)$$
$$\text{height} = dh/L1$$

Figure 35:
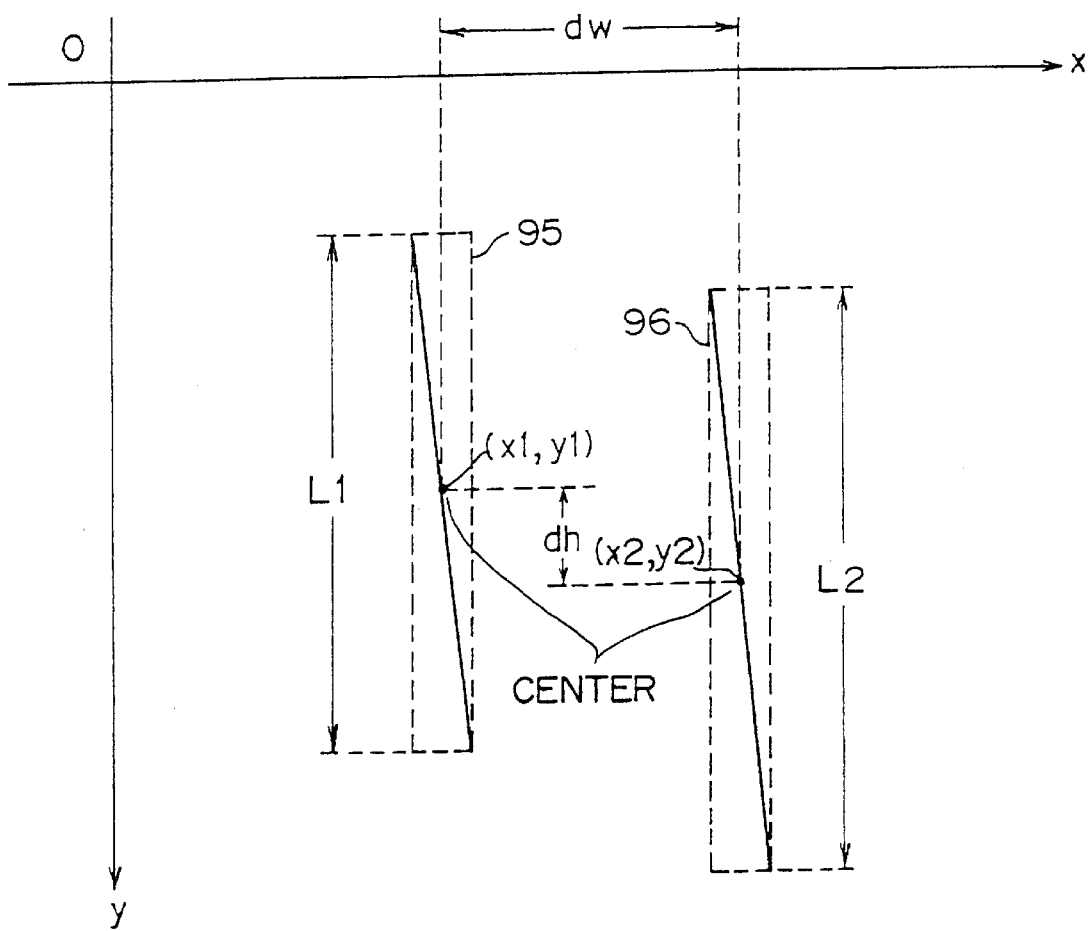
FIG. 35 shows detailed information about the vertical ruled lines.

Similarly, all combinations of two vertical ruled lines are extracted. In each combination, the length of one ruled line rectangle 95 (a higher sorting order) is L1, the central coordinates of the rectangle 95 are (x1, y1), the length of the other ruled line rectangle 96 (a lower sorting order) is L2, and the central coordinates of the rectangle 96 are (x2, y2) as shown in FIG. 35. Then, dw and dh are obtained by equation (16), and detailed information length2, differ, and height are computed by the following equation.

$$\text{length2} = L2/L1$$
$$\text{differ} = dh/L1 \quad (17\text{-}2)$$
$$\text{height} = dw/L1$$

In equation (17-2) compared with equation (17-1), the definitions of differ and height are reversed. Then, in step S126, the similarity of a form is computed by comparing the rough information and detailed information about an input image with those about each model. The comparison is made separately for horizontal ruled lines and vertical ruled lines.

Figure 36:
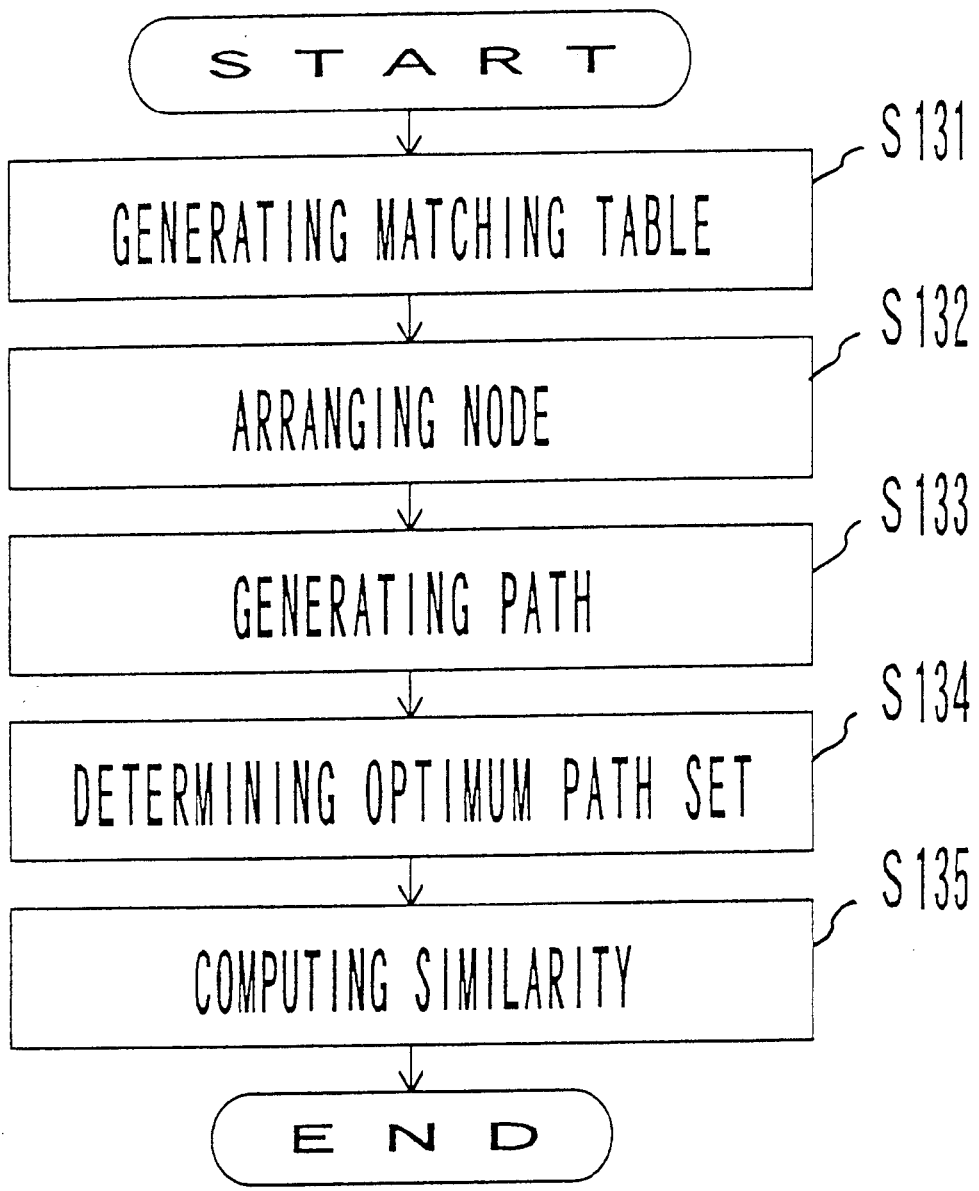
FIG. 36 is a flowchart showing a model matching process.

FIG. 36 is a flowchart showing such a model matching process. When the process starts, the management information extraction apparatus first generates a p×m table shown in FIG. 37 with p as the number of horizontal ruled lines of an input image of an unknown document and m as the number of horizontal ruled lines of a model (step S131).

In this example, p=12, m=15, and the row and column numbers of the table begin with 0. The element (item) of the j-th column in the i-th row in the table is data indicating the correspondence relation between the i-th ruled line of the input image and the j-th ruled line of the model. Such a table is hereinafter referred to as a matching table.

Then, it is determined, according to the rough information, whether or not the i-th horizontal ruled line IP(i) of an input image corresponds to the j-th horizontal ruled line MO(j) of a model. If there is a possibility that they correspond to each other, a node is allotted to the element at the j-th column in the i-th row in the matching table (step S132). Thus, a combination of the horizontal ruled line IP(i) and the horizontal ruled line MO(j) is described on the matching table. At this time, the condition of the possibility of correspondence is not strictly set, but allows one ruled line to correspond to a plurality of ruled lines.

In this example, the rough information (length1, twist, and position) of the ruled line IP(i) is set as (ipl, ipt, and ipp) respectively, and the rough information of the ruled line MO(j) is set as (mol, mot, and mop) respectively. When the difference between the corresponding values is smaller than a predetermined value, it is determined that the ruled line IP(i) can correspond to the ruled line MO(j).

A practical condition for the possibility is set by the following equation.

$$|ipl - \text{mol}| < \beta$$
$$|ipt - \text{mot}| < \beta \quad (18)$$
$$|ipp - \text{mop}| < \alpha$$

where parameters $\alpha$ and $\beta$ are thresholds which respectively depend on the number of horizontal ruled lines and the number of vertical ruled lines in the table.

Figure 38:
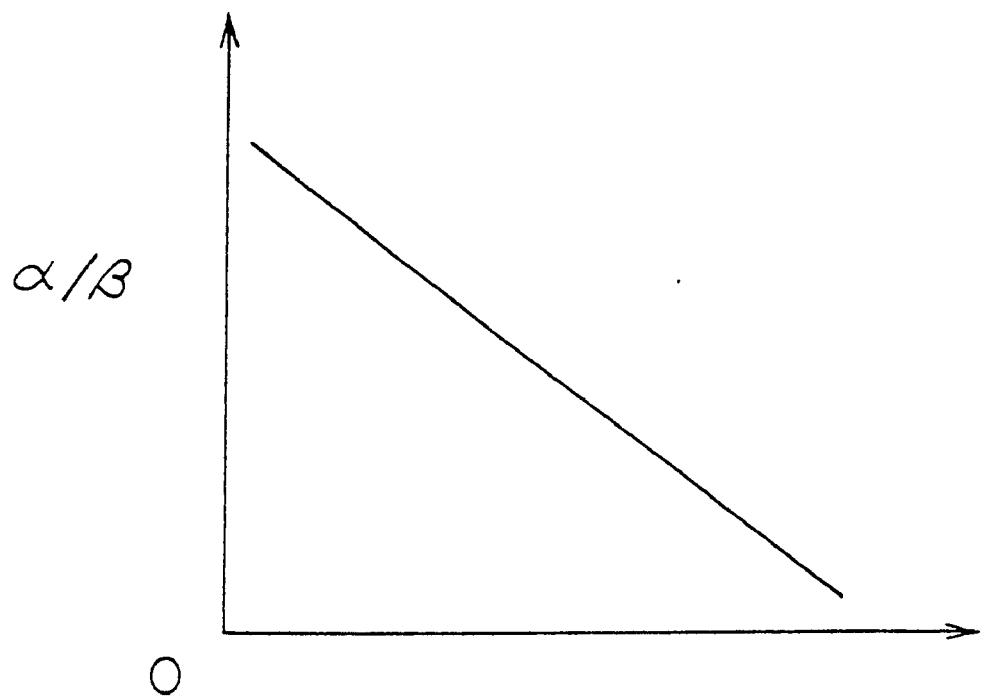
FIG. 38 shows a function of a threshold.

These parameters $\alpha$ and $\beta$ which depend on the number of ruled lines are positive integers. The smaller the number of ruled lines is, the larger values they indicate. The larger the number of ruled lines is, the smaller values they indicate. At this time, the condition of inequalities (18) extends the range of a search in a matching process if the density of the ruled lines in the table is low, but reduces the range of a search in a matching process if the density of the ruled lines is high. The parameters $\alpha$ and $\beta$ can be defined, for example, as functions simply decreasing depending on the number of horizontal and vertical ruled lines as shown in FIG. 38.

Thus, the similarity between an input image and a model in relative feature to the outline portion of a table can be extracted by representing by a node the correspondence relation between ruled lines similar in rough information.

Next, according to the detailed information, arranged nodes are searched for a combination of those satisfying a predetermined relationship, that is, those compatible with each other (step S133), and the compatible nodes are regarded as belonging to the same group and connected with each other through a path.

When node n(i, j) at the j-th column in the i-th row and node n(k, l) at the l-th column in the k-th row satisfy the predetermined relationship, it indicates that the relationship between the i-th ruled line and the k-th ruled line of an input image is proportional to the relationship between the j-th ruled line and the l-th ruled line of a model. That is, when the i-th ruled line of an input image overlaps the j-th ruled line of a model, the k-th ruled line of an input image overlaps the l-th ruled line of a model.

Connecting these nodes through a path makes it possible to classify the nodes into several groups. The larger the number of nodes a group contains, the higher the similarity between an input document and a model the group represents. Therefore, the similarity computation can be effectively performed in a model matching process on such a group as contains a larger number of nodes.

When a node compatible with a specified node is searched for, a search is always performed with the nodes in an area obliquely below and to the right of the specified node to improve the efficiency of the process. Thus, a clique as shown in FIG. 29 is not generated, and a path connecting a large number nodes can be obtained at a high speed. A practical process of generating a path is described later.

Then, consistent combinations of paths are obtained from among the obtained set of paths, and are searched for the one containing the largest number of nodes (step S134). The detected combination of paths is defined as the optimum path set. A consistent combination of paths indicates that the ranges of a set of ruled lines corresponding to the nodes in respective paths do not overlap each other.

Figure 37:
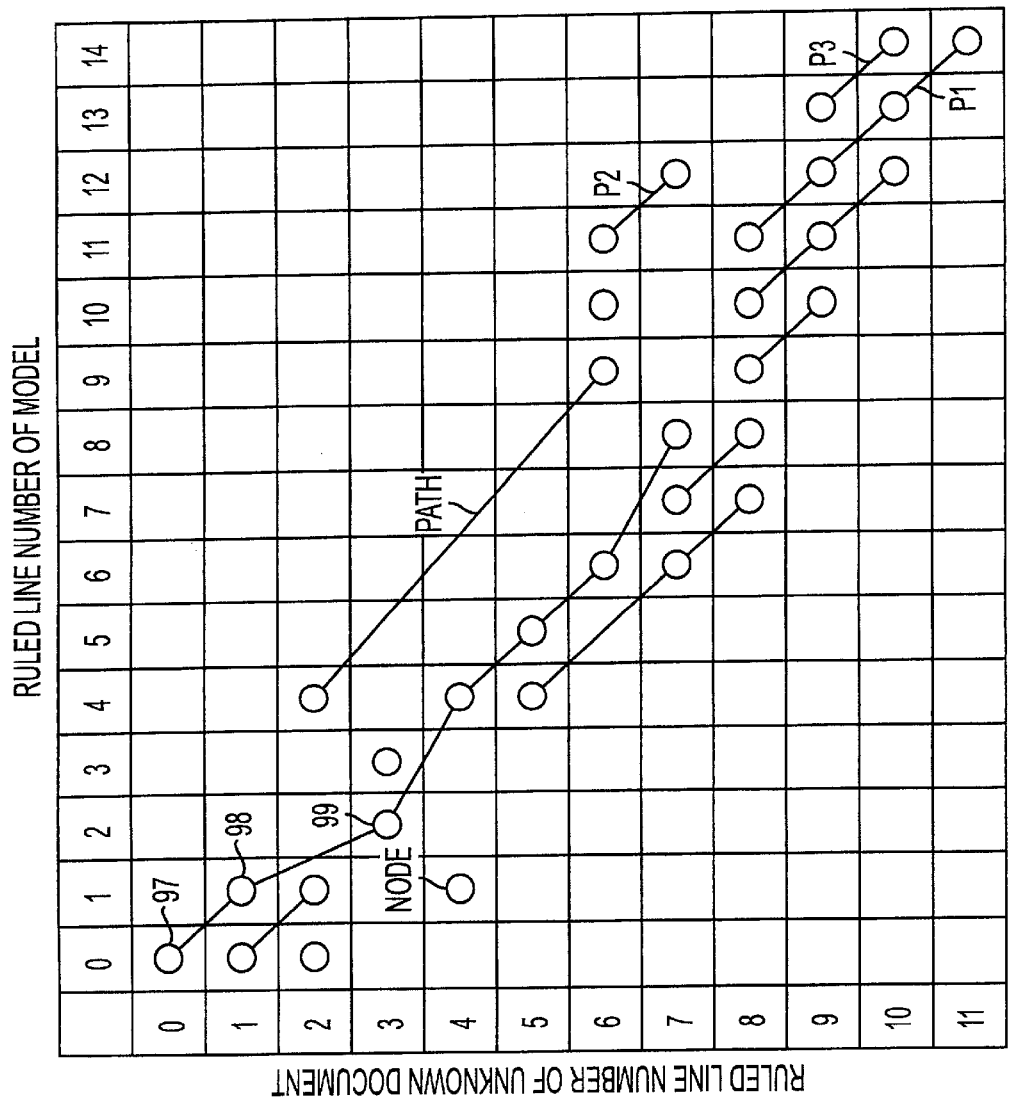
FIG. 37 is a matching table.
Figure 39:
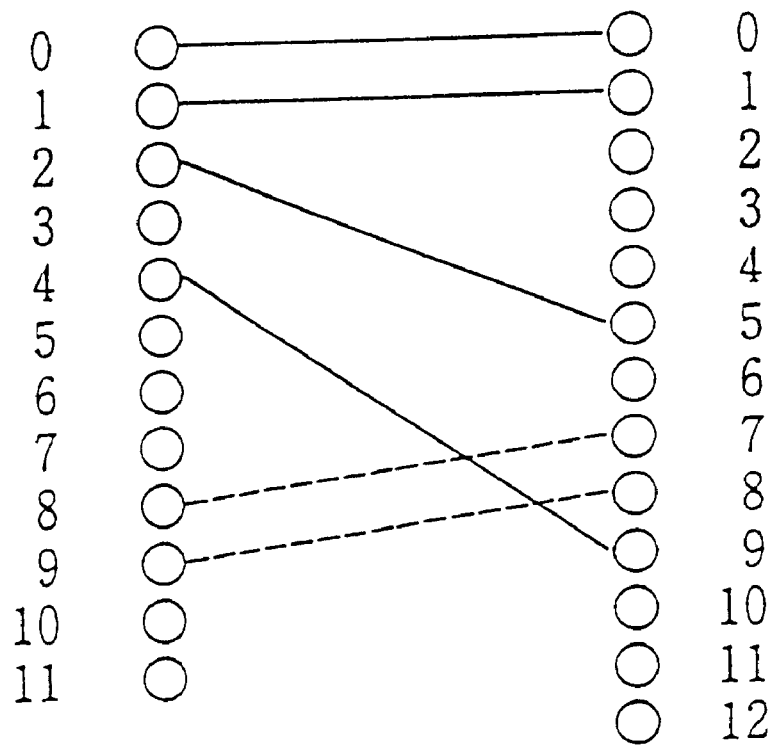
FIG. 39 shows a case in which a sequence is inverted.

In the matching table shown in FIG. 37, two cases are considered in which the ranges of two ruled line sets overlap each other. One is the case, as shown in FIG. 39, that a sequence relationship is reversed between an input image and a model. The other is the case, as shown in FIG. 40, that two or more ruled lines correspond to a ruled line.

In the matching table shown in FIG. 39, the range of the ruled lines on the model side belonging to a group indicated by solid lines is considered to span from the 0th to the 9th ruled lines. The range of the ruled lines on the model side belonging to a group indicated by broken lines is considered to span from the 7th to the 8th ruled lines. Therefore, the ranges of the two ruled line sets overlap each other.

Figure 40:
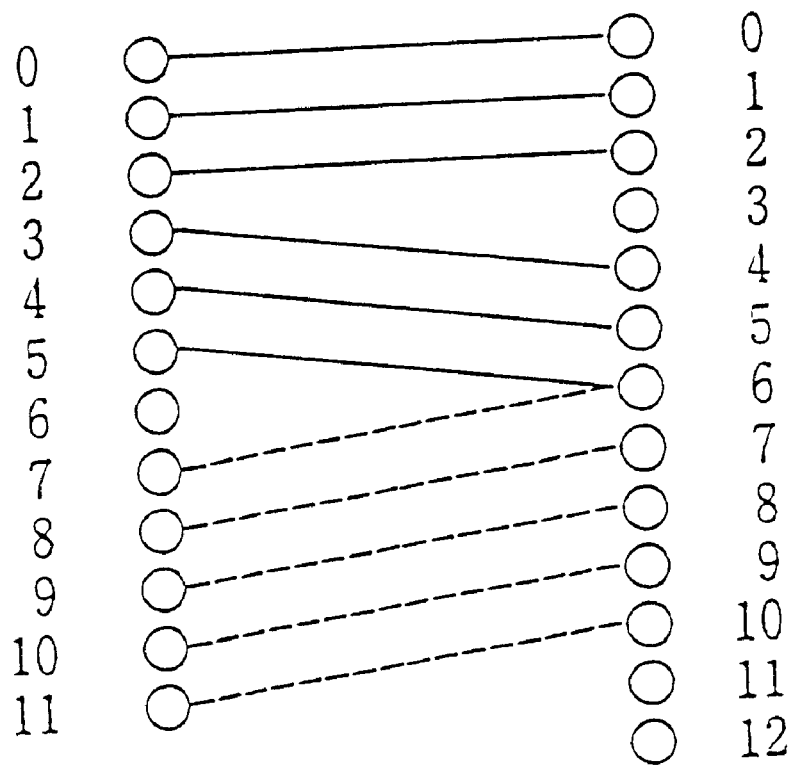
FIG. 40 shows a case in which two corresponding ruled lines are assigned.

Similarly, in FIG. 40, the range of the ruled line sets of the groups indicated by solid lines and broken lines overlap on the model side.

Figure 41:
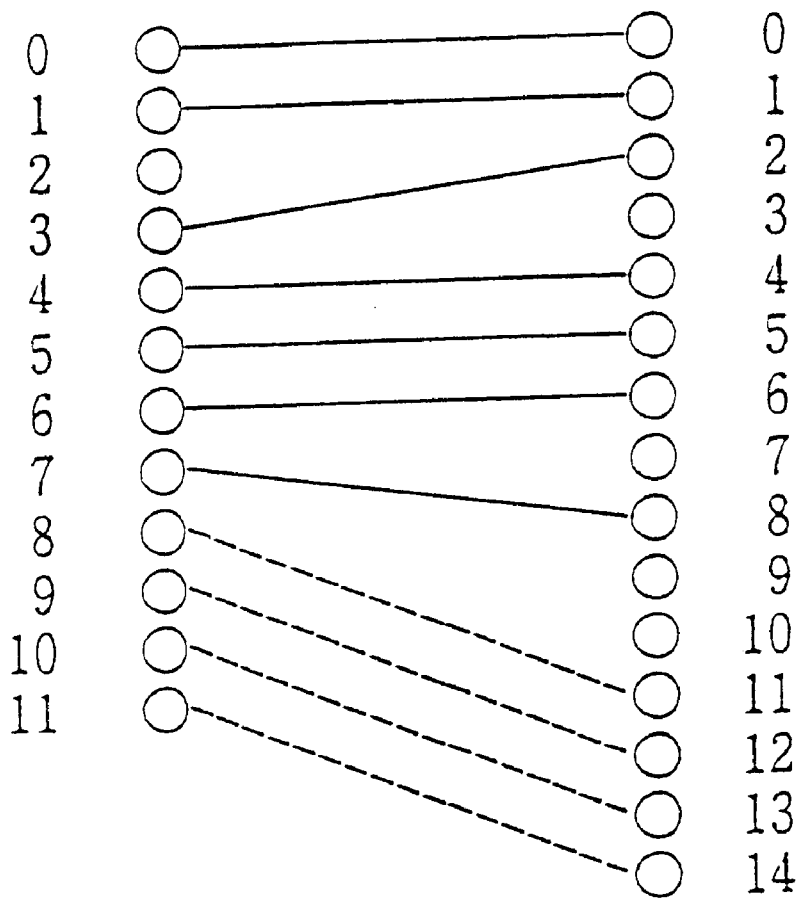
FIG. 41 shows the correspondence of ruled lines represented by the optimum path set.

In the optimum path set containing no inconsistent combinations of paths, the ranges of ruled line sets do not overlap each other on either side of an input image or a model as shown in FIG. 41. Thus, the correspondence relation among the ruled lines represented by nodes contained in the optimum path set is referred to as the optimum correspondence.

Next, assuming that the number of horizontal ruled lines of an input image is ph, the number of horizontal ruled lines of a model is mh, and the number of nodes contained in the optimum path set for the horizontal ruled lines is maxh, the similarity SH between the horizontal ruled lines of the input image and the model is computed by the following equation (step S135).

$$SH = \max h/ph + \max h/mh \qquad (19)$$

The similarity SH indicates the sum of the ratio of ruled lines corresponding to the optimum path set in the ruled lines of the input image and the ratio of rules lines corresponding to the optimum path set in the ruled lines of the model. Normally, the more similar the features of the input image are to the features of the model, the larger the sum becomes.

The management information extraction apparatus processes the vertical ruled lines as in the processes performed on the horizontal ruled lines in steps S131 through S135. Assuming that the number of vertical ruled lines of an input image is pv, the number of vertical ruled lines of a model is mv, and the number of nodes contained in the optimum path set for the vertical ruled lines is maxv, the similarity SV between the vertical ruled lines of the input image and the model is computed by the following equation.

$$SV = \max v/pv + \max v/mv \qquad (20)$$

Finally, the similarity S of the ruled lines between the input image and the model is computed by the following equation using the SH and SV, thereby terminating the model matching process.

$$S = SH + SV \qquad (21)$$

For example, the similarity between a model and an input image is computed by performing the above described matching process using each candidate of table obtained by the rough classification as the model. In step S127, the model indicating the highest similarity is output as the optimum model. Thus, a dictionary form corresponding to the input image can be obtained.

Next, the node arranging process, the path generating process, and the optimum path set determining process shown in FIG. 36 are described further in detail by referring to FIGS. 42 through 48.

Figure 42:
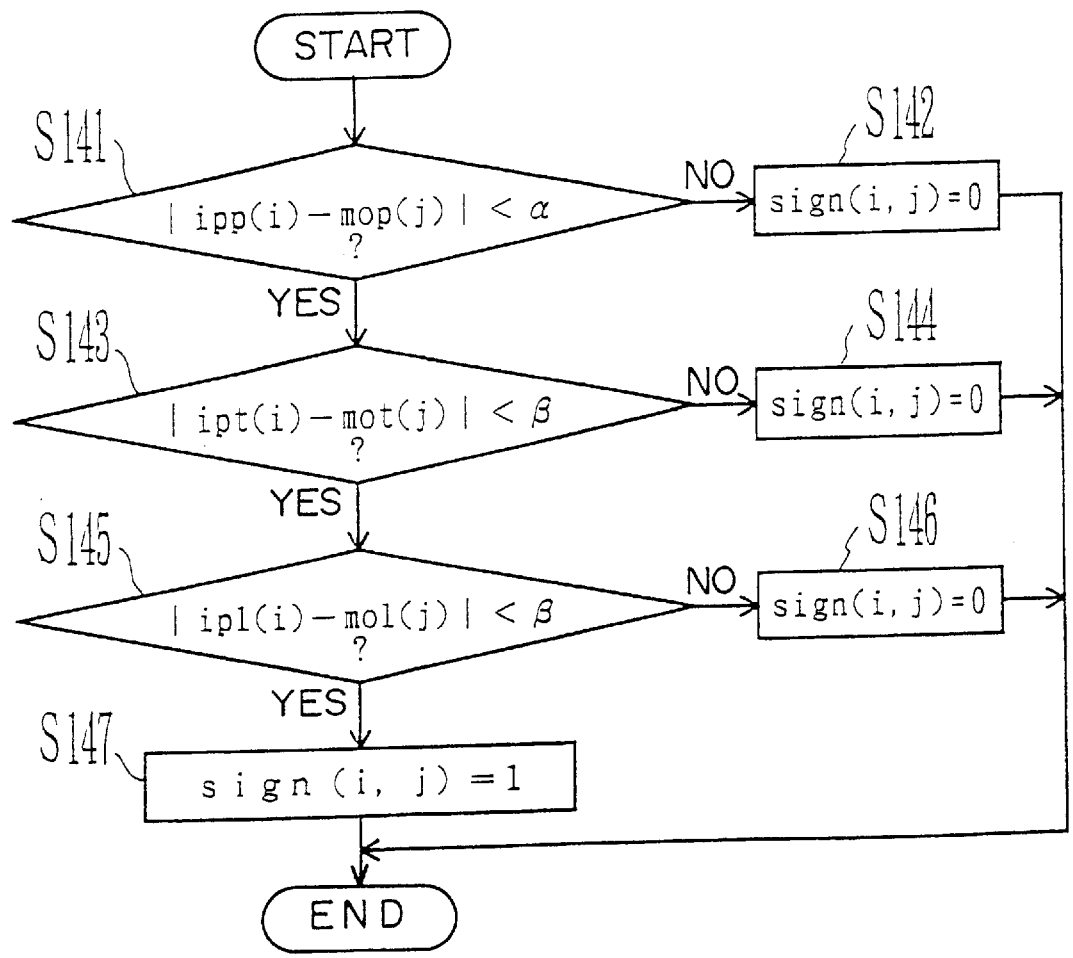
FIG. 42 is a flowchart showing a node arranging process.

FIG. 42 is a flowchart showing the node arranging process in step S132 shown in FIG. 36. In FIG. 42, the rough information length1, twist, position of the i-th ruled line of an input image is respectively represented by ipl(i), ipt(i), ipp(i), and the rough information about the j-th ruled line of a model is represented by mol(j), mot(j), and mop(j).

The data indicating the element at the j-th column in the i-th row on the matching table is represented by sign (i, j). When sign (i, j)=0, a node is not set at a corresponding element. When sign (i, j)=1, a node is set at the corresponding element.

When the process starts, the management information extraction apparatus first determines whether or not the condition $|ipp(i) - mop(j)| < \alpha$ is fulfilled (step S141). Unless the condition is fulfilled, sign (i, j) is set to 0 (step S142), thereby terminating the process.

If the condition in step S141 is fulfilled, then the management information extraction apparatus determines whether or not the condition $|ipt(i) - mot(j)| < \beta$ is fulfilled (step S143). Unless the condition is fulfilled, sign (i, j) is set to 0 (step S144), thereby terminating the process.

If the condition in step S143 is fulfilled, then the management information extraction apparatus determines whether or not the condition $|ipl(i) - mol(j)| < \beta$ is fulfilled (step S145). Unless the condition is fulfilled, sign (i, j) is set to 0 (step S146), thereby terminating the process. If the condition in step S145 is fulfilled, then sign (i, j) is set to 1, and the node is set at the j-th column in the i-th row (step S147), thereby terminating the process.

The above described processes are performed for all positions (i, j) of the matching table so that nodes indicating the correspondence between two ruled lines whose rough information is similar to each other are set at the position corresponding to the ruled lines.

Figure 44:
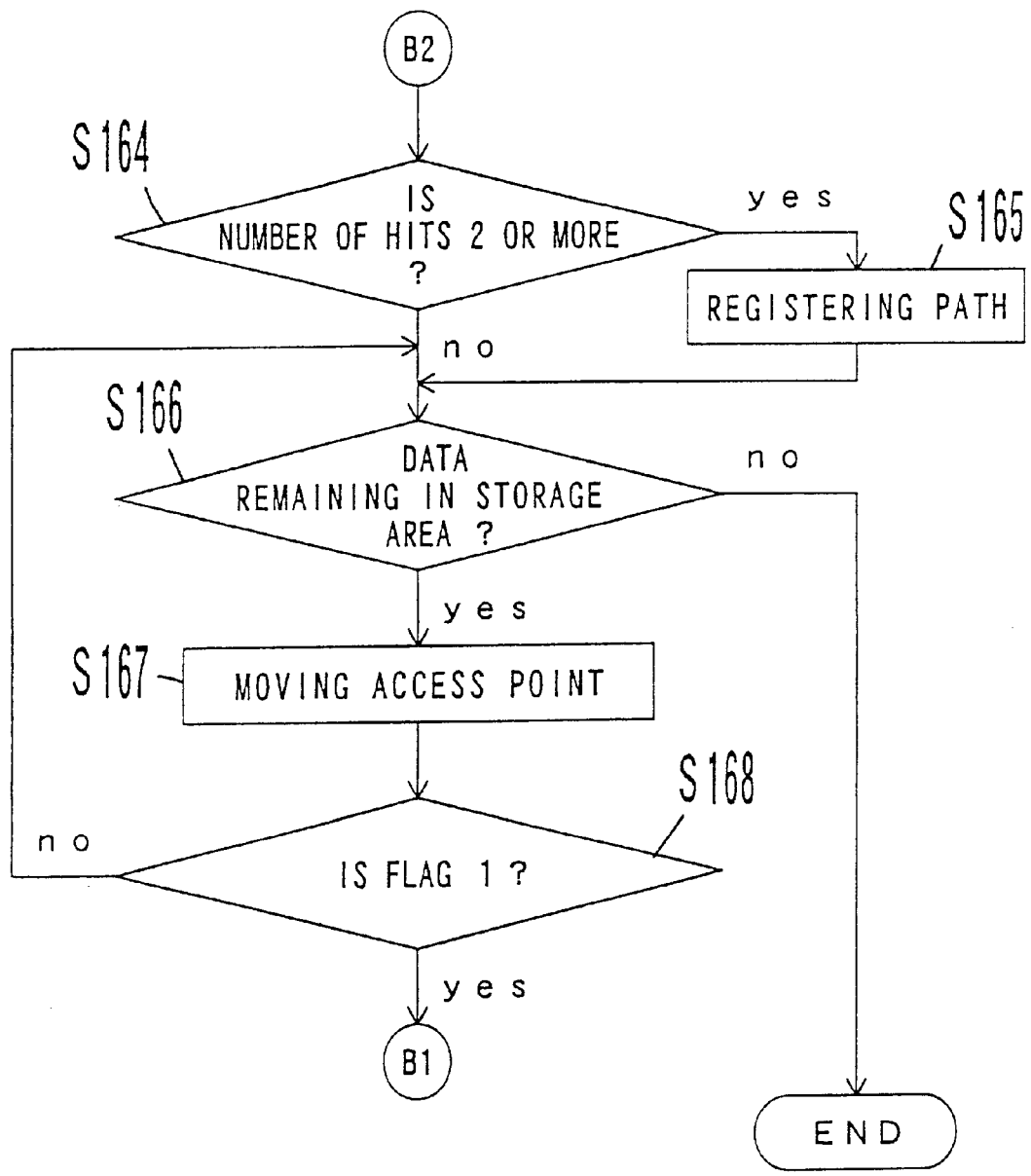
FIG. 44 is a flowchart (2) showing a path generating process.

FIGS. 43 and 44 are flowcharts showing the path generating process in step S133 shown in FIG. 36. When the process starts, the management information extraction apparatus first performs an initializing process (step S151 shown in FIG. 43). In this process, the position (i, j) of the element at which a node is set on the matching table is stored as a node string in a storage area in the memory. The nodes are arranged in an ascending order of row numbers i in the storage area. When nodes are assigned the same row number i, they are arranged in an ascending order of column numbers j. Each node in a node string is assigned a flag indicating whether or not it is connected through a path.

For example, the node string in the storage area corresponding to the matching table shown in FIG. 37 is as shown in FIG. 45. In the storage area shown in FIG. 45, the positions (0, 0), (1, 0), (1, 1), (2, 0), . . . , (11, 14) of the nodes on the matching table are sequentially stored, and the values of the flags are initialized to 1. If the value of a flag is 1, it indicates that a corresponding node is not yet connected through a path.

Next, the leading data in the storage area is accessed (step S152), and i and j are read from the access point to mark the element on the matching table corresponding to the position (step S153). The node of the marked element is defined as a reference node with "sign" of the element set to 0 and the corresponding flag in the storage area set to 0 (step S154).

Then, the value of the control variable "count" is set to 0 (step S155), and it is checked whether or not the marked element corresponds to the last column of the matching table or whether or not the value of "count" has reached a predetermined constant h (step S156). Unless these conditions are fulfilled, the marked position is moved by one column to the right (step S157), and it is checked whether or not the position of the mark corresponds to the last row (step S158).

If the position of the mark corresponds to the last row, then 1 is added to the value of "count" (step S159), and the processes in and after step S156 are repeated. Unless the position of the mark corresponds to the last row, the mark is moved by one row downward (step S160), and it is checked whether "sign" of the marked element is 0 or 1 (step S161).

If the value is 0, no nodes are set at the position of the mark. Therefore, the processes in and after step S158 are repeated to check another element in the column. If "sign" indicates 1, then a node is set at the position of the mark, and it is determined whether or not the node can be connected to the reference node through a path (step S162). It is determined using the detailed information, that is, length2, differ, and height, between the ruled lines corresponding to the nodes, whether or not the two nodes can be connected through a path.

Figure 46:
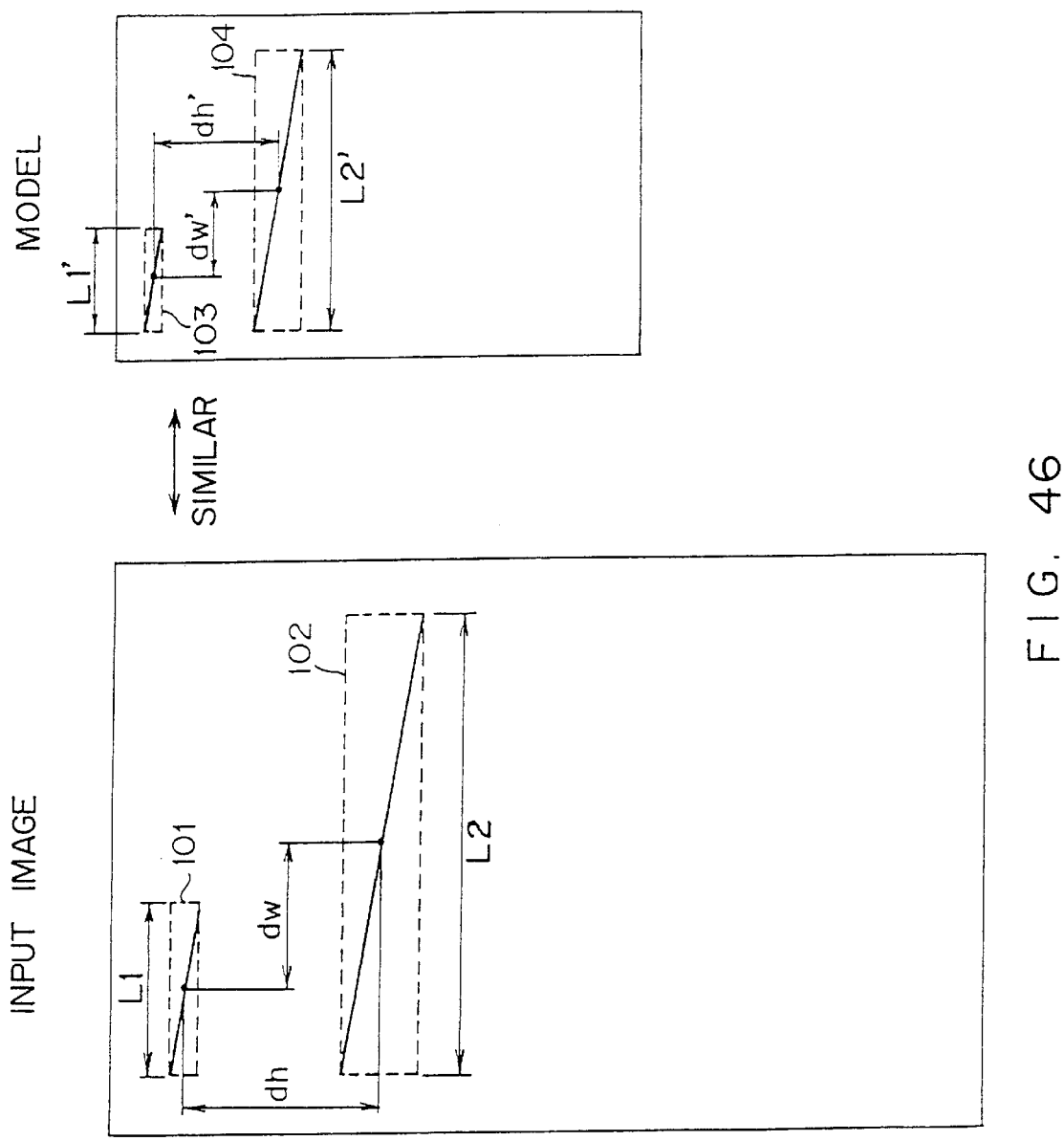
FIG. 46 shows a determining process using detailed information.

For example, as shown in FIG. 46, the detailed information indicating the relationship between the ruled line 101 corresponding to the reference node and the ruled line 102 corresponding to the node to be determined in the input image is set as length2=L2/L1, differ=dw/L1, and height=dh/L1.

In the model, the detailed information indicating the relationship between the ruled line 103 corresponding to the reference node and the ruled line 104 corresponding to the node to be determined is set as length2=L2'/L1', differ=dw'/L1', and height=dh'/L1'.

At this time, if the following inequalities are fulfilled using the empirical thresholds $\epsilon 1$, $\epsilon 2$, and $\epsilon 3$, the reference node is compatible with the node to be determined and they can be connected to each other through a path.

$$|L2/L1 - L2'/L1'| < \epsilon 1$$

$$|dw/L1 - dw'/L1'| < \epsilon 2$$

$$|dh/L1 - dh'/L1'| < \epsilon 3 \qquad (22)$$

By setting thresholds $\epsilon 1$, $\epsilon 2$, and $\epsilon 3$ sufficiently small, inequalities (22) indicate that the graphics comprising the ruled lines 101 and 102 are similar to the graphics comprising the ruled lines 103 and 104. If these ruled line graphics are similar to each other, then there is high possibility that the ruled line 102 corresponds to the ruled line 104 when the ruled line 101 corresponds to the ruled line 103. Thus, these two nodes are regarded as being compatible with each other.

Thus, under such a similarity condition for setting a path, the number of determinations of compatibility between nodes can be reduced. For example, if node 97 is a reference node in the matching table shown in FIG. 37, then node 98 is considered to be compatible with node 99 under the condition that node 97 is compatible with node 98 and node 97 is compatible with node 99.

If it is determined that node 99 can be connected to the reference node 97 through a path, then it is determined that node 99 can also be connected through a path to node 98 already connected to the reference node 97 through a path.

When the node positioned at the mark cannot be connected to the reference node through a path, the processes in and after step S158 are repeated to check another node in the same column. If they can be connected to each other through a path, then the flag in the storage area corresponding to the node positioned at the mark is rewritten to 0 (step S163). Thus, it is recorded that the node is connected to the reference node or a node immediately before the node on the path. Then, the processes in and after step S156 are repeated to check the node of the next column.

In the processes in and after step S156, the position of the mark is moved forward by one column and then by one row to search for the element obliquely below to the right. A path can be sequentially extended in a direction obliquely below and to the right in the matching table by repeating the above described processes.

If the condition in step S156 is fulfilled, it is checked whether or not the number of hits of the paths extending from the reference node is two or more (step S164 shown in FIG. 44). The number of hits refers to the number of nodes on the path. If the number of nodes on the path is two or more, then the path is formally registered and the information about the nodes on the path is stored (step S165). If the number of the nodes on the path is 1, then it indicates there are no paths extended from the reference node to any other nodes. As a result, the path is not registered.

Next, it is checked whether or not there is data remaining unaccessed in the storage area (step S166). If there is the data, the access point in the storage area is moved forward by one (step S167), and the value of the flag at the position is checked (step S168). If the flag indicates 0, then the node at the position has already been added to the path and the next data is checked by repeating the processes in and after step S166.

If the flag indicates 1, then the node at the position has not been added to the path. Therefore, the processes in and after step S153 are repeated. Thus, a new path is generated with the node defined as a new reference node. In step in S166, if the access point in the storage area reaches the trailing point, then the process terminates.

FIG. 47 is a flowchart showing the optimum path set determining process in step S134 shown in FIG. 36. In this process, a matching table of p rows and m columns of horizontal ruled lines or vertical ruled lines is handled using the array score (i) (i=0, 1, 2, ..., m) indicating the number of nodes of a provisional path set for the optimum path set and the array rireki (i) (i=0, 1, 2, ..., m) indicating the row number.

When the process starts, the management information extraction apparatus first sets the score (m) indicating the initial value of the number of nodes of the optimum path set to 0, and sets the rireki (m) indicating the initial value of the row number to p−1 (step S171).

Next, the variable i indicating the column number is set to m-1 (step S172), and in the registered paths, a set of paths including the upper left node corresponding to the column number i as a starting point, is set as Path (i) (step S173). Then, score (i) is set to equal score (i+1), and rireki (i) is set to equal rireki (i+1) (step S174). The score (i) indicates the number of nodes of the provisional path set in the range from the i-th column to the last column (m−1-th column).

Next, one of the paths is obtained from the set Path (i), and score (i) is updated according to the information about its node (step S175). Then, it is checked whether or not a path remains in the set Path (i) (step S176). If yes, the next path is obtained and the computation of score (i) is repeated.

When the computation of all paths in the set Path (i) is completed, it is determined whether or not i has reached 0 (step S177). If i is equal to or larger than 1, i is set to i−1 (step S178), and the processes in and after step S173 are repeated. When i has reached 0, the obtained value of score (0) is defined as the number of nodes of the final optimum path set (step S179), thereby terminating the process.

The value of score (0) obtained from the matching table of horizontal ruled lines is used as maxh in equation (19) in computing the similarity. The value of score (0) obtained from the matching table of vertical ruled lines is used as maxv in equation (20) in computing the similarity.

Figure 48:
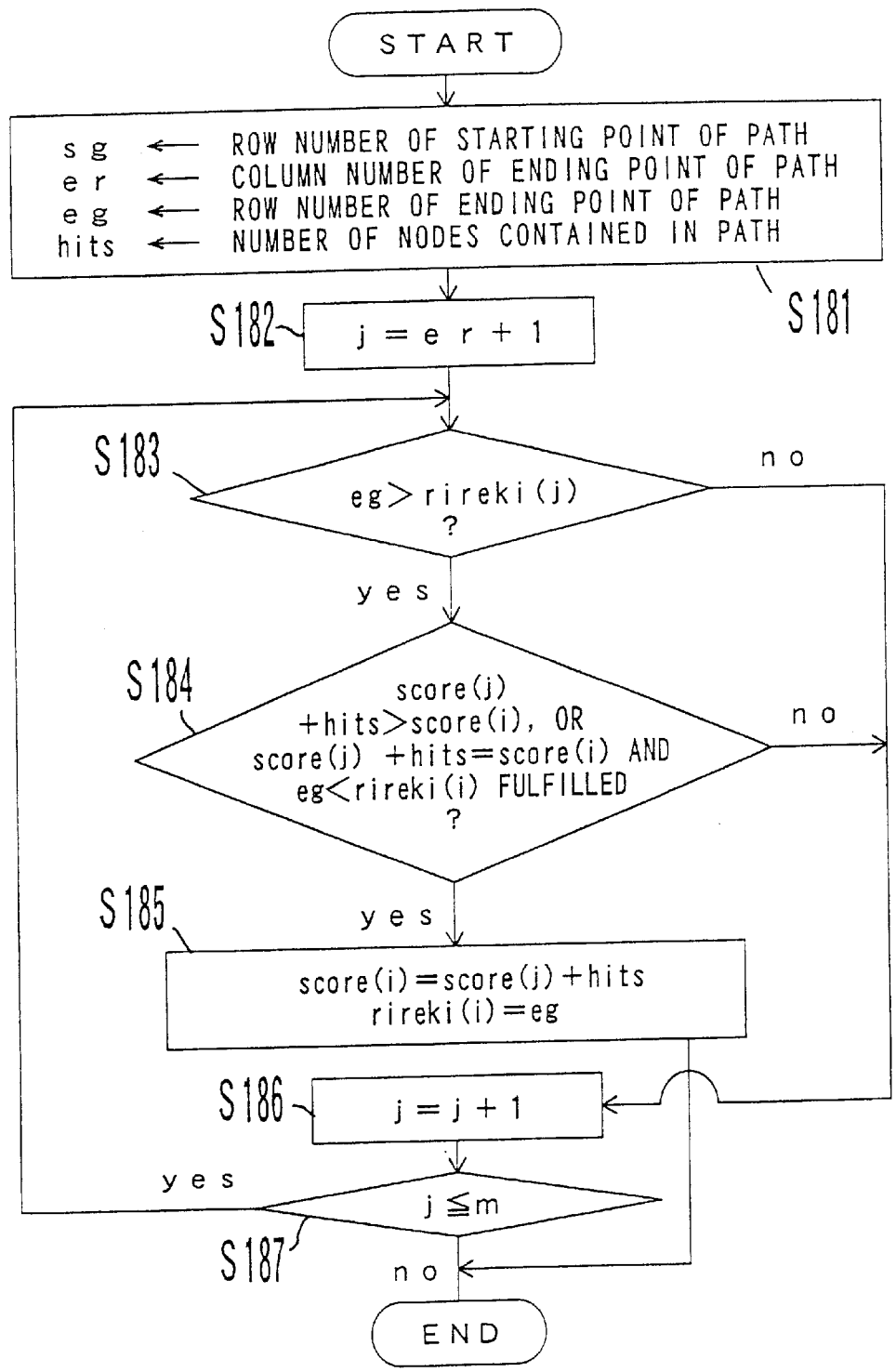
FIG. 48 is a flowchart showing a node number updating process.

Next, the node number updating process in step S175 shown in FIG. 47 is described by referring to FIG. 48. When the node number updating process starts, the management information extraction apparatus first retrieves one of the paths from the set Path (i). The row number of the starting point of the path is set as sg, and the column number and the row number of the node at the lower right ending point of the path, are respectively set as er and eg. The number of nodes contained in the path is set as "hits" (step S181).

For example, in the matching table shown in FIG. 37, Path (11) contains paths p1 and p2 in the area obliquely below to the right when i=11. For path p1, the values sg, er, and eg are respectively 8, 14, and 11. For path p2, the values sg, er, and eg are respectively 6, 12, and 7.

Next, the variable j indicating the column number is set to er+1 (step S182), and the values of eg is compared with rireki (j) (step S183). In this case, if the value of eg is larger than rireki (j), it is determined whether or not score (j)+hits >score (i) is fulfilled, or both score (j)+hits=score (i) and eg<rireki (i) are fulfilled (step S184).

If either of the above described conditions is fulfilled, score (i) is set as score (j)+hits, and rireki (i) is set as eg (step S185), thereby terminating the process.

If eg is equal to or smaller than rireki (j) in step S183 or neither of the conditions in step S184 is fulfilled, then j is set to j+1 (step S186), and j is compared with m (step S187). If j is equal to or smaller than m, then the processes in and after step S183 are repeated. If j exceeds m, then the process terminates.

Thus, a new provisional path set for the optimum path set is extracted from sets each obtained by adding one path to the provisional path set determination the immediately previous process, and the number of its nodes is recorded in the score (i). The number of nodes of the provisional path set for the optimum path set in the range from the i-th column to the last column is obtained by repeating these processes on all paths of Path (i).

For example, in FIG. 37, two combinations, that is, path p1 only and the combination of paths p2 and p3, can be considered as the combination of consistent paths in the range from the 11th column to the last column. Since the number of nodes of these combinations is 4 in either case, score (11) equals 4.

The above described form identifying process is applied not only to the management information extraction apparatus but also any image recognition apparatus such. as a document recognition apparatus, a drawing reading apparatus, etc., and is effective in identifying the structure of ruled lines of an arbitrary image.

In the form identifying process according to the present embodiment, the relationship among ruled lines is used as a feature. Therefore, a stable and correct identification can be attained even if a part of ruled lines cannot be successfully extracted due to a break in a line or noises, etc. when the structure of the ruled lines is extracted from an input table-formatted document and is matched with the form of the entered table-formatted document. Especially, a high robustness can be obtained by setting a broad condition for the arrangement of nodes to reduce the deterioration of the precision in extracting contour ruled lines, which are likely to be unstably extracted because of the influence of noise.

Stable and correct identification can be attained in altering a form by adding or deleting one row if the optimum path set is obtained as a combination of one or more paths. Furthermore, the number of compatibility checking processes can be reduced by setting a transitional compatibility condition relating two nodes, thereby performing a high-speed identifying process.

According to the present invention, the form of an image of a table-formatted document, etc. and the position of management information can be automatically learned and stored in the dictionary. Therefore, according to the stored information, the position of the management information in an arbitrary input image can be computed with a high precision.

Particularly, since a feature which is stable to the fluctuation of image information is used, management information can be successfully extracted from a broken or distorted document image. Furthermore, the management information can be extracted at a high speed because form learning and comparing processes are performed while candidates are progressively limited in two steps, that is, in rough classification and detailed identification, and the detailed identification is performed in a one-dimensional matching using the feature of the outline form of a table.

Additionally, since the management information is stored and retrieved using not only a character code but also an image itself, even difficult characters such as textured characters, etc. to be recognized, can be handled as management information.

What is claimed is:

1. An image accumulation apparatus, comprising:
   a computation unit computing a position of management information contained in each of a plurality of accumulated images according to relative position information of ruled lines to an outline portion of a table area contained in each accumulated image;
   an entry unit extracting images from each accumulated image based upon the computed position;
   a storage storing one of the extracted images and character codes of character recognition results of the extracted images as the management information for each accumulated image; and
   a retrieving unit retrieving management information represented as a given image by comparing the given image with the stored management information.

2. The image accumulation apparatus according to claim 1, further comprising:
   a selector selecting at least one of the extracted images and a character code, as the management information for each accumulated image.

3. The image accumulation apparatus according to claim 2, wherein said storage stores the extracted images as the management information depending on reliability of character recognition for the management information when said selector selects the character code corresponding to the management information.

4. The image accumulation apparatus according to claim 1, wherein said storage unit stores images which are a part of each accumulated image, as the management information for each accumulated image.

5. A computer-readable storage medium used to direct a computer to perform the functions of:
   computing a position of management information contained in each of a plurality of accumulated images according to relative position information of ruled lines to an outline portion of a table area contained in each accumulated image;
   extracting images from each accumulated image based upon the computed position;
   storing one of the extracted images and character codes of character recognition results of the extracted images as the management information for each accumulated image; and
   retrieving management information represented as a given image by comparing the given image with the stored management information.

6. An image accumulation method, comprising:
   computing a position of management information contained in each of a plurality of accumulated images according to relative position information of ruled lines to an outline portion of a table area contained in each accumulated image;

extracting images from each accumulated image based upon the computed position;

storing one of the extracted images and character codes of character recognition results of the extracted images as the management information for each accumulated image; and retrieving management information represented as a given image by comparing the given image with the stored management information.

* * * * *

UNITED STATES PATENT AND TRADEMARK OFFICE
CERTIFICATE OF CORRECTION

PATENT NO. : 6,721,463 B2
DATED : April 13, 2004
INVENTOR(S) : Satoshi Naoi et al.

It is certified that error appears in the above-identified patent and that said Letters Patent is hereby corrected as shown below:

Title page,
Item [56], References Cited, FOREIGN PATENT DOCUMENTS, add
-- JP 6-203465  7/1994
   JP 8-235162  9/1998 --.
OTHER PUBLICATIONS, "Office Action from Chinese Patent Office" reference, "October 20, 2002" should be -- December 20, 2002 --.
"Ishanti "Model matching" reference, "understading"." with -- understanding", --.

Column 34,
Line 33, delete ",".
Line 42, delete "unit".
Line 44, after "medium" insert -- storing at least one program controlling -- and delete "used to direct a".
Line 45, delete "to perform the functions of" and after "computer" insert -- according to a process comprising: --.

Signed and Sealed this

Twentieth Day of July, 2004

JON W. DUDAS
*Acting Director of the United States Patent and Trademark Office*